United States Patent [19]

Dubois et al.

[11] Patent Number: 5,244,998

[45] Date of Patent: Sep. 14, 1993

[54] ADVANCED AND UNADVANCED COMPOSITIONS, NUCLEOPHILIC DERIVATIVES THEREOF AND CURABLE COATING COMPOSITIONS THEREOF

[75] Inventors: Robert A. Dubois, Houston; Allyson Malzman, Lake Jackson; Pong S. Sheih, Lake Jackson; Alan R. Whetten, Lake Jackson, all of Tex.

[73] Assignee: The Dow Chemical Company, Midland, Mich.

[21] Appl. No.: 900,210

[22] Filed: Jun. 17, 1992

Related U.S. Application Data

[60] Division of Ser. No. 691,881, May 1, 1991, Pat. No. 5,147,905, which is a continuation-in-part of Ser. No. 523,613, May 15, 1990, abandoned.

[51] Int. Cl.$^5$ ............................................. C08G 65/14
[52] U.S. Cl. ..................................... 528/87; 525/524; 528/103; 528/104
[58] Field of Search ............... 525/524; 528/103, 104, 528/87

[56] References Cited

U.S. PATENT DOCUMENTS

| | | | |
|---|---|---|---|
| 2,965,607 | 12/1960 | Martin et al. | 528/118 |
| 3,522,210 | 7/1970 | Sellers . | |
| 4,256,844 | 3/1981 | Martin et al. | 525/507 |
| 4,543,406 | 9/1985 | Otsuki et al. . | |
| 4,698,141 | 10/1987 | Anderson et al. . | |
| 4,783,363 | 11/1988 | Berman et al. . | |
| 4,808,740 | 2/1989 | Roth et al. . | |
| 4,820,784 | 4/1989 | Massingill, Jr. et al. | 528/103 |
| 4,908,423 | 3/1990 | Roth et al. . | |
| 5,001,173 | 3/1991 | Anderson et al. . | |

FOREIGN PATENT DOCUMENTS

| | | |
|---|---|---|
| 0379057 | 1/1990 | European Pat. Off. . |
| 8203082 | 9/1982 | PCT Int'l Appl. . |

OTHER PUBLICATIONS

Polyamides Containing Oxyethylene Units V, Poly. Material, Sci. Eng. 60, 197 (1989).

Fundamental Studies of Epoxy Resins for Can and Coil Coatings III. Effect of Bisphenol Structure on Flexibility and Adhesion, Oral Presentation Given at the 68th Annual Meeting in Washington, D.C.

Journal of Coatings Technology, May, 1992; 1991 Joseph J. Mattiello Memorial Lecture; Structure/Property Relationships of Thermoset Coatings; JCTAX 65 (808) 1-106 (1992).

ACS Meeting; Polymeric Materials Science and Engineering, vol. 65, Fall Meeting 1991; New York, New York, Proceedings of the American Chem. Society Div. of Polymeric Materials.

Polyamides Containing Oxyethylene Units V. Effect of Catenation and Methyl Substituents on Polymer Properties, Polym. Mater. Sci, Eng., 60, 197 (1989).

Synthesis of New Epoxy Resins and their Physical Properties by Hiroshi Kakiuchi, Ho Huu Thoi and Thai Van Quang, J. Adhesion, 1981, vol. 11, pp. 291–304.

*Primary Examiner*—Melvyn I. Marquis
*Assistant Examiner*—D. Aylward

[57] ABSTRACT

Advanced resins and unadvanced epoxy resins are disclosed wherein the unadvanced compound and at least a portion of the advanced epoxy resin contains at least one —O—$R^1$—O— or —(O—$CH_2$—$CHR^2$)$_n$—O— group as a bridge between two groups selected independently from the group consisting of (1) a saturated or unsaturated cycloaliphatic group, (2) an aromatic group, (3) a group represented by the formula

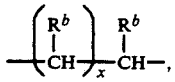

or (4) a group represented by the formula

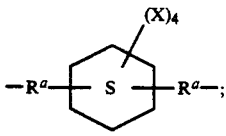

Also disclosed are nucleophilic derivatives thereof, as well as curable compositions and coating compositions containing the advanced or unadvanced epoxy resins or nucleophilic modified advanced or unadvanced epoxy resins. These advanced resins and unadvanced epoxy resins provide coatings with good flexibility or formability as exhibited by good flexural or formable properties determined by reverse impact, T-bend and wedge-bend tests, chip resistance, and with good corrosion resistance and throwpower.

6 Claims, No Drawings

ADVANCED AND UNADVANCED COMPOSITIONS, NUCLEOPHILIC DERIVATIVES THEREOF AND CURABLE COATING COMPOSITIONS THEREOF

CROSS-REFERENCE TO RELATED APPLICATION

This application is a division of application Ser. No. 07/691,881 filed May 1, 1991, now U.S. Pat. No. 5,147,905, which is continuation-in-part of application Ser. No. 07/523,613 filed May 15, 1990, now abandoned, which are incorporated herein by reference in their entirety.

FIELD OF THE INVENTION

The present invention concerns advanced and unadvanced resins or compounds wherein the unadvanced resins or compounds and at least a portion of the advanced resins or compounds contains at least one $-O-R^1-O-$ or $-(O-CH_2-CHR^2)_n-O-$ group as a bridge between two groups selected independently from the group consisting of (1) a saturated or unsaturated cycloaliphatic group, (2) an aromatic group, (3) a group represented by the formula

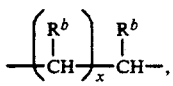

or (4) a group represented by the formula

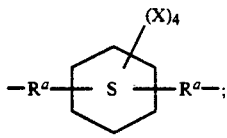

to nucleophilic derivatives thereof; to curable compositions and coating compositions containing the advanced or unadvanced epoxy resins or compounds or nucleophilic modified advanced or unadvanced epoxy resins or compounds.

BACKGROUND OF THE INVENTION

Advanced epoxy resins have been employed to prepare either water-borne or solvent-borne coating compositions. They are usually prepared by reacting a diglycidyl ether of a bisphenol with the same bisphenol; however, sometimes a different bisphenol is employed. While these resins usually produce coatings with good adhesion and chemical resistance properties, the coatings are often not as flexible or formable as desired. It would be desirable to increase the flexibility or formability of cured compositions of the advanced resins.

SUMMARY OF THE INVENTION

One aspect of the present invention pertains to an advanced resin or an unadvanced compound or mixture of such advanced resins and/or unadvanced compounds in any combination represented by the following formulas IA, IB, IC, ID, IE or IF Formula IA

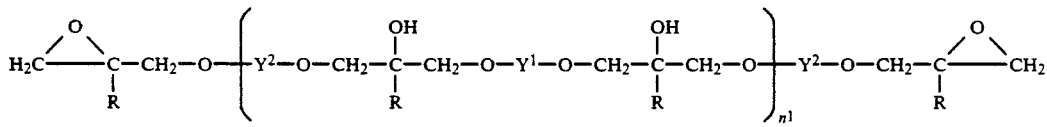

Formula IB

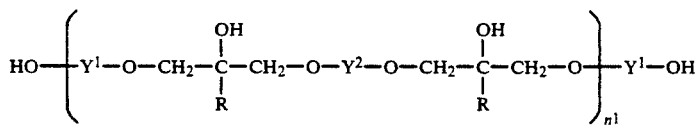

Formula IC

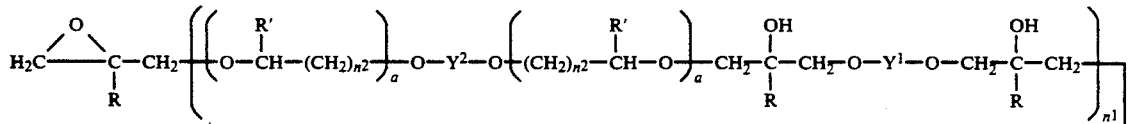

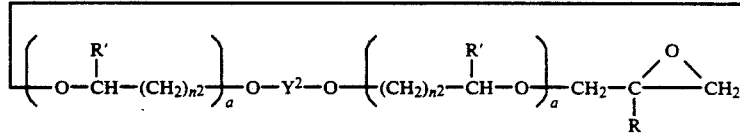

Formula ID

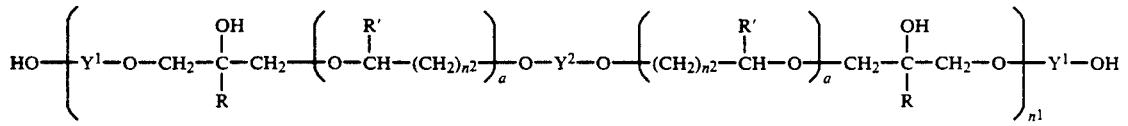

Formula IE

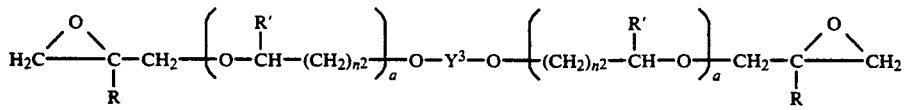

Formula IF

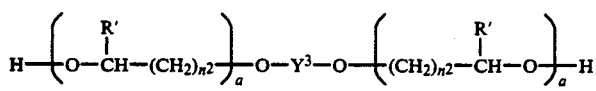

wherein each A is independently a single bond, —O—, —S—, —S—S—, —SO—, —SO$_2$—, —CO—, —O—CO—O—, —O—R$^1$—O—, —(O—CH$_2$—CHR$^2$—)$_n$—O— or —R$^3$—; each Q is independently a divalent group represented by the formulas

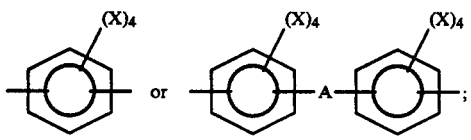

each Q' is independently a divalent saturated or unsaturated aliphatic or cycloaliphatic group having from 2 to about 20, preferably from 2 to about 15 carbon atoms or Q' is a group represented by the formulas

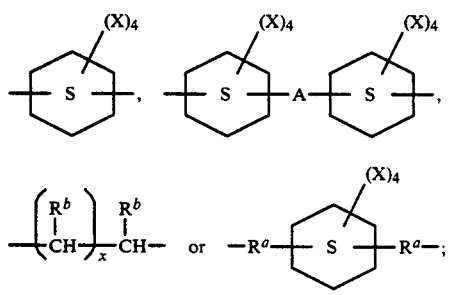

each Q$^1$ is independently a divalent group represented by the formula

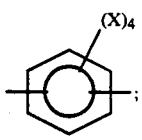

each Q$^2$ is independently a group represented by the formula

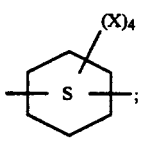

each R is independently hydrogen or a C$_1$ to C$_4$ alkyl group; each R' is independently hydrogen or an alkyl group having from 1 to about 6, preferably from 1 to about 4 carbon atoms; each R$^a$ is independently a divalent hydrocarbyl group having from 1 to about 6, preferably from about 1 to about 4, more preferably from about 1 to about 2, carbon atoms; each R$^b$ is independently hydrogen or a monovalent hydrocarbyl group having from 1 to about 6, preferably from about 1 to about 4, more preferably from about 1 to about 2, carbon atoms; R$^1$ is a divalent hydrocarbyl group having from 1 to about 36, preferably from about 2 to about 24, more preferably from about 2 to about 12, most preferably from about 2 to about 8, carbon atoms; R$^2$ is hydrogen, methyl, ethyl or phenyl; R$^3$ is a divalent hydrocarbyl group having from 1 to about 36, preferably from 1 to about 24, more preferably from 1 to about 12, carbon atoms; T is —OR$^1$O— or —(O—CH$_2$—CHR$_2$—)$_n$—O—; each Y$^1$ is independently —(Q—T)$_m$—Q—; each Y$^2$ is independently —(Q—T)$_m$—Q— or —(Q'—T)$_m$—Q', or —(Q—T)$_m$—Q—(O—CH$_2$—C(OH)(R)—CH$_2$—O—(Q—T)$_m$—Q)$_n$$^3$; each Y$^3$ is independently a divalent group represented by the formulas

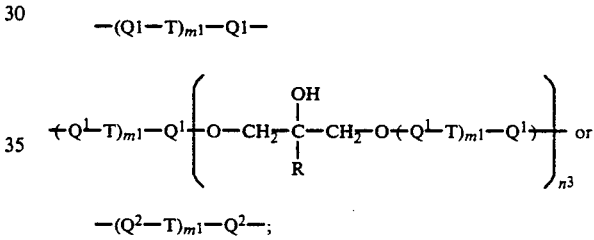

each X is independently hydrogen, a halogen, —SO—R$^4$, —SO$_2$—R$^4$, —CO—R$^4$, —CO—O—R$^4$, —O—CO—R$^4$, —S—R$^4$, —OR$^4$, or —R$^4$; R$^4$ is a monovalent hydrocarbyl group having from 1 to about 12, preferably from 1 to about 10, more preferably from 1 to about 8, most preferably from 1 to about 6, carbon atoms; each a independently has a value from 1 to about 25, preferably from 1 to about 15, more preferably from 1 to about 10; each m independently has a value from zero to about 25, preferably from zero to about 10, more preferably from zero to about 5; m$^1$ has a value from 1 to about 25, preferably from 1 to about 10, more preferably from 1 to about 5; n has a value from 1 to about 10, preferably from about 2 to about 8, more preferably from about 2 to about 5; n$^1$ has a value from 1 to about 100, preferably from 1 to about 80, more preferably from about 2 to about 60, most preferably from about 2 to about 30; n$^2$ has a value of 1 or 3; n$^3$ has a value from zero to about 10, preferably from about 0.1 to about 5; and x has a value from 2 to about 19, preferably from about 3 to about 10, more preferably from about 3 to about 5; with the proviso that at least one of said advanced resins or unadvanced compounds contains at least one —O—R$^1$—O— or —(O—CH$_2$—CHR$^2$—)$_n$—O— group as a bridge between two groups selected independently from the group consisting of (1) a saturated or unsaturated cycloaliphatic group, (2) an aromatic group, (3) a group represented by the formula

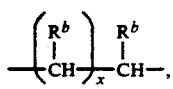

or (4) a group represented by the formula

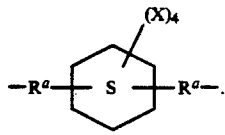

Another aspect of the present invention pertains to an advanced resin prepared by reacting a composition comprising (1) at least one diglycidyl ether of a compound containing an average of more than one but not more than about two phenolic hydroxyl groups per molecule; with wherein $R^1$ is a divalent hydrocarbyl group having from 1 to about 36, preferably from 2 to about 24, more preferably from 2 to about 12, most preferably from about 2 to about 8, carbon atoms and $R^2$ is hydrogen, methyl, ethyl or phenyl.

Another aspect of the present invention pertains to an acidified advanced resin or an acidified unadvanced compound resulting from reacting a composition comprising (A) at least one nucleophilic compound;
(B) at least one advanced resin or unadvanced compound or any combination of such advanced resins and/or unadvanced compounds represented by the aforementioned formulas IA, IC or IE

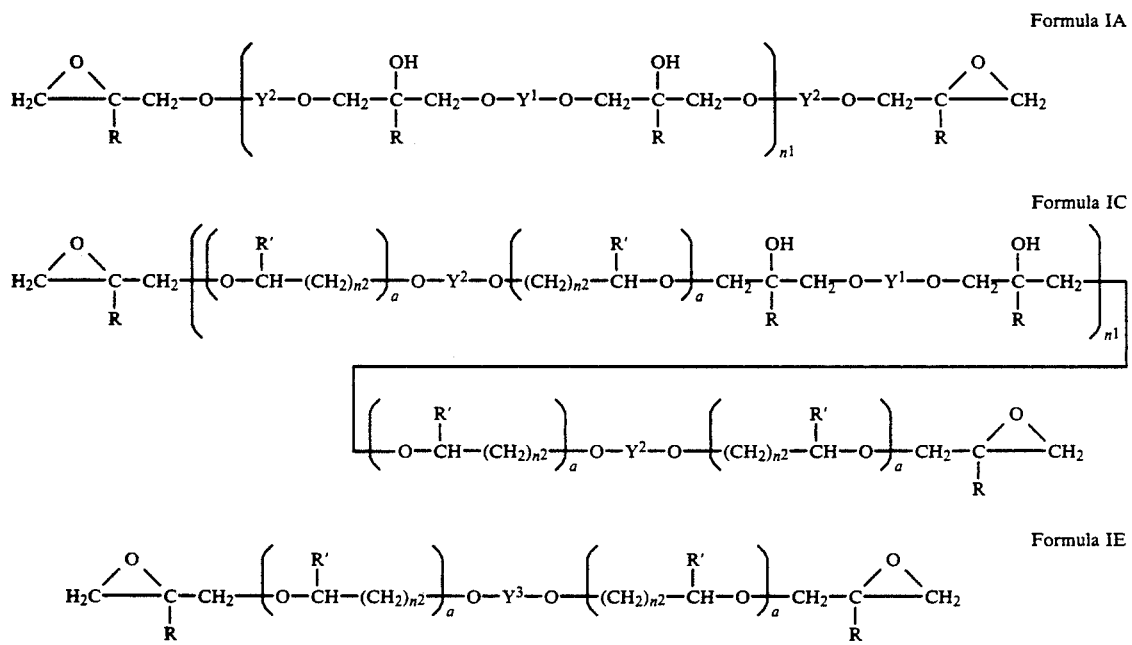

(2) at least one compound containing an average of more than one but not more than about two phenolic hydroxyl groups per molecule;

wherein components (1) and (2) are employed in amounts which provide a ratio of phenolic hydroxyl groups per epoxide group of from 0.5:1 to 2:1; and with the proviso that at least one of the components (1) and (2) contains at least one —O—$R^1$—O— group or an —(O—CH$_2$—CHR$^2$)$_n$—O— group as a bridge between two groups selected independently from the group consisting of (1) a saturated or unsaturated aliphatic group, (2) an aromatic group, (3) a group represented by the formula

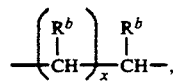

or (4) a group represented by the formula wherein A, Q, Q', R, R', $R^a$, $R^b$, $R^1$, $R^2$, $R^3$, T, X, $Y^1$, $Y^2$, $Y^3$, a, m, m$^1$, n, n$^1$, n$^2$, n$^3$ and x are as hereinbefore defined; with the proviso that at least one of said advanced resins or unadvanced compounds contains at least one —O—$R^1$—O—or —(O—CH$_2$—CHR$^2$)$_n$—O— group present as a bridge between two groups selected independently from the group consisting of (1) a saturated or unsaturated cycloaliphatic group, (2) an aromatic group, (3) a group represented by the formula

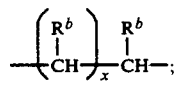

or (4) a group represented by the formula

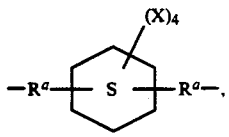

and (C) at least one Broönsted acid.

Another aspect of the present invention pertains to an acidified advanced resin comprising the product resulting from reacting a composition comprising (A) at least one nucleophilic compound;
(B) at least one advanced epoxy resin comprising the product prepared by reacting
  (1) at least one diglycidyl ether of a compound containing an average of more than one but not more than about two phenolic hydroxyl groups per molecule; with
  (2) at least one compound containing an average of more than one but not more than about two phenolic hydroxyl groups per molecule;

wherein components (1) and (2) are employed in amounts which provide a ratio of phenolic hydroxyl groups per epoxide group of from about 0.5:1 to about 2:1; and with the proviso that at least one of the components (1) or (2) contains at least one $-O-R^1-O-$ group or $-(O-CH_2-CHR^2-)_n-O-$ group as a bridge between two groups selected independently from the group consisting of (1) a saturated or unsaturated cycloaliphatic group, (2) an aromatic group, (3) a group represented by the formula

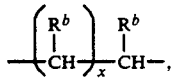

or (4) a group represented by the formula

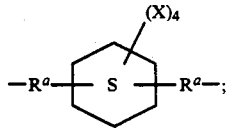

wherein $R^1$ is a divalent hydrocarbyl group having from 1 to about 36 carbon atoms; $R^2$ is hydrogen, methyl, ethyl or phenyl, and n has a value from 1 to about 10; and (C) at least one Brönsted acid.

Another aspect of the present invention pertains to an aqueous dispersion comprising the aforementioned acidified advanced resin or acidified unadvanced resin and water.

Another aspect of the present invention pertains to curable compositions comprising (I) any of the aforementioned advanced resin compositions and (II) a curing amount of at least one suitable curing agent therefor.

Another aspect of the present invention pertains to a process for coating an aqueous cationic epoxy resin based composition onto an object having an electroconductive surface by steps comprising immersing the electroconductive object into a coating bath comprising an aqueous dispersion of cationic particles of the epoxy based composition, passing an electronic current through said bath sufficient to electrodeosite a coating of said composition on the object by providing a difference of electric potential between the object and an electrode that is (a) spaced apart from said object, (b) is in electrical contact with said bath, and (c) is electrically positive in relation to said object; wherein said aqueous cationic epoxy resin based composition contains any of the aforementioned cationic epoxy-containing compositions and a curing amount of a suitable curing agent therefor.

A further aspect of the present invention pertains to a coating composition comprising any of the aforementioned curable compositions.

A still further aspect of the present invention pertains to an article coated with the aforementioned coating compositions which coating has subsequently been cured.

The present invention provides coating with good flexibility or formability as exhibited by good flexural or formable properties determined by reverse impact, T-bend and wedge-bend tests, chip resistance, and with good corrosion resistance and throwpower.

The present invention may suitably comprise, consist of, or consist essentially of, the aforementioned components.

The invention illustratively disclosed herein suitably may be practiced in the absence of any component or substituent group which is not specifically disclosed or enumerated herein.

DETAILED DESCRIPTION OF THE INVENTION

The term hydrocarbyl as employed herein means any aliphatic, cycloaliphatic, aromatic, aryl substituted aliphatic or cycloaliphatic, or aliphatic or cycloaliphatic substituted aromatic groups. Likewise, the term hydrocarbyloxy means a hydrocarbyl group having an oxygen linkage between it and the element to which it is attached. The term divalent hydrocarbyl group refers to the aforementioned hydrocarbyl groups minus an additional hydrogen atom. The aliphatic and cycloaliphatic groups can be saturated or unsaturated. These hydrocarbyl groups can also contain substituent groups such as halogens including chlorine bromine, fluorine, iodine, nitro, nitrile, and the like. Also, these groups can be specifically free of any one or more of such substituent groups. In any of the formulas employed herein, the cyclic group with an S in the middle of the ring indicates a saturated or unsaturated cyclohexyl group wherein the cyclohexyl group can contain one or two unsaturated groups in the ring.

The advanced resins of the present invention can be either terminated in epoxy groups or phenolic hydroxyl groups as desired.

The advanced resins of the present invention can be prepared by reacting the appropriate epoxy resin with the appropriate phenolic hydroxyl-containing compound at a temperature of from about 25° C. to about 280° C., preferably from about 75° C. to about 240° C., more preferably from about 100° C. to about 220° C. for a time sufficient to complete the reaction, usually from about 0.025 to about 48, preferably from about 0.05 to about 24, more preferably from about 0.01 to about 10, hours. Higher reaction temperatures require less time than the lower reaction temperatures. The pressure is not particularly significant except that the reaction is conducted at pressures which will maintain the reactive components and any solvents or reaction medium employed in the liquid phase.

At temperatures below about 25° C., little or no reaction occurs.

At temperatures above about 280° C., gelation of the reaction mixture occurs and the resin undergoes degradation.

The epoxy resin and the phenolic hydroxyl-containing compound are employed in amounts which provide a ratio of phenolic hydroxyl groups to epoxide groups of from about 0.5:1 to about 2:1, preferably from about 0.7:1 to about 1:1, more preferably from about 0.75:1 to about 0.95:1. In those instances wherein the phenolic hydroxyl groups are present in excess, the majority of the product will be terminated in phenolic hydroxyl groups; whereas in those instances wherein the epoxy groups are present in excess, the majority of the product will be terminated in epoxide groups.

When the ratio of phenolic hydroxyl groups to epoxide group is less than about 0.5:1, an excess of unreacted diglycidyl ether remains in the reaction product.

When the ratio of phenolic hydroxyl groups to epoxide group is greater than about 2:1, an excess of unreacted diphenol remains in the reaction product.

If desired, the advanced resins can be prepared employing catalytic quantities of a suitable catalyst for the reaction between the epoxide groups and the phenolic hydroxyl groups. Representative examples of such catalysts include metal hydroxides, tertiary amines, phosphates, quaternary ammonium and phosphonium compounds, combinations thereof and the like. Preferred such catalysts include, for example, ethyltriphenylphosphonium chloride, ethyltriphenylphosphonium bromide, ethyltriphenyl phosphonium iodide, ethyltriphenylphosphonium acetate.acetic acid complex, ethyltriphenylphosphonium phosphate, tetrabutylphosphonium chloride, tetrabutylphosphonium bromide, tetrabutylphosphonium iodide, tetrabutylphosphonium acetate.acetic acid complex, tetrabutylphosphonium phosphate, triphenylphosphine, N-methylmorpholine, sodium hydroxide, potassium hydroxide, tetrabutyammonium halide, benzyltrimethylammonium chloride butyltriphenylphosphoniumtetrabromo bisphenate, butyltriphenylphosphonium bisphenate, butyltriphenylphosphonium bicarbonate, triethylamine, tripropylamine, tributylamine, 2-methylimidazole, combinations thereof and the like. These catalysts are employed in catalytic amounts and the particular amount depends upon the particular reactants and catalyst being employed. However, usually the amount is from about 0.0001 to about 10, preferably from about 0.05 to about 1, more preferably from about 0.1 to about 0.5, percent by weight based upon the weight of the epoxy resin.

If desired, the advancement reaction can be conducted in the presence of a solvent such as, for example, alcohols, glycol ethers, aromatic hydrocarbons, aliphatic hydrocarbons, ketones, amides, sulfones, cyclic ethers, any combination thereof and the like. Preferred such solvents include, for example, isopropanol, ethanol, butylene glycol methyl ether, diethylene glycol n-butyl ether, diethylene glycol ethyl ether, diethylene glycol methyl ether, dipropylene glycol methyl ether, ethylene glycol n-butyl ether, ethylene glycol ethyl ether, ethylene glycol methyl ether, ethylene glycol phenyl ether, propylene glycol phenyl ether, propylene glycol methyl ether, tripropylene glycol methyl ether, toluene, xylene, decane, cyclohexane, acetone, methyl ethyl ketone, methyl isobutyl ketone, any combination thereof and the like.

Suitable epoxy resins which can be employed to prepare the advanced resins of the present invention (the resins represented by the aforementioned formulas IA, IB, IC, and ID) include those represented by the aforementioned formula IE and the following formula II and III

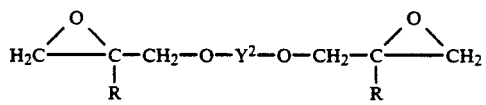

Formula II

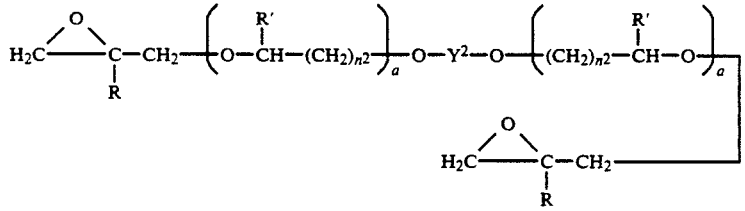

Formula III wherein R, R', $Y^2$, $Y^3$, a, and $n^2$ are as hereinbefore defined.

The glycidyl ethers of the oxyalkylated diols are produced by the condensation of an epihalohydrin with an oxyalkylated polyol represented by the following Formula IV:

wherein Z is $Y^2$ or $Y^3$ and R', $Y^2$, $Y^3$, and $n^2$ are defined as hereinbefore. The resulting halohydrin product is then dehydrohalogenated by known methods with a basic acting substance, such as sodium hydroxide to produce the corresponding diglycidyl ether.

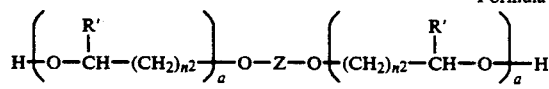

Formula IV

The oxyalkylated diols of Formula IV are produced by reacting a diol of the following Formula V

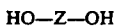    (Formula V)

wherein Z is defined as hereinbefore, with the appropriate molar ratio of ethylene oxide, propylene oxide, butylene oxide, tetrahydrofuran, styrene oxide or an alkyl or aryl glycidyl ether or mixtures thereof. Combinations of these oxides added in sequential manner can also be used so as to form block copolymers rather than random polymers. Examples of useful diols include, bisphenol A, bisphenol F, hydroquinone, dihydroxydiphenyl oxide, resorcinol, p-xylenol, poly(bisphenol A)ether of ethylene glycol, poly(bisphenol F)ether of ethylene glycol, bisphenol capped epoxy resin, 1,3-cyclohexanediol, 1,4-cyclohexanediol, 1,4-cyclohexanedimethanol, hydrogenated bisphenol A, hydrogenated bisphenol F, butanediol, hexanediol, ethylene glycol, propylene glycol, neopentyl glycol, and any combination thereof and the like.

Some of the common methods of synthesis of the diglycidylethers of aliphatic diols produce significant amounts of organic chloride-containing impurities. However, other processes are known for preparing products with lower levels of such impurities. While the low-chloride resins are not required for the practice of this invention, they can be used, if desired, for possible improvements in the process of preparing the resins, in the storage properties of the resins or formulated coatings made therefrom or in the performance properties of the products.

Particularly suitable epoxy resins include, for example, the diglycidyl ethers of biphenol, bisphenol A, bisphenol F, bisphenol K, bisphenol AP (1,1-bis(4-hydroxyphenyl)-1-phenyl ethane), 1,2-bis(3-hydroxyphenoxy)ethane, 1,4-bis(3-hydroxyphenoxy)butane, 1,4-bis(4-hydroxyphenoxy)butane, 1,8-bis(3-hydroxyphenoxy)octane, 1,8-bis(4-hydroxyphenoxy)octane, 1,10-bis(4-hydroxyphenoxy)decane, 1,12-bis(4-hydroxyphenoxy)decane, the reaction product of bisphenol A or bisphenol F with from 2 to 6 moles of propylene oxide or ethylene oxide, poly(bisphenol A)ether of ethylene glycol, poly(bisphenol F)ether of ethylene glycol, any combination thereof and the like.

Suitable phenolic hydroxyl-containing compounds which can be employed herein include, for example, those represented by the aforementioned formula IB and following formula VIA or VIB

| HO—Y$^1$—OH | Formula VIA |
| HO—Y$^2$—OH | Formula VIB | wherein Y$^1$ and Y$^2$ are as previously defined.

Particularly suitable phenolic hydroxyl-containing compounds which can be employed herein include, for example, biphenol, bisphenol A, bisphenol F, bisphenol K, bisphenol AP (1,1-bis(4-hydroxyphenyl)-1-phenyl ethane), 1,2-bis(3-hydroxyphenoxy)ethane, 1,4-bis(3-hydroxyphenoxy)butane, 1,4-bis(4-hydroxyphenoxy)butane, 1,8-bis(3-hydroxyphenoxy)octane, 1,8-bis(4-hydroxyphenoxy)octane, 1,10-bis(4-hydroxyphenoxy)octane, 1,12-bis(4-hydroxyphenoxy)dodecane, poly(bisphenol A)ether of ethylene glycol, poly(bisphenol F)ether of ethylene glycol, any combination thereof and the like.

Most of the phenols are well known as well as the procedures for their preparation. However, those wherein A is an —O—R$^1$—O— or an —(O—CH$_2$—CHR$^2$)$_n$—O— group can be prepared by reacting a catechol, hydroquinone, resorcinol, bisphenol A bisphenol F, or bisphenol K with the appropriate dihalogen containing compound, i.e. those represented by the formulas Hal—R$^1$—Hal or Hal—CH$_2$—CHR$^2$—(O—CH$_2$—CHR$^2$)$_{n^4}$—Hal; wherein R$^1$ and R$^2$ are as hereinbefore defined, Hal is a halogen, preferably chlorine or bromine and n$^4$ has a value from zero to about 9, at a temperature of from 0° C. to about 200° C., preferably from about 25° C. to about 150° C., more preferably from about 50° C. to about 125° C., in the presence of a hydrogen halide scavenging compound for a time sufficient to complete the reaction, usually from about 0.1 to about 24, preferably from about 0.5 to about 10, more preferably from about 1 to about 5, hours. The higher reaction temperatures require less time to complete the reaction whereas the lower temperatures require more time to complete the reaction. The reaction is usually conducted in the presence of water or ethanol so as to reduce the viscosity of the slurried reaction mixture and make it more susceptible to stirring by conventional means. The particular amount of water being that amount which provides the desired stirring viscosity, and can vary from as little as about 2 to as much as about 30, preferably from about 3 to about 20, more preferably from about 5 to about 10, percent by weight based upon the amount of phenolic hydroxyl-containing compound employed. The particular amount of ethanol can vary from about 2 to about 500, preferably from about 10 to about 200, more preferably from about 50 to about 150 percent by weight based upon the amount of phenolic hydroxyl-containing compound employed.

At temperatures below about 0° C., little or no reaction occurs.

At temperatures above about 200° C., the yield significantly decreases as a result of side reactions.

Hydrogen halide scavenging compounds which can be employed herein include, for example, alkali metal hydroxides, alkali metal carbonates, alkaline earth metal hydroxides, alkaline earth metal carbonates, and the like. Preferred hydrogen halide scavenging compounds include, for example, sodium hydroxide, potassium hydroxide, lithium hydroxide, any combination thereof and the like.

In those instances where it is desirable to have a water-borne coating composition, the advanced resin can be rendered water compatible, i.e. water soluble or miscible. This can be accomplished by reacting the advanced resins of the present invention including mixtures of these advanced resins with a different epoxy resin having an average of more than one vicinal epoxide group per molecule with one or more nucleophilic compounds.

The nucleophilic compound is suitably employed in an amount sufficient to convert at least a portion of the epoxy groups to cationic groups or cation-forming groups. When the nucleophilic compound is added to the epoxy-containing compound in the presence of an acid, a cationic group is formed. When the nucleophilic compound is added to the epoxy-containing compound in the absence of an acid, an adduct of the epoxy-containing compound and the nucleophilic compound is formed which is a cation-forming group which forms a cationic group when an acid is added. The nucleophilic compound is usually employed in an amount which provides a ratio of moles of nucleophilic compound per epoxide group of from about 0.15:1 to about 1.1:1, preferably from about 0.4:1 to about 1:1, more preferably from about 0.7:1 to about 0.9:1, in the presence of a Brönsted acid.

At ratios of moles of nucleophilic compound per epoxide group less than about 0.15:1, an unstable aqueous dispersion is usually obtained because it has a low charge density.

At ratios of moles of nucleophilic compound per epoxide group greater than about 1.1:1 an aqueous solution is usually obtained. Whether this stoichiometry results in an aqueous solution or dispersion depends upon the molecular weight of the epoxy resin. With a low (<2,000) number average molecular weight epoxy resin, the 1.1:1 stoichiometry gives a solution in most instances. With a high (> 2,000) number average molecular weight epoxy resin, the 1.1:1 stoichiometry may give a dispersion rather than a solution.

The reaction is usually conducted at temperatures of from about 25° C. to about 110° C., preferably from about 60° C. to about 100° C., more preferably from about 70° C. to about 90° C., for a time sufficient to complete the desired reaction, usually from 0.5 to about 24, preferably from 1 to about 12, more preferably from about 2 to about 8, hours. The higher reaction temperatures require less time than the lower reaction temperatures.

At temperatures below about 25° C., the reaction is too slow to be practical.

At temperatures above about 110° C., the reaction is often accompanied by undesirable side reactions.

For water-borne systems, the charge density of the solid resin is used to determine the quantity of nucleophilic compound per epoxy group contained in the epoxy resin. The charge density is the milliequivalents of nucleophilic compound per gram of solid. A larger charge density is required for a high molecular weight epoxy resin than a low epoxy resin to obtain a dispersion. For the same molecular weight epoxy resin, a low charge density gives an aqueous dispersion whereas a higher charge density may give an aqueous solution. The charge density may vary from about 0.08 to about 1.4, preferably from about 0.35 to about 0.6, more preferably from about 0.35 to about 0.45, milliequivalents of nucleophilic compound per gram of solid. The ratio of epoxy-containing reactant/nucleophilic compound/Brönsted acid is variable so long as the reaction mixture is at neutral or acid pH. Stoichiometry of the reaction requires 1 equivalent of nucleophilic compound and 1 equivalent of acid per vicinal epoxy group converted. In order to form the instant nucleophilic compounds from strong acids, an excess of the nucleophilic compound is required. With weaker acids, good results can be achieved by using substantially stoichiometric amounts of reactants although a slight excess or deficiency of the epoxy-containing reactant or pyridine can be used. With still weaker acids a slight excess of acid is preferred to maximize the yield of nucleophilic compound salts. Good results have been achieved using a ratio of 1.1 equivalents of weak acid and one equivalent of nucleophilic compound per epoxide equivalent.

The amount of water that is included in the reaction mixture, for water-borne compositions, can be varied to convenience so long as there is sufficient acid and water present to stabilize nucleophilic compound salt formed during the course of the reaction. Normally, it has been found preferably to include water in the reaction in amounts of from 10 to 30 moles per epoxy equivalent.

The aqueous compositions of the present invention can also contain any amount of an organic solvent such as ethylene glycol monobutyl ether. These solvents are usually employed in amounts of from 1 to 75, preferably from 4 to 35, more preferably from 6 to 18, percent by weight based upon the weight of the aqueous dispersion or solution.

Usually, the Brönsted acid is employed in amounts which provides a ratio of moles of acid to moles of nucleophilic compound of from about 0.2:1 to about 10:1, preferably from about 0.5:1 to about 1.5:1, more preferably from about 1:1 to about 1.1:1.

The nucleophilic compounds which are used advantageously in forming the cations required for forming the cationic resins in this invention are represented by the following classes of compounds, sometimes called Lewis bases:

(a) monobasic heteroaromatic nitrogen compounds;
(b) tetra (lower alkyl)thioureas;
(c) $R^5$—S—$R^6$ wherein $R^5$ and $R^6$ individually are lower alkyl, hydroxy lower alkyl or are combined as one divalent acyclic aliphatic radical having 3 to 5 carbon atoms;

(d) 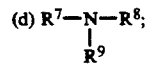

wherein $R^8$ and $R^9$ individually are lower alkyl, hydroxy lower alkyl,

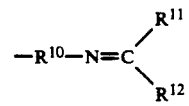

or are combined as one divalent acyclic aliphatic radical having from 3 to 5 carbon atoms, $R^{10}$ is a divalent acyclic aliphatic group having from 2 to 10 carbon atoms, $R^{11}$ and $R^{12}$ individually are lower alkyl and $R^7$ is hydrogen or lower alkyl, aralkyl or aryl, except that when $R^8$ and $R^9$ together are a divalent acyclic aliphatic group then $R^7$ is hydrogen, lower alkyl or hydroxyalkyl and when either or both of $R^8$ and $R^9$ is

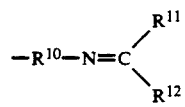

then $R^7$ is hydrogen; or (e) 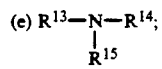

wherein $R^{13}$, $R^{14}$ and $R^{15}$ individually are lower alkyl, hydroxy lower alkyl or aryl.

By the term lower it is meant a group having from 1 to about 10, preferably from 1 to about 6, more preferably from 1 to about 4, carbon atoms.

Suitable pyridine compounds which can be employed herein as the nucleophilic compound include monopyridine compounds and polypyridine compounds.

Monopyridine compounds which can be employed herein include, for example, those represented by the following formulas VII-IX

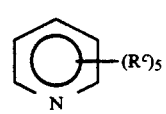

Formula VII

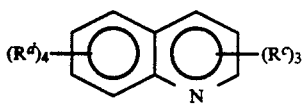

Formula VIII

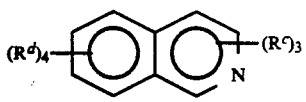

Formula IX wherein $R^c$ and $R^d$ is independently hydrogen, a halogen atom, particularly chlorine or bromine, a hydrocarbyl or hydrocarbyloxy or a hydroxy substituted hydrocarbyl group having from 1 to about 10, preferably from 1 to about 4, carbon atoms, a carbamoyl group (—CO—NH₂), or a hydroxyl group. Preferred monopyridine compounds include nicotinamide, pyridine, 2-picoline, 3-picoline, 4-picoline, 4-ethylpyridine, 3,4-dimethylpyridine, 3,5-dimethylpyridine, 4-phenylpyridine, 4-propanolpyridine, quinoline, 4-methylquinoline, isoquinoline, mixtures thereof and the like. The most preferred monopyridine compound is nicotinamide.

Polypyridines which can be employed include any compound having more than one pyridine group per molecule. Particularly suitable such pyridine-containing compounds include those represented by the following formulas X-XII

Formula X

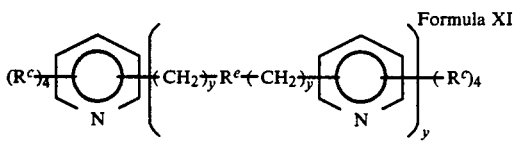

Formula XI

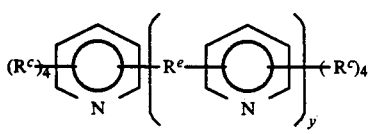

Formula XII wherein each $R^c$ is independently hydrogen, a halogen atom, particularly chlorine or bromine, a hydrocarbyl or hydrocarbyloxy or a hydroxy substituted hydrocarbyl group having from 1 to about 10, preferably from 1 to about 4, carbon atoms, a carbamoyl group (—CO—NH₂), or a hydroxyl group; each $R^e$ is independently an alkyl group having from 1 to about 10 carbon atoms, an amine group, a urea group, a thiourea group, a carbonyl group, —S—S— group, —S—CH₂—CH₂—S— group, —C(OH)H—CO-group, or an amide group; and each y independently has a value from 1 to about 5. Particularly suitable polypyridine compounds include, for example, 1,2-bis(4-pyridyl)ethane, 4,4'-trimethylenedipyridine, 3,3'-bipyridine, 4,4'-bipyridine, 4,4'-bipyridinehydrate, 2,3'-bipyridine, 2,4'-bipyridine, 4,4'-dimethyl-2,2'-bipyridine, 1,3di-(3-picolyl)urea, 1,3-di-(3-picolyl)thiourea, di-(2-picolyl)amine, 2,2'-(3,6-dithiaoctamethylene) dipyridine, trans-1,2-bis(4-pyridyl)ethylene, 2,2',6',2''-terpyridine, aldrithiol-4, 2,2'-bipyridine, alpha-methyl-1,2-di-3-pyridyl-1-propanone, alpha-pyridoin, any combination thereof and the like.

Representative specific nucleophilic compounds are pyridine, nicotinamide, quinoline, isoquinoline, tetramethyl thiourea, tetraethyl thiourea, hydroxyethylmethyl sulfide, hydroxyethylethyl sulfide, dimethyl sulfide, diethyl sulfide, di-n-propyl sulfide, methyl-n-propyl sulfide, methylbutyl sulfide, dibutyl sulfide, dihydroxyethyl sulfide, bis-hydroxybutyl sulfide, trimethylene sulfide, thiacyclohexane, tetrahydrothiophene, dimethyl amine, diethyl amine, dibutyl amine, 2-(methylamino)ethanol, diethanolamine and the ketimine derivatives of polyamines containing secondary and primary amino groups such as those produced by the reaction of diethylene triamine or N-aminoethylpiperazine with acetone, methyl ethyl ketone or methylisobutyl ketone; N-methylpiperidine, N-ethylpyrrolidine, N-hydroxyethylpyrrolidine, trimethylphosphine, triethylphosphine, tri-n-butylphosphine, trimethylamine, triethylamine, tri-n-propylamine, tri-isobutylamine, hydroxyethyldimethylamine, butyldimethylamine, trihydroxyethylamine, triphenylphosphorus, N,N,N-dimethylphenethylamine methyldiethanolamine, dimethylethanolamine, any combination thereof and the like.

Substantially any organic acid, especially a carboxylic acid, can be used in the conversion reaction to form onium salts so long as the acid is sufficiently strong to promote the reaction between the nucleophilic compound and the vicinal epoxide group(s) on the resinous reactant. In the case of the salts formed by addition of acid to a secondary amine-epoxy resin reaction product, the acid should be sufficiently strong to protonate the resultant amine product to the extent desired.

Suitable Brönsted acids which can be employed include any such acid or combination of acids which promotes the reaction between the pyridine compound and the epoxide group and provides a compatible anion in the final product. By "compatible anion", it is meant one which exists in close association with the cationic nitrogen of the pyridine compound for an indefinite period. Monobasic acids are usually preferred. The Bronsted acids can be inorganic or inorganic acids. Preferred inorganic acids which can be employed include, for example, phosphoric acid, hydrochloric acid, hydrobromic acid, nitric acid, sulfuric acid, any combinations thereof and the like. Organic acids which can be employed herein include, for example, those saturated or unsaturated acids having from 2 to about 30, preferably from 2 to about 6, more preferably from 2 to 3 carbon atoms. Also suitable are the hydroxy-functional carboxylic acids (e.g., glycolic acid, lactic acid, etc.) and organic sulfonic acids (e.g., methanesulfonic acid), and the like. The preferred organic acids include, for example, acetic acid, propionic acid, acrylic acid, methacrylic acid, itaconic acid, ethanesulfonic acid, decanoic acid, triacontanoic acid, lactic acid, any combination thereof and the like.

The conversion reaction to form cationic resins is normally conducted by merely blending the reactants together and maintaining the reaction mixture at an elevated temperature until the reaction is complete or substantially complete. The progress of the reaction is easily monitored. The reaction is normally conducted with stirring and is normally conducted under an atmosphere of inert gas (e.g., nitrogen). Satisfactory reaction rates occur at temperatures of from 25° C. to 100° C., with preferred reaction rates being observed at temperatures from 60° to 100° C.

Good results can be achieved by using substantially stoichiometric amounts of reactants although a slight excess or deficiency of the epoxy-containing resin or the nucleophilic compounds can be used. With weak acids, useful ratios of the reactants range from 0.5 to 1.0 equivalent of nucleophilic compounds per epoxide group of the resin and 0.4 to 1.1 equivalents of organic acid per epoxide. These ratios, when combined with the preferred epoxide content resins described above, provide the desired range of cationic charge density required to produce a stable dispersion of the coating composition in water. With still weaker acids (e.g., a carboxylic acid, such as acetic acid) a slight excess of acid is preferred to maximize the yield of onium salts. In preparing the compositions in which the cationic group being formed is an onium group, the acid should be present during the reaction of the nucleophilic compounds and the epoxy group of the resin. When the nucleophilic compounds is a secondary amine, the amine-epoxy reaction can be conducted first, followed by addition of the organic acid to form the salt and thus produce the cationic form of the resin. Larger excesses of amine can be used and the excess amine subsequently removed as known in the art such as by vacuum distillation, steam distillation, falling film distillation, and the like.

For the onium-forming reactions, the amount of water that is also included in the reaction mixture can be varied to convenience so long as there is sufficient acid and water present to stabilize the cationic salt formed during the course of the reaction. Normally, it has been found preferable to include water in the reaction in amounts of from 5 to 30 moles per epoxy equivalent. When the nucleophilic compound is a secondary amine, the water can be added before, during, or after the resin epoxy group/nucleophile reaction. The preferred range of charge density of the cationic, advanced epoxy resin is from 0.2 to 0.8 milliequivalent of charge per gram of the resin, calculated assuming complete salting of the limited reagent (acid or amine).

It has also been found advantageous to include minor amounts of water-compatible organic solvents in the reaction mixture. The presence of such solvents tends to facilitate contact of the reactants and thereby promote the reaction rate. In this sense, this particular reaction is not unlike many other chemical reactions and the use of such solvent modifiers is conventional. The skilled artisan will, therefore, be aware of which organic solvents can be included.

When a desired degree of reaction is reached, any excess nucleophilic compound can be removed by standard methods, e.g., dialysis, vacuum stripping and steam distillation.

The cationic, advanced epoxy resins of this invention in the form of aqueous dispersions are useful as coating compositions, especially when applied by electrodeposition. The coating compositions containing the cationic resins of this invention as the sole resinous component are useful but it is preferred to include crosslinking agents in the coating composition so that the coated films, when cured at elevated temperatures, will be crosslinked and exhibit improved film properties. The most useful sites on the resin for crosslinking reactions are the secondary hydroxyl groups along the resin backbone. Materials suitable for use as crosslinking agents are those known to react with hydroxyl groups and include blocked polyisocyanates; amine-aldehyde resins such as melamine-formaldehyde, urea-formaldehyde, benzoguanine-formaldehyde, and their alkylated analogs; polyester resins; and phenol-aldehyde resins.

The advanced resins of the present invention can be cured by any suitable curing agent for curing epoxy resins, e.g. those resins containing a vicinal epoxide group as well as those curing agents which cure through the secondary hydroxyl groups appearing along the backbone of either the epoxy terminated resins and the hydroxyl terminated resins.

Suitable curing agents which cure through the epoxide groups include, compounds containing at least two primary or secondary amine hydrogen atoms such as, for example primary and secondary aliphatic, cycloaliphatic or aromatic amine compounds; compounds containing at least two carboxylic acid groups per molecule (organic polybasic acids) and their anhydrides such as for example, saturated an unsaturated aliphatic or cycloaliphatic carboxylic acids and aromatic carboxylic acids.

Suitable primary or secondary amine-containing compounds which can be employed as the epoxy curing agent include, for example, ethylenediamine, diethylenetriamine, triethylenetetramine, tetraethylenepentamine, isophoronediamine, N-aminoethylpiperazine, menthanediamine, 1,3-diaminocyclohexane, xylylenediamine, m-phenylenediamine, 1,4-methylenedianiline, metaphenylenediamine, diaminodiphenylsulfone, diaminodiphenyl ether, 2,4-toluenediamine, 2,6-diaminopyridine, bis(3,4-diaminophenyl)sulfone, resins prepared from aniline and formaldehyde, aminated polyglycols, any combination of any two or more such curing agents and the like.

Organic polybasic acid curing agents include, for example, oxalic acid, phthalic acid, maleic acid, aconitic acid, carboxyl terminated polyesters, any combination of any two or more such curing agents and the like.

Anhydrides of polycarboxylic acids include, for example, phthalic anhydride, succinic anhydride, citraconic anhydride, itaconic anhydride, dodecenylsuccinic anhydride, Nadic Methyl Anhydride (methylbicyclo(2.2.1)heptene-2,3-dicarboxylic anhydride isomers), pyromellitic dianhydride, cyclopentanetetracarboxylic dianhydride, benzophenonetetracarboxylic dianhydride, any combination thereof and the like.

Other curing agents include, for example, amides and polyamides, urea-aldehyde resins, melamine-aldehyde resins, hexamethoxymethylmelamine, imidazoles, guanimines, aromatic hydroxyl-containing compounds, any combination thereof and the like. Preferred other curing agents which can be employed herein include, for example, dicyandiamide, 2-methylimidazole, phenol-formaldehyde resins, cresol-formaldehyde resins, any combination thereof, and the like.

Curing agents which cure through the secondary hydroxyl groups along the backbone of the advanced resins include, for example, polyisocyanates, blocked polyisocyanates, urea-aldehyde resins, melamine-aldehyde resins, phenol-aldehyde novolac resins, alkylated phenol-aldehyde novolac resins, any combination thereof and the like. Preferred such curing agents include, for example, hexamethoxymethylmelamine, urea-formaldehyde resins, melamine-formaldehyde resins, aromatic or cycloaliphatic or aliphatic polyisocyanates, blocked polyisocyanates, a mixture of the allyl ethers of mono-, di- and tri-methylol phenol, a mixture of the allyl ethers of methylol phenol partially polymerized, phenol-formaldehyde novolac resins and cresol-formaldehyde novolac resins, any combination thereof and the like.

Blocked polyisocyanates include, for example, those blocked with alcohols, phenols, oximes, lactams and N,N-dialkylamides or esters of alpha-hydroxyl group-containing carboxylic acids. Particularly suitable polyisocyanates include, for example, isocyanurate trimer of hexamethylene diisocyanate, toluene diisocyanate, methylene diphenylene diisocyanate, isophorone diisocyanate, a prepolymer of toluene diisocyanate and trimethylolpropane, and the like. Preferred blocked polyisocyanates are those blocked with oximes of ketones also known as ketoximes. The preferred ketoximes is methyl ethyl ketoxime, acetone oxime, methyl ethyl ketoxime, methyl amyl ketoxime, methyl isobutyl ketoxime, cyclohexanone ketoxime.

The blocked polyisocyanates are prepared by reacting equivalent amounts of the isocyanate and the blocking agent in an inert atmosphere such as nitrogen at temperatures between 25° to 100° C., preferably below 70° C. to control the exothermic reaction. Sufficient blocking agent is used so that the product contains no residual, free isocyanate groups. A solvent compatible with the reactants, product, and the coating composition can be used such as a ketone or an ester. A catalyst can also be employed such as dibutyl tin diluarate.

The blocked polyisocyanate crosslinking agents are incorporated into the coating composition at levels corresponding to from 0.2 to 2.0 blocked isocyanate groups per hydroxyl group of the cationic resin. The preferred level is from about 0.3 to about 1 blocked isocyanate group per resin hydroxyl group.

A catalyst can, optionally, be included in the coating composition to provide faster or more complete curing of the coating. Suitable catalysts for the various classes of crosslinking agents are known to those skilled in the art. For the coating compositions using the blocked polyisocyanates as crosslinking agents, suitable catalysts include dibutyl tin dilaurate, dibutyl tin diacetate, dibutyl tin oxide, stannous octanoate, and other urethane-forming catalysts known in the art. Amounts used typically range between 0.1 and 3 weight percent of binder solids.

The curing agents are employed in amounts which will generally cure the advanced resin, i.e. that amount which is sufficient to render the resultant cured coating composition non-tacky. In those instances where the curing agent cures by reacting with the epoxide groups, they are employed in amounts which provide a ratio of equivalents of curing agent per epoxide group of from 0.01:1 to 10:1, preferably from 0.1:1 to 5:1, more preferably from 0.5:1 to 1.5:1. In those instances where the advanced resin cures through the secondary hydroxyl groups along the backbone, the curing agent is employed in amounts which provide a ratio of equivalents of curing agent per secondary hydroxyl group of from 0.05:1 to 5:1, preferably from 0.1:1 to 3:1, more preferably from 0.3:1 to 2:1.

The advanced resins of the present invention can be blended with other materials such as solvents or diluents, fillers, pigments, dyes, flow modifiers, thickeners, reinforcing agents, antifoam agents, slip agents, adhesion promoters, flexibility promoters, surface tension modifiers, stress release agents, gloss reducing agents, rheology modifiers, stabilizers, surfactants, plasticizers, or any combination thereof and the like.

The amount of additive depends on the additive type, formulation, crosslinker (curing agent) concentration and type, and many other variables. As a consequence, the Applicants do not wish to be bound by any particular concentration range. Typically additives are usually employed in amounts of from about 0.00001 to about 10, preferably from about 0.001 to about 5, more preferably from about 0.01 to about 0.05 percent by weight based upon the weight of total solids.

Fillers are added in amounts up to 60 percent by weight.

Plasticizers are added in quantities of from about 10 to about 40 percent by weight.

Solvents or diluents which can be employed herein include, for example, alcohols, hydrocarbons, ketones, glycol ethers, or any combination thereof and the like. Particularly suitable solvents or diluents include, for example, methanol, ethanol, isopropanol, butanol, pentanol, toluene, benzene, xylene, methyl ethyl ketone, methyl isobutyl ketone, diethylene glycol methyl ether, dipropylene glycol methyl ether, ethylene glycol methyl ether, ethylene glycol ethyl ether, ethylene glycol butyl ether, ethylene glycol phenyl ether, or any combination thereof and the like.

Reinforcing materials which can be employed herein include natural and synthetic fibers in the form of woven cloth, mat, monofilament, multifilament, and the like. Suitable reinforcing materials include, glass, ceramics, nylon, rayon, cotton, aramid, graphite, or any combination thereof and the like.

Suitable fillers which can be employed herein include, for example, inorganic oxides, ceramic microspheres, plastic microspheres, or any combination thereof and the like.

The advanced resins of the present invention are particularly useful in the preparation of coatings; however, they may also find utility in castings, laminates, encapsulants, and the like.

The coating compositions can be applied by any conventional method known in the coating industry. Therefore, spraying, rolling, dipping, flow control or electrodeposition applications can be employed for both clear and pigmented films. Spraying is the preferred technique for the aqueous coating compositions. After application onto the substrate, the coating is thermally cured at temperatures of from about 95° C. to about 280° C. or higher, for periods in the range of from about 0.08 to about 60 minutes. The resultant films can be dried at ambient temperatures for longer periods of time.

Unpigmented coating compositions are prepared by blending the resinous product with the crosslinking agent and optionally any additives such as catalysts, solvents, surfactants, flow modifiers, plasticizers, defoamers, or other additives. This mixture is then dispersed in water by any of the known methods. A preferred method is the technique known as phase-inversion emulsification, wherein water is slowly added with agitation to the above mixture, usually at temperatures ranging from ambient to 70° C., until the phases invert to form an organic phase-in-water dispersion. The solids content of the aqueous dispersion is usually between 5 and 45 percent by weight and preferably between 10 and 30 percent by weight for application by electrodeposition.

Pigmented coating compositions are prepared by adding a concentrated dispersion of pigments and extenders to the unpigmented coating compositions. This pigment dispersion is prepared by grinding the pigments together with a suitable pigment grinding vehicle in a suitable mill as known in the art.

Pigments and extenders known in the art are suitable for use in these coatings including pigments which increase the corrosion resistance of the coatings. Examples of useful pigments or extenders include titanium dioxide, talc, clay, lead oxide, lead silicates, lead chromates, carbon black, strontium chromate, and barium sulfate.

Pigment grinding vehicles are known in the art. A pigment grinding vehicle suitable for use with electrodepositable coatings consists of a water-soluble cationic resinous product, water, and a minor amount of water-compatible solvent. The cationic resinous product is prepared by reacting an epichlorohydrin/bisphenol A condensation product having an epoxide group content of 8 percent with a nucleophilic compound, an acid, and water in a similar fashion as described above for the cationic resins used in the preferred embodiment of the invention. The water-soluble product can be diluted with water to form a clear solution useful as a pigment grinding vehicle.

The pH and/or conductivity of the coating compositions can be adjusted to desired level by the addition of compatible acids, bases, and/or electrolytes known in the art. Other additives such as solvent, surfactants, defoamers, anti-oxidants, bactericides, etc. can also be added to modify or optimize properties of the compositions or the coating in accordance with practices known to those skilled in the art.

Although the coating compositions of the invention can be applied by any conventional technique for aqueous coatings, they are particularly useful for application by cathodic electrodeposition, wherein the article to be coated is immersed in the coating composition and made the cathode, with a suitable anode in contact with the coating composition. When sufficient voltage is applied, a film of the coating deposits on the cathode and adheres. Voltage can range from 10 to 1,000 volts, typically 50 to 500. The film thickness achieved generally increases with increasing voltage. In the case of the coating compositions of the invention, suitable films may be achieved at higher voltages than for compositions using resins prepared by a one-step preparation. Current is allowed to flow for between a few seconds to several minutes, typically two minutes over which time the current usually decreases. Any electrically conductive substrate can be coated in this fashion, especially metals such as steel and aluminum. Other aspects of the electrodeposition process, such as bath maintenance, are conventional. After deposition, the article is removed from the bath and typically rinsed with water to remove that coating composition which does not adhere.

The uncured coating film on the articles is cured by heating at elevated temperatures, ranging from 200° F. to 536° F. (93° C. to 280° C.), for periods of about 0.08 to about 60 minutes.

EXAMPLE 1

RECRYSTALLIZATION OF 1,2-BIS(3-HYDROXYPHENOXY)ETHANE

Technical grade (85% purity) of 1,2-Bis-(3-hydroxyphenoxy)ethane, 3,3'-ethylenedioxydiphenol, is obtained form Aldrich Chemical Chemical Company. A 300 gram sample is dissolved in 750 ml of acetone which is then treated with decolorizing carbon and filtered through a filter aid, celite, to remove particulate matter and colored impurities. The filtrate is concentrated to 600 ml by distillation at atmospheric pressure and allowed to stand at room temperature overnight. A crystalline material, 29 grams, is removed by filtration under reduced pressure and enough acetone is added to the filtrate to bring the volume up to 800 ml. After cooling in the refrigerator overnight, another 115 grams of white crystalline material is recovered and high pressure liquid chromtography (HPLC) analysis reveals 95% purity by peak area. This 115 gram fraction is redissolved in acetone to a volume of 300 ml and, after cooling in a refrigerator overnight, a 91.6 gram fraction of white crystalline material (97.3 area % purity by HPLC analysis) is recovered for use in example 8, 9, 17, and 21. Both 1H and 13C nuclear magnetic resonance (NMR) spectra are consistent with the known structure.

EXAMPLE 2

PREPARATION OF 1,4-BIS(3-HYDROXYPHENOXY)BUTANE

A five neck five liter round bottom flask equipped with a mechanical stirrer, two condensers, and a dropping funnel is purged with nitrogen then charged under a nitrogen blanket with 1.5 kg (13.6 moles) resorcinol, 120 grams deionized water, and 138.75 grams (0.64 moles) 1,4-dibromobutane. The reaction slurry is slowly heated with stirring to reflux under a slow nitrogen purge; then a solution of 109 grams (1.64 moles) 85% KOH pellets in 109 grams water is added dropwise under a nitrogen blanket over a two hour period. After an additional hour of refluxing, the reaction mixture is allowed to coil enough to pour the contents into 10 liters deionized water. The water slurry is acidified with 30% sulfuric acid and allowed to stand at room temperature overnight before filtering under reduced pressure and washing with several portions of warm water. The residue, 80 grams of yellow amorphous solid, is then extracted with large quantities of boiling water to remove oils. After cooling to room temperature, the water extracts (14 liters) yield 28 grams of white, shiny platelets. HPLC analysis reveals 92% purity by peak area. Recrystallization from acetone yielded product of >98% purity by HPLC analysis with a melting point of 103° C.-106° C. (literature melting point, 105° C.-108° C.) for use in examples 10, 18 and 20. Both 1H and 13C NMR spectra are consistent with the proposed structure.

EXAMPLE 3

PREPARATION OF 1,4-BIS(4-HYDROXYPHENOXY)BUTANE

A five neck five liter round bottom flask equipped with a mechanical stirrer, two condensers, and a dropping funnel is purged with nitrogen then charged under a nitrogen blanket with 1.25 kg (11.36 moles) hydroquinone, 350 grams deionized water, and 231.25 grams (1.07 moles) 1,4-dibromobutane. The reaction mass becomes a stirable slurry as it is slowly heated to reflux under a slow nitrogen purge. A solution of 180 grams (2.7 moles) 85% KOH pellets in 180 grams water is added dropwise under a nitrogen blanket over a two hour period. After about one third of the KOH has been added, the slurry has converted to a tea colored solution; then, after most of the KOH has been added, a white material precipitates in increasing amounts as the refluxing is continued an additional hour. The reaction mixture is quenched before cooling by pouring into 6 liters deionized water. The water slurry is acidified with 30% sulfuric acid and allowed to stand at room temperature overnight before filtering under reduced pressure and washing with several portions of boiling water to remove hydroquinone. The white residue is dried in a vacuum oven at 140° C. to a weight of 240 grams. It is then taken up in 4 liters boiling MEK, treated with decolorizing carbon and filtered through a filter acid, celite, to remove particulates and colored impurities. A total of 154 grams of a white produce is recovered from a series of filtrates. Analysis by gpc shows contamination by higher molecular weight species which are much less soluble in acetone than the desired product; thus, the produce is taken up in boiling acetone, filtered, and cooled to recover 135 grams (46% yield based on the dibromobutane). HPLC analysis showed >90% purity by peak area. Another crystallization from 3 liters boiling acetone yield 116 grams of white "mica-like" crystals (melting point 202° C.-204° C.) with greater than 96% purity by HPLC peak area for use in example 11 and 22. Both 1H and 13C NMR spectra are consistent with the proposed structure.

EXAMPLE 4

PREPARATION OF 1,8-BIS(4-HYDROXYPHENOXY)OCTANE

A five neck five liter round bottom flask equipped with a mechanical stirrer, two condensers, and a dropping funnel is purged with nitrogen then charged under a nitrogen blanket with 1.1 kg (10.0 moles) hydroquinone, 350 grams deionized water, and 272.0 grams (1.0 moles) 1,8-dibromooctane. The reaction mass becomes a stirable slurry as it is slowly heated to reflux under a slow nitrogen purge. A solution of 184 grams (2.7 moles) 85% KOH pellets in 184 grams water is added dropwise under a nitrogen blanket over a period of 75 minutes. After about one third of the KOH has been added, the slurry has converted to a tea colored solution; then, after most of the KOH has been added, a white material precipitates in increasing amounts as the refluxing is continued an additional 90 minutes. The reaction mixture is quenched with one liter of water then poured into 4 liters of water. The water slurry is acidified with 30% sulfuric acid and filtered under reduced pressure. The filter cake is slurried in warm (50°-70° C.) water, filtered again and washed with several portions of boiling water. It is then dried in a vacuum oven at 120° C. and 310 grams of crude white product is recovered. The product is treated with 8 liters of boiling ethanol and filtered to remove oligomers. The filtrate yields a total of 134 grams (41% Yield based on the dibromide) of white, shiny, "mica-like" crystals more than 95% pure by HPLC peak area nd GPC analysis. A final crystallization form 1.1 liters boiling ethanol gives product more than 99% pure by HPLC peak area (m.p. 151°-153.5° C.) for use in preparation of the copolymer epoxy resin, examples 12, 14, 15, 23 and 24. The ultraviolet absorption spectrum is 30/70 (by volume) methanol/dimethylformamide (DMF) shows a maximum absorption at 297 nm and in 30/70 (by volume) 1.0N KOH in methanol/DMF at 315 nm.

EXAMPLE 5

PREPARATION OF 1,8-BIS(3-HYDROXYPHENOXY)OCTANE

A five neck five liter round bottom flask equipped with a mechanical stirrer, two condensers, and a dropping funnel is purged with nitrogen then charged under a nitrogen blanket with 1.6 kg (14.5 moles) resorcinol, 160 grams deionized water, and 296.7 grams (1.091 moles) 1,8-dibromooctane. The easily stirable reaction mass is slowly heated to reflux under a slow nitrogen purge. A solution of 181 grams (2.74 moles) 85% KOH pellets in 184 grams water is added dropwise at reflux under a nitrogen blanket over a period of two hours. After about 25% of the KOH has been added, the reaction mass has dissolved to light tea colored solution then it becomes increasingly clouded as salt is formed. The reaction mixture is refluxed an additional hour after all the KOH has been added. The pH of the reaction mixture is basic. The reaction is quenched with 1.5 liters of water and acidified with 40% sulfuric acid. The reaction mixtures is then poured into 4 liters of water, cooled in an ice bath to a temperature of 10° C. and filtered to recover a tan colored solid which is slurried in 1.2 liters boiling water to wash out resorcinol and KBr. The cooled slurry is then filtered and 350 grams of crude product is recovered. Crystallization from 400 ml acetone yield 170 grams white crystals, 88% pure by HPLC peak area, and recrystallization from 500 ml acetone yields 97.4 grams product of 96% purity by HPLC peak area and high purity by gel permeation chromatography (m.p. 78°-82° C.).

EXAMPLE 6

PREPARATION OF THE DIGLYCIDYL ETHER OF 1,8-BIS(4-HYDROXYPHENOXY)OCTANE

A one liter, five neck flask equipped with a Truebore Vacuum stirrer, a Dean Stark trap designed to replenish the flask with the more dense layer of propylene glycol methyl ether in epichlorohydrin while retaining the less dense layer of water, a glycol cooled condenser, a thermometer, and a dip tube for adding caustic solution fed by a peristaltic pump is charged with 574.4 grams of a 20 wt. % solution of propylene glycol methyl ether in epichlorohydrin (4.98 moles epichlorohydrin) and 111.02 grams (0.336 moles) of 1,8-Bis(4-hydroxyphenoxy)octane from example 4. The Dean Stark trap is filled with a 20 wt. % solution of propylene glycol methyl ether in epichlorohydrin, the system is purged with nitrogen and the reaction mixture is heated to reflux (65° C. at 170 mm Hg pressure controlled by a I2R Manostat with nitrogen bleed). Analysis by ultraviolet spectroscopy (UV) of a sample of the reaction slurry taken at this point shows 15.3 wt % diphenol (compared to 16.2 wt. % based on amounts charged). 53.76 grams of 50% aqueous caustic (0.672 moles of NaOH) is added through the dip tube at a constant rate over a one hour period at reflux (65° C. at 170 mm Hg pressure). After about 25% of the caustic has been added, the reaction mixture dissolves into a dark purple solution then it becomes increasingly clouded as NaBr is produced. Increasing amounts of water is collected in the Dean Stark trap. A sample taken near the end of caustic addition is neutral to pH test paper and shows 95% conversion of the starting diphenol. The remaining caustic along with a 5-10% excess is added over a twenty minute period and refluxing is continued another 15 minutes. The reaction mixture at this point is basic to pH test pater and it shows better than 99.8% conversion of the starting diphenol by UV analysis. The heating mantle is removed and the reaction is quenched by acidifying with $CO_2$ chips. A 300 ml portion of methylene chloride is added to the cooled, viscous reaction mass to allow filtration under reduced pressure. The filter pad is then taken up in 3.5 liters of warm methylene chloride and filtered to remove salt and insoluble materials. The methylene chloride solution is washed with three portions of 300 ml each of distilled water and is then passed through 2V filter paper twice to remove most of the resorcinol and NaBr. The clear solution is concentrated under reduced pressure and is allowed to crystallize. The white crystals (108.8 grams, m.p. 120°-122° C.) are better than 99% pure by HPLC peak are and titration reveals 18.1% epoxide (theoretical, 19.4%).

EXAMPLE 7

PREPARATION OF THE DIGLYCIDYL ETHER OF 1,8-BIS(3-HYDROXYPHENOXY)OCTANE

A one liter, five neck flask equipped with a Truebore Vacuum stirrer, a Dean Stark trap designed to replenish the flask with the more dense layer of propylene glycol methyl ether in epichlorohydrin while retaining the less dense layer of water, a glycol cooled condenser, a thermometer, and a dip tube for adding caustic solution fed by a peristaltic pump is charged with 574.4 grams of a 20 wt. % solution of propylene glycol methyl ether in epichlorohydrin (4.98 moles epichlorohydrin) and 111.02 grams (0.336 moles) of 1,8-Bis(3-hydroxyphenoxy)octane from example 5. The Dean Stark trap is filled with a 20 wt. % solution of propylene glycol methyl ether in epichlorohydrin, the system is purged with nitrogen and the reaction mixture is heated to reflux (65° C. at 170 mm Hg pressure controlled by a I2R Manostat with nitrogen bleed). Then 56 grams of 50% aqueous caustic (0.70 moles of NaOH) is added to the light yellow reaction solution through the dip tube at a constant rate over a hone hour period at reflux (65° C. at 170 mm Hg pressure). The solution darkens during caustic addition and becomes increasingly clouded as NaBr is produced. Reflux is continued an additional 30 minutes after caustic addition is completed. A sample tests neutral to pH test paper and shows better than 99.4% conversion of the starting diphenol by UV analysis. The heating mantle is removed and the reaction is quenched by acidifying with $CO_2$ chips. The cooled reaction mass is filtered under reduced pressure and the residue is taken up into boiling acetone and is filtered to remove NaBr, then the acetone is stripped under reduced pressure and a white solid is recovered. The reaction mixture filtrate is stripped of epichlorohydrin and propylene glycol methyl ether under reduced pressure and a white solid si recovered. The two portions of white solid product are taken up in 1.5 liters of methylene chloride and washed with three portions of 200 ml each of distilled water then passed through 2V filter paper twice to remove most of the suspended water, then the methylene chloride is removed by stripping under reduced pressure and the white solid product is dissolved in 450 ml hot acetone and allowed to crystallize at 10° C. The first crop of white crystals (72.3 grams) is 98.5 percent pure by HPLC peak area and titration reveals 18.36 percent epoxide. The second crop of white crystals (41.9 grams) is 92 percent pure by HPLC peak area and titration reveals 18.32 percent epoxide. The last crop of white crystals (10.4 grams) is 82 percent pure by HPLC peak are and titration reveals 18.05 percent epoxide.

EXAMPLE 8

PREPARATION OF THE DIGLYCIDYL ETHER OF 1,2-BIS(3-HYDROXYPHENOXY)ETHANE

A five liter, five neck flask equipped with a Truebore Vacuum stirrer, a Dean Stark trap designed to replenish the flask with the more dense layer of propylene glycol methyl ether in epichlorohydrin while retaining the less dense layer of water, a glycol cooled condenser, a thermometer, and a dip tube for adding caustic solution fed by a peristaltic pump is charged with 2,500 grams of a 20 wgt. % solution of propylene glycol methyl ether in epichlorohydrin (21.6 moles epichlorohydrin) and 248.2 grams (1.008 moles) of 1,2-Bis(3-hydroxyphenoxy)ethane from example 1. The Dean Stark trap is filled with a 20 wgt. % solution of propylene glycol methyl ether in epichlorohydrin, the system is purged with nitrogen and the reaction mixture is heated to reflux (65° C. at 170 mm Hg pressure controlled by a I2R Manostat with nitrogen bleed). Then 172.0 grams of 50% aqueous caustic (2.15 moles of NaOH) is added through the dip tube at a constant rate over a 1.5 hour period at reflux (65° C. at 170 mm Hg pressure). The solution darkens during caustic addition and becomes increasingly clouded as NaBr is produced. After the first 168 grams of caustic addition, a sample tests neutral to pH test paper. Reflux is continued an additional 45 minutes after adding the remainder of the caustic and a sample then tests basic to pH test paper. The heating mantle is removed and the reaction is quenched by acidifying with $CO_2$ chips. The reaction mixture is then filtered under reduced pressure to remove the salt. The filtrate is concentrated under reduced pressure to a volume of 1,500 ml, washed with three portions of 300 ml each of distilled water, then passed through 2V filter paper twice to remove most of the suspended water before stripping the remaining epichlorohydrin and propylene glycol methyl ether under reduced pressure. The solid residue is dissolved in 800 ml warm acetone and allowed to crystallize overnight. The first crop of white solid (105.2 grams, m.p. 100° C.) is 96% pure by HPLC peak area and titration reveals 23.3% epoxide (theoretical, 23.9%). The second crop of white solid (29.9 grams) is 93.5% pure by HPLC peak area and titration reveals 23.1% epoxide.

EXAMPLE 9

PREPARATION OF THE DIGLYCIDYL ETHER OF 1,8-BIS(3-HYDROXYPHENOXY)OCTANE

A five liter, five neck flask equipped with a Truebore Vacuum stirrer, a Dean Stark trap designed to replenish the flask with the more dense layer of propylene glycol methyl ether in epichlorohydrin while retaining the less dense layer of water, a glycol cooled condenser, a thermometer, and a dip tube for adding caustic solution fed by a peristaltic pump is charged with 2,500 grams of a 20 wgt. % solution of propylene glycol methyl ether in epichlorohydrin (21.6 moles epichlorohydrin) and 333.0 grams (1.008 moles) of 1,8-Bis(3-hydroxyphenoxy)octane from example 5. The Dean Stark trap is filled with a 20 wgt. % solution of propylene glycol methyl ether in epichlorohydrin, the system is purged with nitrogen and the reaction mixture is heated to reflux (65° C. at 170 mm Hg pressure controlled by a I2R Manostat with nitrogen bleed). Then 164.5 grams of 50% aqueous caustic (2.06 moles of NaOH) is added through the dip tube at a constant rate over a 1 hour and forty-five minute period at reflux (65° C. at 170 mm Hg pressure). The solution darkens during caustic addition and becomes increasingly clouded as NaBr is produced. After and additional fifteen minutes of reflux, a sample tests neutral to pH test paper. Another 4.0 grams caustic is added and refluxing is continued forty-five minutes longer. A sample then tests basic to pH test paper. The heating mantle was removed and the reaction was quenched by acidifying with $CO_2$ chips. The reaction mixture is then filtered under reduced pressure to remove the salt. The filtrate is then stripped of most of the epichlorohydrin and propylene glycol methyl ether under reduced pressure and 2.5 liters methylene chloride is added. The resulting solution is washed with three portion of 300 ml each of distilled water, then passed through 2V filter paper twice to remove most of the suspended water before stripping the methylene chloride and the remaining epichlorohydrin and propylene glycol methyl ether under reduced pressure. The light brown liquid product is dissolved in 1.2 liters warm acetone and allowed to crystallize overnight in a refrigerator. The first crop of white solid (331 grams, m.p. 75° to 80° C.) is 94% pure by HPLC peak area and titration reveals 18.3% epoxide (theoretical, 19.4%. The second crop of white solid (46.5 grams) is 89% pure by HPLC peak area and titration reveals 18.3% epoxide.

EXAMPLE 10

PREPARATION OF POLY(BISPHENOL A) ETHER OF ETHYLENE GLYCOL

A five liter, five neck flask equipped with with two reflux condensers, an addition funnel, and an air driven stirrer shaft is charged with 136.7 grams (2.12 moles of 87% pure KOH pellets and 1.4 liters ethanol. The system is purged with nitrogen while the mixture is borough into solution with stirring. The reactor is then charged with 1,368 grams (6.0 moles) bisphenol A (polycarbonate grade) under a nitrogen stream, then it is heated to reflux before 159.7 grams (0.85 moles) ethylene dibromide in 100 mls ethanol is added from the addition funnel in a rapid dropwise fashion. The reaction mixture is refluxed twenty hours, then most of the ethanol is distilled out before adding 1.5 liters toluene which is used to distill out the remaining ethanol as an azeotrope with toluene. The toluene is replenished occasionally to maintain a reaction volume of about 3 liters. The reaction mixture is neutralized with aqueous HCl and water is removed as an azeotrope with toluene through a Dean Stark trap. The reaction mixture is filtered hot by gravity filtration, then the salt residue is washed with more hot toluene and the filtrates are combined (207 grams of KBr is recovered). After standing overnight at room temperature, the clear toluene solution is decanted off from crystallized bisphenol A and the toluene is stripped under reduced pressure. The solid residue, 111 grams, is dissolved in hot methylene chloride, and after standing at room temperature several hours some of the excess bisphenol A crystallizes. The mixture is filtered and the filtrate is stripped under reduced pressure giving 84 grams of a white solid with 8.027% phenol OH determined by UV analysis. HPLC analsis shown about 24% by peak area of unreacted bisphenol A. Another 79 grams of product with 7.878% phenolic OH containing about 24% bisphenol A by HPLC peak area is extracted from the crystallized bisphenol A fractions by recrystallizing from toluene, removing the crystals, stripping the toluene filtrate, dissolving the residue in hot methylene chloride, removing the bisphenol A crystals and stripping the methylene chloride. Finally, another 80 grams of product with 8.353% phenolic OH containing about 33% unreacted bisphenol A is extracted from the recrystallized fractions of bisphenol A by recrystallizing from methylene chloride, removing the bisphenol A crystals, concentrating the filtrate by 50% and removing another crop of bisphenol A crystals, then stripping the methylene chloride under reduced pressure.

EXAMPLE 11

PREPARATION OF THE DIGLYCIDYL ETHER OF POLY(BISPHENOL A) ETHER OF ETHYLENE GLYCOL

A one liter, five neck flask equipped with a Truebore Vacuum stirrer, a Dean Stark trap designed to replenish the flask with the more dense layer of propylene glycol methyl ether in epichlorohydrin while retaining the less dense layer of water, a glycol cooled condenser, a thermometer, and a dip tube for adding caustic solution fed by a peristaltic pump is charged with 574.4 grams of a 20 wgt. % solution of propylene glycol methyl ether in epichlorohydrin (4.98 moles epichlorohydrin) and 81.4 grams (0.20 moles) of the poly(bisphenol A) ether of ethylene glycol (8.353% phenolic OH) from example 45529-32. The Dean Stark trap is filled with a 20 wgt. % solution of propylene glycol methyl ether in epichlorohydrin, the system is purged with nitrogen and the reaction mixture is heated to reflux (65° C. at 180 mm Hg pressure controlled by a $I^2R$ Manostat with nitrogen bleed). Then 37.5 grams of 50% aqueous caustic (0.47 moles of NaOH) is added through the dip tube at a constant rate over a 1.5 hour period at reflux (65° C. at 180 mm Hg pressure). Fifteen minutes after the first 34 grams of caustic addition, a sample tests neutral to pH test paper. The remaining caustic is added and a sample taken fifteen minutes later tests basic to pH test paper. The heating mantle is removed and the reaction was quenched by acidifying with $CO_2$ chips. The reaction mixture is then filtered warm under reduced pressure to remove the salt and methylene chloride is added to a total volume of 1 liter. The solution is washed with three portions of 200 ml each of distilled water, then passed through 2V filter paper twice to remove most of the suspended water before stripping under reduced pressure to give 100 grams of a clear, yellow, viscous oil. A final stripping at 150° C. with a nitrogen bleed at 10 to 20 mm Hg pressure gives 99.6 grams product with a EEW of 236.173.

EXAMPLE 12

PREPARATION OF POLY(BISPHENOL F) ETHER OF ETHYLENE GLYCOL

A five liter, five neck flask equipped with with two reflux condensers, an addition funnel, and a air driven stirrer shaft is charged with 122.4 grams (1.90 moles) of 87% pure KOH pellets and 1.6 liters ethanol. The system is purged with nitrogen while the mixture is brought into solution with stirring. The reactor is then charged with 400 grams (2.0 moles) bisphenol F under a nitrogen stream, then it is heated to reflux before 150.2 grams (0.80 moles) ethylene dibromide in 200 mls ethanol is added from the addition funnel in a rapid dropwise fashion. The reaction mixture is refluxed forty-eight hours, then neutralized with aqueous HCl, and filtered warm under reduced pressure. The gummy residue is extracted with boiling methylene chloride and the ethanol filtrate is stripped under reduced pressure and the resulting residue is extracted with boiling methylene chloride. The methylene chloride extracts are stripped under reduced pressure and the brown gummy residue is treated with several portions of boiling water totaling 2 liters. The cooled water fractions yield white crystals of the para isomer of bisphenol F. The gummy reside is dissolved in 2 liters boiling methylene chloride, and a water layer is removed. After standing overnight at room temperature, 40.6 grams of brown crystals of bisphenol F are recovered by filtration. The filtrate is stripped under reduced pressure and 186 grams of a brown, tacky product with 11.1% phenolic OH determined by titration in pyridine with tetrabutyl ammonium hydroxide (F. E. Critchfield, "Organic Functional Group Analysis", MacMillian, N.Y. pp. 32 and 33, 1963) is recovered. HPLC analsis shows about 60% by peak area of unreacted bisphenol F.

EXAMPLE 13

PREPARATION OF POLY(BISPHENOL F) ETHER OF ETHYLENE GLYCOL

A five liter, five neck flask equipped with with two reflux condensers, an addition funnel, and a air driven stirrer shaft is charged with 122.4 grams (1.90 moles) of 87% pure KOH pellets and 1.6 liters ethanol. The system is purged with nitrogen while the mixture is brought into solution with stirring. The reactor is then charged with 400 grams (2.0 moles) bisphenol F under a nitrogen stream, then it is heated to reflux before 150.2 grams (0.80 moles) ethylene dibromide in 200 mls ethanol is added from the addition funnel in a rapid dropwise fashion. The reaction mixture is refluxed forty-eight hours, then neutralized with 130 mls 10% aqueous HCl. After cooling to room temperature, the reaction mixture is decanted from the salt and concentrated by distillation to 750 mls. More salt is removed and the reaction mixture is concentrated to 700 mls before it is added 1.5 liters of water and a gummy layer forms. The aqueous mixture is boiled 3 to 5 minutes, the water is decanted off and the water washing is repeated twice more. The residue is then treated with 3 liters hot methylene chloride and a gummy residue is removed by gravity filtration. After standing at room temperature overnight, 45.6 grams of brown crystals of bisphenol F are recovered by filtration. The filtrate is stripped under reduced pressure and 257 grams of brown tacky material with 10.7% phenolic OH determined by titration in pyridine with tetrabutyl ammonium hydroxide (F. E. Critchfield, "Organic Functional Group Analysis", MacMillian, N.Y. pp. 32 and 33, 1963) is recovered. HPLC analsis shows about 66% by peak area of unreacted bisphenol F.

EXAMPLE 14

PREPARATION OF THE DIGLYCIDYL ETHER OF POLY(BISPHENOL F) ETHER OF ETHYLENE GLYCOL

A one liter, five neck flask equipped with a Truebore Vacuum stirrer, a Dean Stark trap designed to replenish the flask with the more dense layer of propylene glycol methyl ether in epichlorohydrin while retaining the less dense layer of water, a glycol cooled condenser, a thermometer, and a dip tube for adding caustic solution fed by a peristaltic pump is charged with 574.4 grams of a 20 wgt. % solution of propylene glycol methyl ether in epichlorohydrin (4.98 moles epichlorohydrin) and 91.8 grams (0.30 moles) of the poly(bisphenol F) ether of ethylene glycol (11.1% phenolic OH) from example 46361-6. The Dean Stark trap is filled with a 20 wgt. % solution of propylene glycol methyl ether in epichlorohydrin, the system is purged with nitrogen and the reaction mixture is heated to reflux (65° C. at 180 mm Hg pressure controlled by a I$^2$R Manostat with nitrogen bleed). Then 49.6 grams of 50% aqueous caustic (0.62 moles of NaOH) is added through the dip tube at a constant rate over a forty-five minute period at reflux (65° C. at 180 mm Hg pressure). The reaction mixture is cooked another fifty minutes and a sample tests only slightly basic pH test paper. The heating mantle is removed and the reaction is quenched by acidifying with $CO_2$ chips. The reaction mixture is then filtered warm under reduced pressure to remove the salt which is washed with methylene chrome. The filtrates are then stripped under reduced pressure and the remaining yellow-brown viscous liquid is dissolved in 1.2 liters methylene chloride which is then washed with three portion of 200 ml each of distilled water. The methylene chloride solution is then passed through 2V filter paper until clear to remove most of the water. The methylene chloride is removed under reduced pressure and the product is stripped of traces of epichlorohydrin at 150° C. with a nitrogen bleed at 10 to 20 mm Hg pressure to give 127 grams produce with a EEW of 228.6.

EXAMPLE 15

PREPARATION OF ADVANCED EPOXY RESIN FROM 1,2-BIS(3-HYDROXYPHENOXY)ETHANE AND DIGLYCIDYL ETHER OF BISPHENOL A

A three-neck 250 ml round bottom flask equipped with a condenser, a thermometer, and an air driven steel stirrer shaft is charged with 113.17 grams of the diglycidyl ether of bisphenol A having an epoxy equivalent weight (EEW) of 180.6, and heated to about 90° C. under a nitrogen purge of 20 ml/min. then, 66.49 grams (0.270 moles) 1,2-bis(3-hydroxyphenoxy)ethane prepared in example 1 is added and dispersed well before adding 0.25 grams of a 70% by weight solution of ethyltriphenyl phosphonium acetate-acetic acid as a catalyst. The temperature is increased over a 45 minute period to 190° C. At that point the reaction exotherms, so the mantle is removed and a stream of cooling air is directed at the flask. The reaction temperature peaks at 197° C. The reaction mixture is cooked at 185° C. for only a few minutes before quickly pouring out the relatively viscous contents on a sheet of aluminum foil to cool. The EEW of the final product is 2,443.

EXAMPLE 16

PREPARATION OF ADVANCED EPOXY RESIN FROM 1,2-BIS(3-HYDROXYPHENOXY)ETHANE AND DIGLYCIDYL ETHER OF BISPHENOL A

A three-neck 250 ml round bottom flask equipped with a condenser, a thermometer, and an air driven steel stirrer shaft is charged with 130.58 grams of the diglycidyl ether of bisphenol A having an EEW of 180.6, and 74.57 grams (0.3028 moles ) 1,2-Bis(3-hydroxyphenoxy)ethane prepared in example 1, then heated to about 90° C. under a nitrogen purge of 220 ml/min. before adding 0.286 grams of a 70% by weight solution of ethyltriphenyl phosphonium acetate-acetic acid complex catalyst in methanol. The temperature is increased over a one hour period to 190° C. At that point the reaction exotherms, so the mantle is removed and a stream of cooling air is directed at the flask. The reaction temperature peaks at 191° C. The reaction mixture is cooked at 185° C. for only another 45 minutes then quickly heated to 210° C. before quickly pouring out the relatively viscous contents on a sheet of aluminum foil to cool. Samples are removed at 15, 30, and 45 minutes after the reaction temperature reaches 190° C. to determine extend of reaction and the EEW (epoxide equivalent weight) of each is 1894, 1955, and 1972 respectively, and the final EEW is 2019.

EXAMPLE 17

PREPARATION OF ADVANCED EPOXY RESIN FROM 1,4-BIS(3-HYDROXYPHENOXY)ETHANE AND DIGLYCIDYL ETHER OF BISPHENOL A

A three-neck 250 ml round bottom flask equipped with a condenser, a thermometer, and an air driven steel stirrer shaft is charged with 130.58 grams of the diglycidyl ether of bisphenol A having an EEW of 180.6, and heated to about 90° C. under a nitrogen purge of 220 ml/min. Then, 83.12 grams (0.303 moles) 1,4-Bis(3-hydroxyphenoxy)butane prepared in example 2 is added and dispersed well before adding 0.286 grams of a 70% by weight solution of ethyltriphenyl phosphonium acetate-acetic acid complex catalyst in methanol. The temperature is increased over a 70 minute period to 190° C. At that point the reaction exotherms, so the mantle is removed and a stream of cooling air is directed at the flask. The reaction temperature peaks at 196° C. The reaction mixture is cooked at 185° C. for nearly 30 minutes before quickly heating to 210° C. and pouring out the relatively viscous contents on a sheet of aluminum foil to cool. Samples are removed at 15 minutes and thirty minutes after the beginning of the exotherm to determine extent of reaction and the EEW's of each is 2098 and 2108 respectively and the final EEW is 2118.

EXAMPLE 18

PREPARATION OF ADVANCED EPOXY RESIN FROM 1,4-BIS(4-HYDROXYPHENOXY)BUTANE AND DIGLYCIDYL ETHER OF BISPHENOL A

A three-neck 250 ml round bottom flask equipped with a condenser, a thermometer, and an air driven steel stirrer shaft is charged with 130.58 grams of the diglycidyl ether of bisphenol A having an EEW of 180.6, and heated to about 100° C. under a nitrogen purge of 200 ml/min. Then, 83.12 grams (0.303 moles) 1,4-Bis(4-hydroxyphenoxy)butane prepared in example 3 is added and dispersed well before adding 0.286 grams of a 70% by weight solution of ethyltriphenyl phosphonium acetate-acetic acid complex catalyst in methanol. The temperature is increased over a one hour period to 190° C. The reaction mixture is cooked at about 185° C. for another 90 minutes before quickly heating to 210° C. and pouring out the relatively viscous contents on a sheet of aluminum foil to cool. Samples are removed at 15, 30, 60, and 90 minutes after the peak temperature of 190° C. to determine extent of reaction and the EEW's of the first three are 1587, 1599, and 1617 respectively and the final EEW is 1706.

19

PREPARATION OF ADVANCED EPOXY RESIN FROM 1,8-BIS-(4-HYDROXYPHENOXY)OCTANE AND DIGLYCIDYL ETHER OF BISPHENOL A

A three-neck 250 ml round bottom flask equipped with a condenser, a thermometer, and an air driven steel stirrer shaft is charged with 113.86 grams of the diglycidyl ether of bisphenol A having an EEW of 180.6, and 88.14 grams (0.267 moles) 1,8-Bis(4-hydroxyphenoxy)octane prepared in example 4. The mixture is heated with stirring to about 120° C. to obtain a well mixed slurry. After cooling to about 90° C., 0.572 grams of a 70% by weight solution of ethyltriphenyl phosphonium acetate-acetic acid complex catalyst in methanol is added under a nitrogen purge of 200 ml/min. The temperature is increased over a fifty minute period to 190° C. The reaction mixture is cooled for another hour at 185° to 195° C. before quickly heating to 200° C. and pouring out the contents on sheet of aluminum foil to cool. Samples are removed at 15, 30, and 60 minutes after the peak temperature of 190° C. to determine extent of reaction by measuring the EEW's which are 2067, 2077, and 2118 respectively. The final EEW is 2139.

20

PREPARATION OF EPOXY RESIN FROM 1,4-BIS-(4-HYDROXYPHENOXY)BUTANE AND DIGLYCIDYL ETHER OF BISPHENOL A

A three-neck 250 ml round bottom flask equipped with a condenser, a thermometer, and an air driven steel stirrer shaft is charged with 130.58 grams of the diglycidyl ether of bisphenol A having an EEW of 180.6, and 83.12 grams (0.303 moles) 1,4-Bis(4-hydroxyphenoxy)butane prepared in example 3. The mixture is heated with stirring to about 81° C. before adding 0.572 grams of a 70% by weight solution of ethyltriphenyl phosphonium acetal/acetic acid complex catalyst in methanol under a nitrogen purge of 200 ml/min. The temperature is increased over a fifty-three minute period to 190° C. The reaction mixture is cooked for another two hours at about 185° C., then another 0.572 grams of the catalyst solution is added and the reaction is continued another hour at 185° C. before pouring out the contents on a sheet of aluminum foil to cool.

21

PREPARATION OF EPOXY RESIN FROM 1,4-BIS-(4-HYDROXYPHENOXY)BUTANE AND DIGLYCIDYL ETHER OF BISPHENOL A

A three-neck 250 ml round bottom flask equipped with a condenser, a thermometer, and an air driven steel stirrer shaft is charged with 130.58 grams of the diglycidyl ether of bisphenol A having an EEW of 180.6, and 83.12 grams (0.303 moles) 1,4-Bis(4-hydroxyphenoxy)butane prepared in example 3. The mixture is heated with stirring to about 85° C. before adding 0.572 grams of a 70% by weight solution of ethyltriphenyl phosphonium acetal/acetic acid complex catalyst in methanol under a nitrogen purge of 200 ml/min. The temperature is increased over a thirty-five minute period to 190° C. The reaction mixture is cooked for another hour at about 183° C. before pouring out the contents on a sheet of aluminum foil to cool. The EEW of the product is 1560.

EXAMPLE 22

PREPARATION OF ADVANCED EPOXY RESIN FROM 1,8-BIS(4-HYDROXYPHENOXY)OCTANE AND THE DIGLYCIDYL ETHER OF BISPHENOL A

A three-neck 250 milliliter round bottom flask equipped with a condenser, a thermometer, and an air driven steel stirrer shaft is charged with 113.86 grams (0.630 equiv.) of a diglycidyl ether of bisphenol A having an epoxy equivalent weight (EEW) of 180.6 and 88.14 grams (0.267 moles) 1,8-Bis(4-hydroxyphenoxy)octane. The rector contents are heated to 105° C. Then 0.572 grams of a 70% by weight solution of ethyltriphenylphosphonium acetal-acetic acid complex in methanol catalyst is added to the well dispersed mixture. The temperature is increased over a 24 minute period to 150° C. At that point the reaction exotherms to 185° C. Then the reactor contents are heated to 190° C. Samples are removed at fifteen minutes, thirty minutes and one hour to determine the extent of the reaction after the reactor contents are heated to 190° C.

The corresponding epoxide equivalent weights of the samples are 2028, 2047, and 2067, respectively. The final EEW is 2087.

EXAMPLE 23

PREPARATION OF EPOXY RESIN FROM 1,8-BIS(3-HYDROXYPHENOXY)OCTANE AND DIGLYCIDYL ETHER OF BISPHENOL A

A three-neck 250 ml round bottom flask equipped with a condenser, a thermometer, and an air driven steel stirrer shaft is charged with 56.45 grams of the diglycidyl ether of bisphenol A having an EEW of 180.6, and 43.41 grams (0.1313 moles) 1,8-Bis(3-hydroxyphenoxy)octane prepared as in example 5 and recrystallized from acetone to a purity of 93% by HPLC peak area. The mixture is heated with stirring to about 75° C. before adding 0.143 grams of a 70% by weight solution of ethyltriphenyl phosphonium acetal/acetic acid complex catalyst in methanol under a nitrogen purge of 200 ml/min. temperature is increased over a sixty-six minute period to 180° C. then it is cooked over a twenty minute period at 185° C. before pouring out the contents on a sheet of aluminum foil to cool. The EEW of the resultant advanced epoxy resin is 2057.

EXAMPLE 24

PREPARATION OF EPOXY RESIN FROM 1,8-BIS(3-HYDROXYPHENOXY)OCTANE AND DIGLYCIDYL ETHER OF BISPHENOL A

A three-neck 250 ml round bottom flask equipped with a condenser, a thermometer, and an air driven steel stirrer shaft is charged with 57.21 grams of the diglycidyl ether of bisphenol A having an EEW of 180.6, and 42.64 grams (0.129 moles) 1,8-Bis(3-hydroxyphenoxy)octane prepared as in example 5 and recrystallized from acetone to a purity of 93% by HPLC peak area. The mixture is heated with stirring to about 90° C. before adding 0.0700 grams of a 70% by weight solution of ethyltriphenyl phosphonium acetate/acetic acid complex catalyst in methanol under a nitrogen purge of 200 ml/min. The temperature is increased over a forty-six minute period to 187° C. then cooked at that temperature another thirty-nine minutes before pouring out the contents on a sheet of aluminum foil to cool. Samples are removed at 15 and 30 minutes after the peak temperature of 187° C. is reached to determine extent of reaction by measuring the EEW's which are 1770 and 1784 respectively. The final EEW is 1799.

EXAMPLE 25

PREPARATION OF EPOXY RESIN FROM 1,8-BIS(3-HYDROXYPHENOXY)OCTANE AND DIGLYCIDYL ETHER OF BISPHENOL A

A three-neck 250 ml round bottom flask equipped with a condenser, a thermometer, and an air driven steel stirrer shaft is charged with 57.21 grams of the diglycidyl ether of bisphenol A having an EEW of 180.6, and 42.64 grams (0.129 moles) 1,8-Bis(3-hydroxyphenoxy)octane prepared as in example 5 and recrystallized from acetone to a purity of 93% by HPLC peak area. The mixture is heated with stirring to about 90° C. before adding 0.0700 grams of a 70% by weight solution of ethyltriphenyl phosphonium acetate/acetic acid complex catalyst in methanol under a nitrogen purge of 200 ml/min. The temperature is increased over a thirty minute period to 120° C. then over a ten minute period to 150° C. The reaction mixture is cooked for another thirty-five minutes at 146° to 150° C. before pouring out the contents on a sheet of aluminum foil to cool. Samples are removed when the temperature reaches 120° C. and 150° C. and at 15 and 35 minutes after the peak temperature of 150° C. is reached to determine extent of reaction by measuring the EEW's which are 338, 459, 843, and 1654 respectively.

EXAMPLE 26

PREPARATION OF EPOXY RESIN FROM 1,8-BIS(3-HYDROXYPHENOXY)OCTANE AND DIGLYCIDYL ETHER OF BISPHENOL A a three-neck 250 ml round bottom flask equipped with a condenser, a thermometer, and an air driven steel stirrer shaft is charged with 57.21 grams of the diglycidyl ether of bisphenol A having an EEW of 180.6, and 42.64 grams (0.129 moles) 1,8-Bis(3-hydroxyphenoxy) octane prepared as in Example 5 and recrystallized from acetone to a purity of 93% by HPLC peak area. The mixture is heated with stirring to about 90° C. before adding 0.0700 grams of a 70% by weight solution of ethyltriphenyl phosphonium acetate/acetic acid complex catalyst in methanol under a nitrogen purge of 200 ml/min. The temperature is increased over an eleven minute period to 120° C. then over a five minute period to 130° C. The reaction peaks briefly at 150° C. and is then cooked at 120° to 130° C. before pouring out the contents on a sheet of aluminum foil to cool fifty minutes after the temperature first reaches 120° C. Samples are removed when the temperature first reaches 120° C. and at 5, 20, and 35 minutes thereafter to determine the extent of reaction by measuring the EEW's which are 350, 399, 753, and 1049 respectively. The final EEW is 1509.

EXAMPLE 27

PREPARATION OF EPOXY RESIN FROM 1,8-BIS(3-HYDROXYPHENOXY)OCTANE AND DIGLYCIDYL ETHER OF BISPHENOL A

A three-neck 250 ml round bottom flask equipped with a condenser, a thermometer, and an air driven steel stirrer shaft is charged with 57.21 grams of the diglycidyl ether of bisphenol A having a EEW of 180.6, and 42.64 grams (0.129 moles) 1,8-Bis(3-hydroxyphenoxy)

octane prepared as in example 5 and recrystallized from acetone to a purity of 93% by HPLC peak area. The mixture is heated with stirring to about 90° before adding 0.0700 grams of a 70% by weight solution of ethyltriphenyl phosphonium acetate/acetic acid complex catalyst in methanol under a nitrogen purge of 200 ml/min. The temperature is increased over a fifteen minute period to 120° C. then over a seven minute period to 140° C. The reaction mixture is cooked for another thirty-eight minutes at 140° C. before pouring out the contents on a sheet of aluminum foil to cool. Samples are removed when the temperature reaches 140° C. and at 15, 30, and 38 minutes after the temperature reaches 140° C. to determine extent of reaction by measuring the EEW's which are 329, 779, 1433, and 1604 respectively.

EXAMPLE 28

PREPARATION OF ADVANCED EPOXY RESIN FROM THE DIGLYCIDYL ETHER OF BISPHENOL A AND 1,8-BIS(3-HYDROXYPHENOXY)OCTANE

An aluminum pan is charged with 5.06 grams (0.0280 epoxy equiv.) of a diglycidyl ether of bisphenol A having an EEW of 180.6, and 3.60 grams (0.0 moles) 1,8-Bis(3-hydroxyphenoxy)octane from example 5. The pan is then heated on a hotplate at 130° to 140° C. to effect a homogeneous melt of the reactants. Two drops of a 70% by weight solution of ethyltriphenyl phosphonium acetate/acetic acid complex catalyst in methanol is added with stirring and the temperature of the hotplate is increased to 200° C. The viscosity increases and the aluminum pan is removed from the hot plate 20 minutes after the addition of catalyst. The EEW of the resultant advanced epoxy resin is 1300.

COMPARATIVE EXPERIMENT A

PREPARATION OF ADVANCED EPOXY RESIN FROM THE DIGLYCIDYL ETHER OF BISPHENOL A AND BISPHENOL A

A three-neck 250 round bottom flask equipped with a condenser, a thermometer, and an air driven steel stirrer shaft is charged with 113.86 grams (0.63 epoxy equiv.) of a diglycidyl ether of bisphenol A having an EEW of 180.6, and 60.90 grams (0.267 moles, 0.534 OH equiv.) of bisphenol A, then heated to about 90° C. under a nitrogen purge of 200 ml/min. before adding 0.250 grams of a 70% by weight solution of ethyltriphenylphosphonium acetate.acetic acid complex catalyst in methanol. The temperature is increased over an one hour period to 190° C. At that point the reaction exothermed, so the mantle is removed and a stream of cooling air is directed at the flask. The reaction temperature peaks at 197° C. The reaction mixture is cooked at 185° C. for another hour and is then quickly heated to 210° C. before quickly pouring out the contents on a sheet of aluminum foil to cool. The EEW of the resultant advanced epoxy resin is 1955.

COMPARATIVE EXAMPLE B

PREPARATION OF ADVANCED EPOXY RESIN FROM THE DIGLYCIDYL ETHER OF BISPHENOL A AND BISPHENOL A

A three-neck 250 ml round bottom flask equipped with a thermocouple and an air driven steel stirrer shaft is charged with 130.6 grams (0.72 equiv.) of a diglycidyl ether of bisphenol A having an EEW of 180.66, and 69.1 grams (0.303 moles, 0.606 OH equiv.) of bisphenol A, then heated with stirring under a nitrogen purge of 200 ml/min to about 85° C. before adding 0.286 grams of a 70% by weight solution of ethyltriphenyl phosphonium acetate/acetic acid complex catalyst in methanol. The temperature is increased over a forty-five minute period to 190° C. At that point the reaction exothermed, so the heating mantle is removed and a stream of cooling air is directed at the flask. The reaction temperature peaks at 194° C. The reaction mixture is cooked at 185° C. for another hour and is then quickly heated to 210° C. before quickly pouring out the contents on a sheet of aluminum foil to cool. The EEW of the resultant advanced epoxy resin is 1845.

COMPARATIVE EXAMPLE C

PREPARATION OF ADVANCED EPOXY RESIN FROM THE DIGLYCIDYL ETHER OF BISPHENOL A AND BISPHENOL A

A five-neck 1000 round bottom flask equipped with a thermometer and an air driven steel stirrer shaft is charged with 420.37 grams (2.328 equiv.) of a diglycidyl ether of bisphenol A having an EEW of 180.6, and 228.70 grams (1.002 moles, 2.004 OH equiv.) of bisphenol A, then heated with stirring under a nitrogen purge of 200 ml/min to about 85° C. before adding 0.93 grams of a 70% by weight solution of ethyltriphenyl phosphonium acetate/acetic acid complex catalyst in methanol. The temperature is increased over a forty-eight minute period to 190° C. At that point the reaction exothermed, so the heating mantle is removed and a stream of cooling air is directed at the flask. The reaction temperature peaks at 195° C. The reaction mixture is cooked at 183° C. for another hour before quickly pouring out the contents on a sheet of aluminum foil to cool. The EEW of the resultant advanced epoxy resin is 2349. Samples are removed 15 minutes and thirty minutes after the peak temperature is reached to determine extent of reaction by measuring the EEW's which are 2118 and 2150 respectively. The final EEW is 2183.

The advanced epoxy resins of Examples 15 through 28 and comparative experiments A, B and C are represented by Formula A.

The characteristics of these resins are provided in Table I.

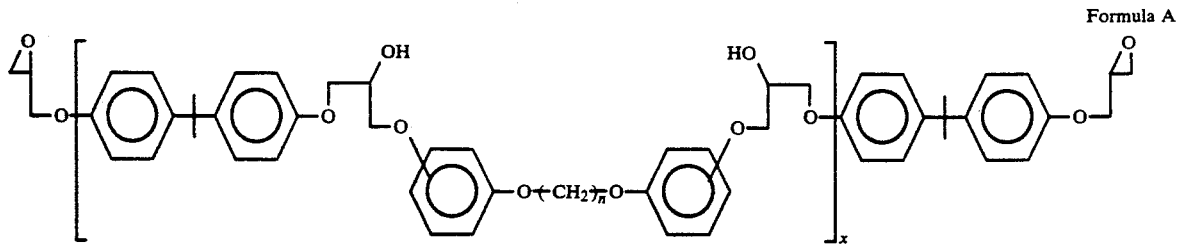

Formula A

TABLE I

| Expt. No. | Advanced Resin Empolyed Type | EEW | Values of n | $x^b$ | Isomer$^c$ | Viscosity Gardner 25° C. | Cone and Plate 200° C. cps | Pa.s | Tge °C. | Mw$^f$ |
|---|---|---|---|---|---|---|---|---|---|---|
| A*4 | C.E.B$^g$ | 1,845 | N/A$^d$ | N/A$^d$ | N/A$^d$ | Z2.5 | ND$^a$ | ND$^a$ | 80 | 12,028 |
| B* | C.E.C$^h$ | 2,183 | N/A$^d$ | N/A$^d$ | N/A$^d$ | Z3.5 | ND$^a$ | ND$^a$ | 83 | 10,193 |
| C* | C.E.A$^i$ | 1,955 | N/A$^d$ | N/A$^d$ | N/A$^d$ | Z2− | 13,000 | 13 | 81 | 12,934 |
| D | Ex. 15 | 2,443 | 2 | 7.8 | m, m' | ND$^a$ | ND$^a$ | ND$^a$ | 59 | 47,381 |
| E | Ex. 16 | 2,019 | 2 | 6.3 | m, m' | Z4.5 | 13,500 | 13.5 | 61 | 22,630 |
| F | Ex. 17 | 2,118 | 4 | 6.3 | m, m' | Z2− | 10,250 | 10.25 | 54 | 21,674 |
| G | Ex. 18 | 1,706 | 4 | 5.0 | p, p' | Z1.5 | ND$^a$ | ND$^a$ | 53 | 11,413 |
| H | Ex. 19 | 2,139 | 8 | 5.9 | p, p' | Z4− | 5,500 | 5.5 | 41 | 14,937 |
| I | Ex. 20 | ND$^a$ | 4 | ND$^a$ | p, p' | Z1.5 | 5,190 | 5.19 | 54 | 12,473 |
| J | Ex. 21 | 1,560 | 4 | 4.5 | p, p' | ND$^a$ | 3,250 | 3.25 | 50 | 10,857 |
| K | Ex. 22 | 2,087 | 8 | 5.7 | p, p' | ND$^a$ | ND$^a$ | ND$^a$ | ND$^a$ | 14,356 |
| L | Ex. 23 | 2,057 | 8 | 5.6 | m, m' | ND$^a$ | ND$^a$ | ND$^a$ | 40.7 | 69,501 |
| M | Ex. 24 | 1,799 | 8 | 4.8 | m, m' | ND$^a$ | ND$^a$ | ND$^a$ | 42 | 65,444 |
| N | Ex. 25 | 1,654 | 8 | 4.4 | m, m' | ND$^a$ | 8,000 | 8 | 41 | 28,692 |
| O | Ex. 26 | 1509 | 8 | 4.0 | m, m' | ND$^a$ | 3,750$^j$ | 3.75$^j$ | <30 | 7,039 |
| P | Ex. 27 | 1,604 | 8 | 4.3 | m, m' | ND$^a$ | 23,000$^j$ | 23$^j$ | 39 | 18,102 |
| Q | Ex. 28 | 1,300 | 8 | 3.4 | m, m' | ND$^a$ | ND$^a$ | ND$^a$ | ND$^a$ | ND$^a$ |

Footnotes to Table 1.
*Not an example of the present invention.
$^a$Not Determined.
$^b$x = ((2 × EEW) − 340.4)/Formula Weight of repeating unit.
$^c$m = meta, p = para.
$^d$Not Applicable.
$^e$Glass transition temperature determined by differential scanning calorimetry (DSC).
$^f$Weight average molecular weight by gel permeation chromatography (GPC) calibrated to polystyrene standards.
$^g$The diglycidyl ether of bisphenol A advanced with bisphenol A having an EEW of 1845.
$^h$The diglycidyl ether of bisphenol A advanced with bisphenol A having an EEW of 2183.
$^i$The diglycidyl ether of bisphenol A advanced with bisphenol A having an EEW of 1955.
$^j$Cone and plate viscosity at 150° C.

EXAMPLE 29

PREPARATION OF EPOXY RESIN FROM 1,8-BIS(4-HYDROXYPHENOXY)OCTANE AND THE DIGLYCIDYL ETHER OF 1,8-BIS(4-HYDROXYPHENOXY)OCTANE

An aluminum pan is charged with 6.38 grams (0.0268 epoxide equivalents) of the diglycidyl ether from example 6 and 3.60 grams (0.011 moles) of 1,8-Bis(4-hydroxyphenoxy)octane from example 4. The pan is then heated on a hot plate at 130° to 140° C. to effect a homogeneous melt of the reactants. Four drops of a 70% by weight solution of ethyltriphenyl phosphonium acetate.acetic acid complex catalyst in methanol is added with stirring and the temperature of the hot plate is increased to 195° C. to 205° C. The viscosity increases and the aluminum pan is removed from the hot plate 15 minutes after the addition of catalyst. The opaque, tan colored, brittle solid product is insoluble in methylene chloride, and soluble in hot (100° C.) 2-butoxyethanol and hot (100° C.) cyclohexanone.

EXAMPLE 30

PREPARATION OF EPOXY RESIN FROM 1,8-BIS(4-HYDROXYPHENOXY)OCTANE AND A 1/1 MOLAR MIXTURE OF THE DIGLYCIDYL ETHER OF 1,8-BIS(4-HYDROXYPHENOXY)OCTANE AND DIGLYCIDYL ETHER OF BISPHENOL A

An aluminum pan is charged with 3.19 grams (0.0134 epoxide equivalents) of the diglycidyl ether from example 6 and 2.53 grams (0.014 epoxide equivalents) of diglycidyl ether of bisphenol A having an EEW of 180.6 and 3.60 grams (0.011 moles) of 1,8-Bis(4-hydroxyphenoxy)octane from example 4. The pan is then heated on a hot plate at 130° to 140° C. to effect a homogeneous melt of the reactants. Four drops of a 70% by weight solution of ethyltriphenyl phosphonium acetate.acetic acid complex catalyst in methanol is added with stirring and the temperature of the hot plate is increased to 195° C. to 205° C. The viscosity increases and the aluminum pan is removed from the hot plate 15 minutes after the addition of catalyst. The opaque, tan colored, brittle solid product is swelled by methylene chloride, and soluble in hot (100° C.) 2-butoxyethanol and hot (100° C.) cyclohexanone.

EXAMPLE 31

PREPARATION OF EPOXY RESIN FROM 1,8-BIS(4-HYDROXYPHENOXY)OCTANE AND DIGLYCIDYL ETHER OF BISPHENOL A

An aluminum pan is charged with 5.06 grams (0.028 epoxide equivalents) of the diglycidyl ether of bisphenol A having an EEW of 180.6 and 3.60 grams (0.001 moles) of 1,8-Bis(4-hydroxyphenoxy)octane from example 4. The pan is then heated on a hot plate at 130° C. to 140° C. to effect a homogeneous melt of the reactants. Four drops of a 70% by weight solution of ethyltriphenyl phosphonium acetate.acetic acid complex catalyst in methanol is added with stirring and the temperature of the hot plate is increased to 200° C. to 220° C. The viscosity increases and the aluminum pan is removed from the hot plate 10 minutes after the addition of catalyst. The clear, brittle solid product is soluble in methylene chloride, 2-butoxyethanol, and cyclohexanone and has an EEW of 1280.

EXAMPLE 32

PREPARATION OF EPOXY RESIN FROM BISPHENOL A AND THE DIGLYCIDYL ETHER OF 1,8-BIS(4-HYDROXYPHENOXY)OCTANE

An aluminum pan is charged with 6.38 grams (0.0268 epoxide equivalents) of the diglycidyl ether of 1,8-bis(4-hydroxyphenoxy)octane from example 6 and 2.51 grams (0.011 moles) bisphenol A. The pan is then heated on a hot plate at 130° C. to 140° C. to effect a homogeneous melt of the reactants. Four drops of a 70% by weight solution of ethyltriphenyl phosphonium acetate.acetic acid complex catalyst in methanol is added with stirring and the temperature of the hot plate is increased to 200° C. to 220° C. The viscosity increases and the aluminum pan is removed from the hot plate 10 minutes after the addition of catalyst. The clear, brittle solid product is slightly soluble in methylene chloride, and soluble in cyclohexanone, hot (100° C.) 2-butoxyethanol, and a 40/60 mixture by weight of cyclohexanone/2-butoxyethanol and has an EEW of 1822.

EXAMPLE 33

PREPARATION OF EPOXY RESIN FROM 1,2-BIS(3-HYDROXYPHENOXY)ETHANE AND THE DIGLYCIDYL ETHER OF 1,8-BIS(4-HYDROXYPHENOXY)OCTANE

An aluminum pan is charged with 6.76 grams (0.028 epoxide equivalents) of the diglycidyl ether of 1,8bis(4-hydroxyphenoxy)octane from example 6 and 2.71 grams (0.011 moles) 1,2-bis(3-hydroxyphenoxy)ethane from example 1. The pan is then heated on a hot plate at 130° C. to 140° C. to effect a homogeneous melt of the reactants. One drop of a 70% by weight solution of ethyltriphenyl phosphonium acetate.acetic acid complex catalyst in methanol is added with stirring and the temperature of the hot plate is increased to 200° C. to 220° C. The viscosity increases and the aluminum pan is removed from the hot plate 7 minutes after the addition of catalyst. The opaque, brittle solid product is not soluble in methylene chloride, but it is soluble in hot 2-butoxyethanol. It is also soluble in warm (50° C.) cyclohexanone and a warm (50° C.) 40.60 mixture by weight of cyclohexanone/2-butoxyethanol, but only slightly soluble in these two solvents at room temperature.

EXAMPLE 34

PREPARATION OF EPOXY RESIN FROM 1,4-BIS(3-HYDROXYPHENOXY)BUTANE AND THE DIGLYCIDYL ETHER OF 1,8-BIS(4-HYDROXYPHENOXY)OCTANE

An aluminum pan is charged with 6.76 grams (0.028 epoxide equivalents) of the diglycidyl ether of 1,8-bis(4-hydroxyphenoxy)octane from example 6 and 3.01 grams (0.011 moles) 1,4-Bis(3-hydroxyphenoxy)butane from example 2. The pan is then heated on a hot plate at 1300° to 140° C. to effect a homogeneous melt of the reactants. One drop of a 70% by weight solution of ethyltriphenyl phosphonium acetate.acetic acid complex catalyst in methanol is added with stirring and the temperature of the hot plate is increased to 200° C. to 220° C. The viscosity increases and the aluminum pan is removed from the hot plate 15 minutes after the addition of catalyst. The opaque, brittle solid product is swelled by methylene chloride, but it is soluble in hot (100° C.) 2-butoxyethanol. It is also soluble in cyclohexanone at room temperature and a warm (50° C.) 40/60 mixture by weight of cyclohexanone/2-butoxyethanol, but only slightly soluble in the latter solvent mix at room temperature.

EXAMPLE 35

PREPARATION OF EPOXY RESIN FROM 1,8-BIS(3-HYDROXYPHENOXY)OCTANE AND THE DIGLYCIDYL ETHER OF 1,8-BIS(4-HYDROXYPHENOXY)OCTANE

An aluminum pan is charged with 6.76 grams (0.028 epoxide equivalents) of the diglycidyl either of 1,8-bis(4-hydroxyphenosy)octane) from example 6 and 3.63 grams (0.011 moles), 1,8-Bis-(3-hydroxyphenoxy)octane from example 5. The pan is then heated on a hot plate at 130° C. to 140° C. to effect a homogeneous melt of the reactants. One drop of a 70% by weight solution of ethyltriphenyl phosphonium acetate.acetic acid complex catalyst in methanol is added with stirring and the temperature of the hot plate is increased to 200° C. to 220° C. The viscosity increases and the aluminum pan is removed from the hot plate 15 minutes after the addition of catalyst. The opaque, brittle solid product is slightly soluble in methylene chloride and soluble in hot (100° C.) 2-butoxyethanol. It is also soluble in cyclohexanone at room temperature and a warm (50° C.) 40/60 mixture by weight of cyclohexanone/2-butoxyethanol, but only slightly soluble in the latter solvent mix at room temperature.

EXAMPLE 36

PREPARATION OF EPOXY RESIN FROM 1,4-BIS(3-HYDROXYPHENOXY)BUTANE AND THE DIGLYCIDYL ETHER OF BISPHENOL F

An aluminum pan is charged with 5.96 grams (0.034 epoxide equivalents) of the diglycidyl ether of Bisphenol F and 4.02 grams (0.0147 moles) 1,4-Bis(3-hydroxyphenoxy)butane from example 2. The pan is then heated on a hot plate to effect a homogeneous melt of the reactants. Two drops of a 70% by weight solution of ethyltriphenyl phosphonium acetate.acetic acid complex catalyst in methanol is added with stirring and the temperature of the hot plate is increased to 200° C. to 220°

C. The viscosity increases and the aluminum pan is removed from the hot plate 15 minutes after the addition of catalyst. The clear, brittle solid is soluble in methylene chloride and in hot (100° C.) 2-butoxyethanol. It is also soluble in cyclohexanone and in a 40/60 mixture by weight of cyclohexanone/2-butoxyethanol at room temperature. The product has an EEW of 1563, and a Tg of 43° C. is determined on the product by Differential Scanning Calorimetry.

EXAMPLE 37

PREPARATION OF EPOXY RESIN FROM 1,2-BIS(3-HYDROXYPHENOXY)ETHANE AND THE DIGLYCIDYL ETHER OF BISPHENOL F

An aluminum pan is charged with 6.20 grams (0.0358 epoxide equivalents) of the diglycidyl ether of Bisphenol F and 3.78 grams (0.0154 moles) 1,2-Bis(3-hydroxyphenoxy)ethane from example 1. The pan is then heated on a hot plate to effect a homogeneous melt of the reactants. Two drops of a 70% by weight solution of ethyltriphenyl phosphonium acetate.acetic acid complex catalyst in methanol is added with stirring and the temperature of the hot plate is increased to 200° C. to 220° C. The viscosity increases and the aluminum pan is removed from the hot plate 15 minutes after the addition of catalyst. The clear, brittle solid product is swelled by methylene chloride and is slightly soluble in hot (100° C.) 2-butoxyethanol. It is also soluble in cyclohexanone and in 40/60 cyclohexanone/2-butoxyethanol at room temperature. The product has an EEW of 2129, and a Tg of 54° C. is determined for the product by Differential Scanning Calorimetry.

EXAMPLE 38

PREPARATION OF EPOXY RESIN FROM 1,4-BIS(4-HYDROXYPHENOXY)BUTANE AND THE DIGLYCIDYL ETHER OF BISPHENOL F

An aluminum pan is charged with 5.96 grams (0.0344 epoxide equivalents) of the diglycidyl ether of Bisphenol F and 4.02 grams (0.0147 moles) 1,4-Bis(4-hydroxyphenoxy)butane from example 3. The pan is then heated on a hot plate to effect a homogeneous melt of the reactants. Three drops of a 70% by weight solution of ethyltriphenyl phosphonium acetate.acetic acid complex catalyst in methanol is added with stirring and the temperature of the hot plate is increased to 200° C. to 220° C. The viscosity increases and the aluminum pan is removed from the hot plate 15 minutes after the addition of catalyst. The clear, brittle solid product is soluble in methylene chloride and in hot (100° C.) 2-butoxyethanol. It is also soluble in cyclohexanone and in a 40/60 mixture by weight of cyclohexanone/2-butoxyethanol at room temperature. The product has an EEW of 1581, and a Tg of 42° C. is determined for the product of Differential Scanning Calorimetry.

EXAMPLE 39

PREPARATION OF EPOXY RESIN FROM 1,8-BIS(4-HYDROXYPHENOXY)OCTANE AND THE DIGLYCIDYL ETHER OF BISPHENOL F

An aluminum pan is charged with 5.53 grams (0.0319 epoxide equivalents) of the diglycidyl ether of Bisphenol F and 4.44 grams (0.0134 moles) 1,8-Bis(4-hydroxyphenoxy)octane from example 4. The pan is then heated on a hot plate to effect a homogeneous melt of the reactants. Three drops of a 70% by weight solution of ethyltriphenyl phosphonium acetate.acetic acid complex catalyst in methanol is added with stirring and the temperature of the hot plate is increased to 200° C. to 220° C. The viscosity increases and the aluminum pan is removed from the hot plate 15 minutes after the addition of catalyst. The clear, brittle solid product is soluble in methylene chloride and in warm (50° C.) 2-butoxyethanol. It is also soluble in cyclohexanone and in a 40/60 mixture by weight of cyclohexanone/2-butoxyethanol at room temperature. The product has an EEW of 1514.

EXAMPLE 40

PREPARATION OF EPOXY RESIN FROM 1,8-BIS(4-HYDROXYPHENOXY)OCTANE AND A 1/1 MOLAR MIXTURE OF THE DIGLYCIDYL ETHER OF 1,8-BIS(4-HYDROXYPHENOXY)OCTANE AND OF BISPHENOL F

An aluminum pan is charged with 3.19 grams (0.0134 epoxide equivalents) of the diglycidyl ether of 1,8-bis(4-hydroxyphenoxy)octane from example 6 and 2.53 grams (0.014 epoxide equivalents) of the diglycidyl ether of Bisphenol F and 3.60 grams (0.011 moles) of 1,8-Bis(4-hydroxyphenoxy)octane from example 4. The pan is then heated on a hot plate at 130° C. to 140° C. to effect a homogeneous melt of the reactants. Three drops of a 70% by weight solution of ethyltriphenyl phosphonium acetate.acetic acid complex catalyst in methanol is added with stirring and the temperature of the hot plate is increased to 195° C. to 250° C. The viscosity increases and the aluminum pan is removed from the hot plate 15 minutes after the addition of catalyst. The moderately opaque, tan colored, brittle solid product is swelled by methylene chloride, and soluble in hot (100° C.) 2-butoxyethanol and warm cyclohexanone. It is slightly soluble in warm (50° C.) 2-butoxyethanol and in cyclohexanone at room temperature. It is also slightly soluble in a warm (50° C.) 40/60 mixture by weight of cyclohexanone/2-butoxyethanol.

EXAMPLE 41

PREPARATION OF EPOXY RESIN FROM 1,8-BIS(4-HYDROXYPHENOXY)OCTANE AND THE DIGLYCIDYL ETHER OF BISPHENOL F

An aluminum pan is charged with 11.06 grams (0.0638 epoxide equivalents) of the diglycidyl ether of Bisphenol F and 8.88 grams (0.0269 moles) 1,8-Bis(4-hydroxyphenoxy)octane from example 4. The pan is then heated on a hotplate to about 130° C. to 140° C. to effect a homogeneous melt of the reactants. Six drops of a 70% by weight solution of ethyltriphenyl phosphonium acetate/acetic acid complex catalyst in methanol is added with stirring and the temperature of the hotplate is increased to 190° to 210° C. The viscosity increases and the aluminum pan is removed from the hotplate 18 minutes after the addition of catalyst. The clear, brittle solid is soluble in methylene chloride and in warm 2-butoxyethanol. It is also soluble in cyclohexanone and in 40/60 cyclohexanone/2-butoxyethanol at room temperature. An epoxide equivalent weight of 1853 is determined by a standard epoxide titration method.

EXAMPLE 42

PREPARATION OF EPOXY RESIN FROM 1,8-BIS(3-HYDROXYPHENOXY)OCTANE AND THE DIGLYCIDYL ETHER OF 1,8-BIS(3-HYDROXYPHENOXY)OCTANE

A three-neck 240 ml round bottom flask equipped with a thermocouple and an air driven steel stirrer shaft is charged with 64.31 grams of the diglycidyl ether of 1,8-Bis(3-hydroxyphenoxy)octane having an EEW of 234.75 prepared in example 50-32, and 35.55 grams (0.1076 moles) 1,8Bis(3-hydroxyphenoxy)octane prepared as in example 5 and recrystallized from acetone to a purity of 93% by HPLC peak area. The mixture is heated with stirring to about 100° C. to melt the reactants, then cooled to 80° C. before adding 0.100 grams of a 70% by weight solution of ethyltriphenyl phosphonium acetate/acetic acid complex catalyst in methanol under a nitrogen purge of 200 ml/min. The temperature is increased over a one hour and eleven minute period to 185° C. and cooked for another forth-eight minutes at 185° C. before pouring out the contents on a sheet of aluminum foil to cool. The EEW of the product is 1853.

EXAMPLE 43

PREPARATION OF EPOXY RESIN FROM 1,8-BIS(3-HYDROXYPHENOXY)OCTANE AND THE DIGLYCIDYL ETHER OF 1,8-BIS(3-HYDROXYPHENOXY)OCTANE

A three-neck 250 ml round bottom flask equipped with a thermocouple and an air driven steel stirrer shaft is charged with 64.31 grams of the diglycidyl ether of 1,8-bis(3-hydroxyphenoxy)octane having an EEW of 234.75 prepared in example 50-32, and 35.55 grams (0.1076 moles) 1,8-Bis(3-hydroxyphenoxy)octane prepared as in example 5 and recrystallized from acetone t a purity of 93% by HPLC peak area. The mixture is heated with stirring to about 80° C. before adding 0.070 grams of a 70% by weight solution of ethyltriphenyl phosphonium acetate/acetic acid complex catalyst in methanol under a nitrogen purge of 200 ml/min. The temperature is increased over a thirty-one minute period to 120° C. then over a nineteen minute period to 150° C. The reaction mixture is cooked for another forty-five minutes at 130° C. before pouring out the contents on a sheet of aluminum foil to cool. Samples are removed when the temperature reaches 120° C. and at zero, 15, 30, and 45 minutes after the peak temperature of 150° C. is reached to determine extent of reaction by measuring the EEW's which are 415, 789, 1378, 1598, and 1713 respectively.

EXAMPLE 44

PREPARATION OF EPOXY RESIN FROM 1,2-BIS(3-HYDROXYPHENOXY)ETHANE AND THE DIGLYCIDYL ETHER OF 1,8-BIS(3-HYDROXYPHENOXY)OCTANE

A three-neck 250 ml round bottom flask equipped with a thermocouple and an air driven steel stirrer shaft is charged with 70.25 grams of the diglycidyl ether of 1,8-Bis(3-hydroxyphenoxy)octane having an EEW of 234.75 prepared in example 50-32, and 29.61 grams 1,2-Bis(3-hydroxyphenoxy)ethane from example 1. The mixture is heated with stirring to about 85° C. before adding 0.0700 grams of a 70% by weight solution of ethyltriphenyl phosphonium acetate/acetic acid complex catalyst in methanol under a nitrogen purge of 200 ml/min. The temperature is increased over a thirty minute period to 120° C. then over a seven minute period to 140° C. The reaction mixture is cooked for another forty-six minutes at 135° to 140° C. before pouring out the contents on a sheet of aluminum foil to cool. Samples are removed when the temperature reaches 120° C. and at zero, 15, 30, and 46 minutes after the peak temperature of 140° C. is reached to determine extent of reaction by measuring the EEW's which are 448, 991, 1706, 1838, and 1902 respectively.

EXAMPLE 45

PREPARATION OF EPOXY RESIN FROM 1,2-BIS(3-HYDROXYPHENOXY)ETHANE AND THE DIGLYCIDYL ETHER OF 1,2-BIS(3-HYDROXYPHENOXY)ETHANE

A three-neck 250 ml round bottom flask equipped with a thermocouple and an air driven steel stirrer shaft is charged with 64.74 grams of the diglycidyl ether of 1,2-Bis(3-hydroxyphenoxy)ethane having an EEW of 186.3 prepared in example 50-38, and 35.11 grams 1,2-Bis(3-hydroxyphenoxy)ethane from example 1. The mixture is heated with stirring to about 85° C. before adding 0.0700 grams of a 70% by weight solution of ethyltriphenyl phosphonium acetate/acetic acid complex catalyst in methanol under a nitrogen purge of 200 ml/min. The temperature is increased over a fifteen minute period to 120° C. then over a six minute period to 135° C. The reaction mixture is cooked for another thirty minutes at 135° C. before pouring out the contents on a sheet of aluminum foil to cool. Samples are removed when the temperature reaches 120° C. and at zero, 15, and 30 minutes after the peak temperature of 135° C. is reached to determine extent of reaction by measuring the EEW's which are 341, 435, 840, and 1784 respectively.

EXAMPLE 46

PREPARATION OF ADVANCED EPOXY RESIN FROM THE DIGLYCIDYL ETHER OF BISPHENOL A AND POLY(BISPHENOL A) ETHER OF ETHYLENE GLYCOL

A three-neck 250 ml round bottom flask equipped with a thermocouple and an air driven steel stirrer shaft is charged with 50.815 grams (0.281 equiv.) of a diglycidyl ether of bisphenol A having an EEW of 180.6, and 49.042 grams (0.1158 moles, 0.2316 OH equiv., 8.0266% OH) of poly(bisphenol A) ether of ethylene glycol prepared in example 45529-32, then heated with stirring under a nitrogen purge of 200 ml/min to about 80° C. before adding 0.143 grams of a 70% by weight solution of ethyltriphenyl phosphonium acetate/acetic acid complex catalyst in methanol. The temperature is increased over a twenty-nine minute period to 185° C. and held at that temperature for one hour before quickly pouring out the contents on a sheet of aluminum foil to cool. A sample is removed when the peak temperature of 185° C. is reached to determine extent of reaction by measuring the EEW which is 2905. The EEW of the resultant advanced epoxy resin is 3805.

EXAMPLE 47

PREPARATION OF ADVANCED EPOXY RESIN FROM THE DIGLYCIDYL ETHER OF BISPHENOL A AND POLY(BISPHENOL A) ETHER OF ETHYLENE GLYCOL

An aluminum pan is charged with 7.559 grams (0.0444 epoxy equiv.) of a diglycidyl ether of bisphenol A having an EEW of 180.6, and 7.420 grams (0.0172 moles, 0.0344 OH equiv., 7.878% OH) of poly(bisphenol A) ether of ethylene glycol prepared in example 45529-32. The pan is then heated on a hotplate at 130° to 140° C. to effect a homogeneous melt of the reactants. Four drops of a 70% by weight solution of ethyltriphenyl phosphonium acetate/acetic acid complex catalyst in methanol is added with stirring and the temperature of the hotplate is increased to 200° C. The viscosity increases and the aluminum pan is removed from the hot plate 30 minutes after the addition of catalyst. The EEW of the resultant advanced epoxy resin is 2299.

EXAMPLE 48

PREPARATION OF ADVANCED EPOXY RESIN FROM THE DIGLYCIDYL ETHER OF BISPHENOL A AND POLY(BISPHENOL A) ETHER OF ETHYLENE GLYCOL

An aluminum pan is charged with 7.622 grams (0.0422 epoxy equiv.) of a diglycidyl ether of bisphenol A having an EEW of 180.6, and 7.356 grams (0.0174 moles, 0.0347 OH equiv., 8.0266% OH) of poly(bisphenol A) ether of ethylene glycol prepared in example 45529-32. The pan is then heated on a hotplate at 130° to 140° C. to effect a homogeneous melt of the reactants. Four drops of a 70% by weight solution of ethyltriphenyl phosphonium acetate/acetic acid complex catalyst in methanol is added with stirring and the temperature of the hotplate is increased to 200° C. The viscosity increases and the aluminum pan is removed from the hot plate 15 minutes after the addition of catalyst. The EEW of the resultant advanced epoxy resin is 1945.

EXAMPLE 49

PREPARATION OF ADVANCED EPOXY RESIN FROM THE DIGLYCIDYL ETHER OF BISPHENOL A AND POLY(BISPHENOL A) ETHER OF ETHYLENE GLYCOL

An aluminum pan is charged with 8.354 grams (0.0491 epoxy equiv.) of a diglycidyl ether of bisphenol A having an EEW of 180.6, and 6.624 grams (0.0190 moles, 0.0380 OH equiv., 9.74% OH) of poly(bisphenol A) ether of ethylene glycol prepared as in example 45529-32. The pan is then heated on a hotplate at 130° to 140° C. to effect a homogeneous melt of the reactants. Then 0.0215 grams of a 70% by weight solution of ethyltriphenyl phosphonium acetate/acetic acid complex catalyst in methanol is added with stirring and the temperature of the hotplate is increased to 200° C. The viscosity increases and the aluminum pan is removed from the hot plate 45 minutes after the addition of catalyst. The EEW of the resultant advanced epoxy resin is 1268.

EXAMPLE 50

PREPARATION OF ADVANCED EPOXY RESIN FROM THE DIGLYCIDYL ETHER OF BISPHENOL A AND POLY(BISPHENOL A) ETHER OF ETHYLENE GLYCOL

An aluminum pan is charged with 8.670 grams (0.0480 epoxy equiv.) of a diglycidyl ether of bisphenol A having an EEW of 180.6, and 6.309 grams (0.0198 moles, 0.0397 OH equiv., 10.7% OH) of poly(bisphenol A) ether of ethylene glycol prepared as in example 45529-32. The pan is then heated on a hotplate at 130° to 140° C. to effect a homogeneous melt of the reactants. Then 0.0215 grams of a 70% by weight solution of ethyltriphenyl phosphonium acetate/acetic acid complex catalyst in methanol is added with stirring and the temperature of the hotplate is increased to 200° C. The viscosity increases and the aluminum pan is removed from the hot plate 30 minutes after the addition of catalyst. The EEW of the resultant advanced epoxy resin is 1000.

EXAMPLE 51

PREPARATION OF ADVANCED EPOXY RESIN FROM THE DIGLYCIDYL ETHER OF BISPHENOL A AND POLY(BISPHENOL A) ETHER OF ETHYLENE GLYCOL

An aluminum pan is charged with 7.559 grams (0.0444 epoxy equiv.) of a diglycidyl ether of bisphenol A having an EEW of 180.6, and 7.420 grams (0.0172 moles, 0.0344 OH equiv., 7.878% OH) of poly(bisphenol A) ether of ethylene glycol prepared in example 45529-32. The pan is then heated on a hotplate at 130° to 140° C. to effect a homogeneous melt of the reactants. Four drops of a 70% by weight solution of ethyltriphenyl phosphonium acetate/acetic acid complex catalyst in methanol is added with stirring and the temperature of the hotplate is increased to 200° C. The viscosity increases and the aluminum pan is removed from the hot plate 15 minutes after the addition of catalyst. The EEW of the resultant advanced epoxy resin is 2019.

EXAMPLE 52

PREPARATION OF ADVANCED EPOXY RESIN FROM THE DIGLYCIDYL ETHER OF POLY(BISPHENOL A) ETHER OF ETHYLENE GLYCOL AND POLY(BISPHENOL A) ETHER OF ETHYLENE GLYCOL

An aluminum pan is charged with 8.4543 grams (0.0358 epoxy equiv.) of the diglycidyl ether of poly(-bisphwol A) ether of ethylene glycol prepared in example 45529-41 having an EEW of 236.173, and 6.5243 grams (0.0154 moles, 0.0308 OH equiv., 8.0266% OH) of poly(bisphenol A) ether of ethylene glycol prepared in example 45529-32. The pan is then heated on a hotplate at 130° to 140° C. to effect a homogeneous melt of the reactants. Four drops of a 70% by weight solution of ethyltriphenyl phosphonium acetate/acetic acid complex catalyst in methanol is added with stirring and the temperature of the hotplate is increased to 200° C. The viscosity increases and the aluminum pan is removed from the hot plate 15 minutes after the addition of catalyst. The EEW of the resultant advanced epoxy resin is 2986.

EXAMPLE 53

PREPARATION OF ADVANCED EPOXY RESIN FROM THE DIGLYCIDYL ETHER OF POLY(BISPHENOL A) ETHER OF ETHYLENE GLYCOL AND POLY(BISPHENOL A) ETHER OF ETHYLENE GLYCOL

An aluminum pan is charged with 8.7332 grams (0.0370 epoxy equiv.) of the diglycidyl ether of poly(bisphenol A) ether of ethylene glycol prepared in example 4529-41 having an EEW of 236.173, and 6.2456 grams (0.0148 moles, 0.0295 OH equiv., 8.0266% OH) of poly(bisphenol A) ether of ethylene glycol prepared in example 45529-32. The pan is then heated on a hotplate at 130° to 140° C. to effect a homogeneous melt of the reactants. Four drops of a 70% by weight solution of ethyltriphenyl phosphonium acetate/acetic acid complex catalyst in methanol is added with stirring and the temperature of the hotplate is increased to 200° C. The viscosity increases and the aluminum pan is removed from the hot plate 20 minutes after the addition of catalyst. The EEW of the resultant advanced epoxy resin is 2515.

EXAMPLE 54

PREPARATION OF ADVANCED EPOXY RESIN FROM THE DIGLYCIDYL ETHER OF POLY(BISPHENOL A) ETHER OF ETHYLENE GLYCOL AND BISPHENOL F

A three-neck 250 ml round bottom flask equipped with a thermocouple and an air driven steel stirrer shaft is charged with 71.16 grams (0.3013 epoxide equiv.) of a diglycidyl ether of poly(bisphenol A) ether of ethylene glycol prepared in example 45529-41 having an EEW of 236.173, and 28.70 grams (0.1433 moles, 0.2867 OH equiv.) of bisphenol F, then heated with stirring under a nitrogen purge of 200 ml/min to about 65° C. before adding 0.143 grams of a 70% by weight solution of ethyltriphenyl phosphonium acetate/acetic acid complex catalyst in methanol. The temperature is increased over a thirty minute period to 130° C. and held at that temperature four minutes before quickly pouring out the contents on a sheet of aluminum foil to cool. The EEW of the resultant advanced epoxy resin is 3872.

EXAMPLE 55

PREPARATION OF EPOXY RESIN FROM 1,8-BIS(3-HYDROXYPHENOXY)OCTANE AND THE DIGLYCIDYL ETHER OF BISPHENOL F

An aluminum pan is charged with 11.06 grams (0.0638 epoxide equivalents) of the diglycidyl ether of Bisphenol F and 8.88 grams (0.0269 moles) 1,8-Bis(3-hydroxyphenoxy)octane from example 5. The pan is then heated on a hotplate to about 130° to 140° C. to effect a homogeneous melt of the reactants. Six drops of a 70% by weight solution of ethyltriphenyl phosphonium acetate/acetic acid complex catalyst in methanol is added with stirring and the temperature of the hotplate is increased to 190° to 210° C. The viscosity increases and the aluminum pan is removed from the hotplate 17 minutes after the addition of catalyst. The clear, brittle solid is soluble in methylene chloride and in warm 2-butoxyethanol. It is also soluble in cyclohexanone and in 40/60 cyclohexanone/2-butoxyethanol at room temperature. An epoxide equivalent weight of 1861 is determined by a standard epoxide titration method.

EXAMPLE 56

PREPARATION OF EPOXY RESIN FROM 1,8-BIS(4-HYDROXYPHENOXY)OCTANE AND THE DIGLYCIDYL ETHER OF 1,8-BIS(3-HYDROXYPHENOXY)OCTANE

An aluminum pan is charged with 6.34 grams (0.0271 epoxide equivalents) of the diglycidyl ether from example 7 (18.36% epoxide) and 3.64 grams (0.011 moles) 1,8-Bis(3-hydroxyphenoxy)octane from example 4. The pan is then heated on a hotplate at 130° to 140° C. to effect a homogeneous melt of the reactants. Two drops of a 70% by weight solution of ethyltriphenyl phosphonium acetate/acetic acid complex catalyst in methanol is added with stirring and the temperature of the hotplate is increased to 200° C. The viscosity increases and the aluminum pan is removed from the hot plate 20 minutes after the addition of catalyst. The clear, rubber-like product has an EEW of 1593 and is slightly soluble in methylene chloride.

COMPARATIVE EXPERIMENT D

PREPARATION OF ADVANCED EPOXY RESIN FROM THE DIGLYCIDYL ETHER OF BISPHENOL A AND BISPHENOL F

A three-neck 250 ml round bottom flask equipped with a thermocouple and an air driven steel stirrer shaft is charged with 113.17 grams (0.627 epoxide equiv.) of a diglycidyl ether of bisphenol A having an EEW of 180.6, and 54.06 grams (0.270 moles, 0.540 OH equiv.) of bisphenol F, then heated with stirring under a nitrogen purge of 200 ml/min to 85° C. before adding 0.25 grams of a 70% by weight solution of ethyltriphenyl phosphonium acetate/acetic acid complex catalyst in methanol. The temperature is increased over a thirty-seven minute period to 190° C. At that point the reaction exotherms up to a peak temperature of 195° C., so the heating mantle is removed and a stream of cooling air is directed at the flask. The reaction mixture is cooked at 185° C. until one hour after the reaction temperature first reaches 190° C., then it is quickly heated to 210° C. before quickly pouring out the contents on a sheet of aluminum foil to cool. The EEW of the resultant advanced epoxy resin is 2205.

COMPARATIVE EXPERIMENT E

PREPARATION OF ADVANCED EPOXY RESIN FROM THE DIGLYCIDYL ETHER OF BISPHENOL A AND BISPHENOL F

A three-neck 250 ml round bottom flask equipped with a thermocouple and an air driven steel stirrer shaft is charged with 135.34 grams (0.749 epoxide equiv.) of a diglycidyl ether of bisphenol A having an EEW of 180.6, and 64.66 grams (0.323 moles, 0.646 OH equiv.) of bisphenol F, then heated with stirring under a nitrogen purge of 200 ml/min to 89° C. before adding 0.286 grams of a 70% by weight solution of ethyltriphenyl phosphonium acetate/acetic acid complex catalyst in methanol. The temperature is increased over a forty minute period to 190° C. At that point the reaction exotherms up to a peak temperature of 198° C., so the heating mantle is removed and a stream of cooling air is directed at the flask. The reaction mixture is cooked at 185° C. until one hour after the reaction temperature first reaches 190° C., then it is quickly heated to 210° C. before quickly pouring out the contents on a sheet of aluminum foil to cool. The EEW of the resultant advanced epoxy resin is 2263.

COMPARATIVE EXPERIMENT F

PREPARATION OF ADVANCED EPOXY RESIN FROM THE DIGLYCIDYL ETHER OF BISPHENOL A AND BISPHENOL A

A three-neck 250 ml round bottom flask equipped with a thermometer and an air driven steel stirrer shaft is charged with 129.53 grams (0.717 equiv.) of a diglycidyl ether of bisphenol A having an EEW of 180.6, and 70.47 grams (0.309 moles, 0.618 OH equiv.) of bisphenol A, then heated with stirring under a nitrogen purge of 200 ml/min to 85° C. before adding 0.286 grams of a 70% by weight solution of ethyltriphenyl phosphonium acetate/acetic acid complex catalyst in methanol. The temperature is increased over a forty-five minute period to 190° C. At that point the reaction exothermed, so the heating mantle is removed and a stream of cooling air is directed at the flask. The reaction temperature peaks at 196° C. The reaction mixture is cooked at 185° C. and is then quickly heated to 210° C. before quickly pouring out the contents on a sheet of aluminum foil to cool thirty minutes after the temperature of 190° C. is reached. The EEW of the resultant advanced epoxy resin is 2139.

COMPARATIVE EXPERIMENT G

PREPARATION OF ADVANCED EPOXY RESIN FROM THE DIGLYCIDYL ETHER OF BISPHENOL A AND BISPHENOL A

A three-neck 250 ml round bottom flask equipped with a thermocouple and an air driven steel stirrer shaft is charged with 128.7 grams (0.71 equiv.) of a diglycidyl ether of bisphenol A having an EEW of 180.6, and 71.0 grams (0.311 moles, 0.622 OH equiv.) of bisphenol A, then heated with stirring under a nitrogen purge of 200 ml/min to about 85° C. before adding 0.286 grams of a 70% by weight solution of ethyltriphenyl phosphonium acetate/acetic acid complex catalyst in methanol. The temperature is increased over a forty-one minute period to 190° C. At that point the reaction exothermed, so the heating mantle is removed and a stream of cooling air is directed at the flask. The reaction temperature peaks at 195° C. The reaction mixture is cooked at 185° C. for another hour and is then quickly heated to 210° C. before quickly pouring out the contents on a sheet of aluminum foil to cool. The EEW of the resultant advanced epoxy resin is 2349.

COMPARATIVE EXPERIMENT H

PREPARATION OF ADVANCED EPOXY RESIN FROM THE DIGLYCIDYL ETHER OF BISPHENOL A AND BISPHENOL A

A three-neck 250 ml round bottom flask equipped with a thermocouple and an air driven steel stirrer shaft is charged with 65.99 grams (0.352 equiv.) of a diglycidyl ether of bisphenol A having an EEW of 187.36, and 33.87 grams (0.1484 moles, 0.297 OH equiv.) of bisphenol A, then heated with stirring under a nitrogen purge of 200 ml/min to about 80° C. before adding 0.143 grams of a 70% by weight solution of ethyltriphenyl phosphonium acetate/acetic acid complex catalyst in methanol. The temperature is increased over a thirty-seven minute period to 176° C., then cooked an additional thirty minutes at 175° C. and quickly heated to 210° C. before quickly pouring out the contents on a sheet of aluminum foil to cool. Samples are removed at the peak temperature of 176° C. and 15 minutes after the peak temperature to determine extent of reaction by measuring the EEW's which are 1920 and 1991 respectively. The final EEW is 2038.

COMPARATIVE EXPERIMENT I

PREPARATION OF ADVANCED EPOXY RESIN FROM THE DIGLYCIDYL ETHER OF BISPHENOL A AND BISPHENOL A

A three-neck 250 ml round bottom flask equipped with a thermocouple and an air driven steel stirrer shaft is charged with 65.98 grams (0.352 equiv.) of a diglycidyl ether of bisphenol A having an EEW of 187.31, and 33.88 grams (0.1484 moles, 0.297 OH equiv.) of bisphenol A, then heated with stirring under a nitrogen purge of 200 ml/min to 80° C. before adding 0.143 grams of a 70% by weight solution of ethyltriphenyl phosphonium acetate/acetic acid complex catalyst in methanol. The temperature is increased over a twenty-seven minute period to 175° C., then cooked an additional thirty minutes at 175° C. and quickly heated to 210° C. before quickly pouring out the contents on a sheet of aluminum foil to cool. Samples are removed when the peak temperature of 175° C. is reached and 15 minutes after the peak temperature is reached to determine extent of reaction by measuring the EEW's which are 1748 and 1830 respectively. The final EEW is 1861.

COMPARATIVE EXPERIMENT J

PREPARATION OF ADVANCED EPOXY RESIN FROM THE DIGLYCIDYL ETHER OF BISPHENOL F AND BISPHENOL F

A three-neck 250 ml round bottom flask equipped with a thermocouple and an air driven steel stirrer shaft is charged with 66.472 grams (0.383 equiv.) of a diglycidyl ether of bisphenol F having an EEW of 173.39, and 33.385 grams (0.1667 moles, 0.3334 OH equiv.) of bisphenol F, then heated with stirring under a nitrogen purge of 200 ml/min to 85° C. before adding 0.143 grams of a 70% by weight solution of ethyltriphenyl phosphonium acetate/acetic acid complex catalyst in methanol. The temperature is increased over a fourteen minute period to 200° C., then cooked one hour at 185° C. before quickly pouring out the contents on a sheet of aluminum foil to cool. A sample is removed when the peak temperature of 200° C. is reached to determine extent of reaction by measuring the EEW which is 1741. The final EEW is 2139.

COMPARATIVE EXPERIMENT K

PREPARATION OF ADVANCED EPOXY RESIN FROM THE DIGLYCIDYL ETHER OF BISPHENOL F AND BISPHENOL F

A three-neck 250 ml round bottom flask equipped with a thermocouple and an air driven steel stirrer shaft is charged with 66.472 grams (0.383 equiv.) of a diglycidyl ether of bisphenol F having an EEW of 173.39, and 33.385 grams (0.1667 moles, 0.3334 OH equiv.) of bisphenol F, then heated with stirring under a nitrogen purge of 200 ml/min to 80° C. before adding 0.143 grams of a 70% by weight solution of ethyltriphenyl phosphonium acetate/acetic acid complex catalyst in methanol. The temperature is increased over a thirteen minute period to 135° C., then cooked another twenty-nine minutes at 130° C. before quickly pouring out the contents on a sheet of aluminum foil to cool. A sample is removed when the peak temperature of 135° C. is reached to determine extent of reaction by measuring the EEW which is 1734. The final EEW is 2150.

COMPARATIVE EXPERIMENT L

PREPARATION OF ADVANCED EPOXY RESIN FROM THE DIGLYCIDYL ETHER OF BISPHENOL F AND BISPHENOL F

A three-neck 250 ml round bottom flask equipped with a thermocouple and an air driven steel stirrer shaft is charged with 66.472 grams (0.383 equiv.) of a diglycidyl ether of bisphenol F having an EEW of 173.39, and 33.385 grams (0.1667 moles, 0.3334 OH equiv.) of bisphenol F, then heated with stirring under a nitrogen purge of 200 ml/min to 70° C. before adding 0.143 grams of a 70% by weight solution of ethyltriphenyl phosphonium acetate/acetic acid complex catalyst in methanol. The temperature is increased over a fourteen minute period to 79° C., then increased again over a ten minute period to 123° C., and cooked another fifteen minutes at 120° C. before quickly pouring out the contents on a sheet of aluminum foil to cool. The EEW of the resultant advanced epoxy resin is 1937.

COMPARATIVE EXPERIMENT M

PREPARATION OF ADVANCED EPOXY RESIN FROM THE DIGLYCIDYL ETHER OF BISPHENOL F AND BISPHENOL A

A three-neck 250 ml round bottom flask equipped with a thermocouple and an air driven steel stirrer shaft is charged with 63.65 grams (0.367 equiv.) of a diglycidyl ether of bisphenol F having an EEW of 173.39, and 36.21 grams (0.1586 moles, 0.317 OH equiv.) of bisphenol A, then heated with stirring under a nitrogen purge of 200 ml/min to 65° C. before adding 0.143 grams of a 70% by weight solution of ethyltriphenyl phosphonium acetate/acetic acid complex catalyst in methanol. The temperature is increased over a twenty-three minute period to 85° C., then increased again over a twenty-one minute period to 130° C., and cooked another seventeen minutes at 130° C. before quickly pouring out the contents on a sheet of aluminum foil to cool. The EEW of the resultant advanced epoxy resin is 1955.

COMPARATIVE EXPERIMENT N

PREPARATION OF ADVANCED EPOXY RESIN FROM THE DIGLYCIDYL ETHER OF BISPHENOL F AND BISPHENOL F

A three-neck 250 ml round bottom flask equipped with a thermocouple and an air driven steel stirrer shaft is charged with 66.18 grams (0.382 equiv.) of a diglycidyl ether of bisphenol F having an EEW of 173.39, and 33.67 grams (0.168 moles, 0.336 OH equiv.) of bisphenol F, then heated with stirring under a nitrogen purge of 200 ml/min to 61° C. before adding 0.143 grams of a 70% by weight solution of ethyltriphenyl phosphonium acetate/acetic acid complex catalyst in methanol. The temperature is increased over a twenty-five minute period to 125° C., and cooked another five minutes at 135° C. before quickly pouring out the contents on a sheet of aluminum foil to cool. The EEW of the resultant advanced epoxy resin is 1762.

COMPARATIVE EXPERIMENT O

PREPARATION OF ADVANCED EPOXY RESIN FROM BISPHENOL A AND THE DIGLYCIDYL ETHER OF BISPHENOL F

An aluminum pan is charged with 12.73 grams (0.0734 epoxy equiv.) of a diglycidyl ether of Bisphenol F and 7.24 grams (0.0317 moles, 0.0634 OH equiv.) of bisphenol A. The pan is then heated on a hotplate to about 130° to 140° C. to effect a homogeneous melt of the reactants. Four drops of a 70% by weight solution of ethyltriphenyl phosphonium acetate/acetic acid complex catalyst in methanol is added with stirring and the temperature of the hotplate is increased to 190° to 210° C. The viscosity increases and the aluminum pan is removed from the hotplate 15 minutes after the addition of catalyst. The EEW of the resultant advanced epoxy resin is 1911.

COMPARATIVE EXPERIMENT P

COMPARATIVE EXAMPLE 44752-4B. PREPARATION OF ADVANCED EPOXY RESIN FROM THE DIGLYCIDYL ETHER OF BISPHENOL A AND BISPHENOL A

An aluminum pan is charged with 11.32 grams (0.0627 epoxy equiv.) of a diglycidyl ether of bisphenol A having an EEW of 180.6, and 6.16 grams (0.0270 moles, 0.0540 OH equiv.) of bisphenol A. The pan is then heated on a hotplate at 130° to 140° C. to effect a homogeneous melt of the reactants. Three drops of a 70% by weight solution of ethyltriphenyl phosphonium acetate/acetic acid complex catalyst in methanol is added with stirring and the temperature of the hotplate is increased to 200° C. The viscosity increases and the aluminum pan is removed from the hot plate 20 minutes after the addition of catalyst. The EEW of the resultant advanced epoxy resin is 2057.

The advanced epoxy resins of Examples 29 to 56 are represented by Formula B. The characteristics of these resins are provided in Table II.

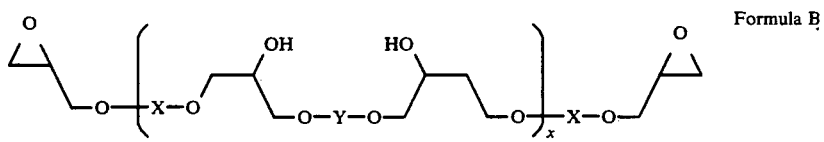

Formula B

TABLE II

| Expt. No. | Resin Prep. (Ex. No.) | X Residue of | Y Residue of | Value of x | EEW | Viscosity Gardner 25° C. | Viscosity Cone and Plate 200° C. Cps | Viscosity Cone and Plate 200° C. Pa.s | Tg °C. | MWw |
|---|---|---|---|---|---|---|---|---|---|---|
| R | 29 | p-ODDP[a] | p-ODDP[a] | 4.6[e,g] | 2000[e,g] | ND[d] | ND[d] | ND[d] | ND[d] | ND[d] |
| S | 30 | p-ODDP[a], Bis A (50% ea.) | p-ODDP[a] | 5.0[e,g] | 2000[e,g] | ND[d] | ND[d] | ND[d] | ND[d] | ND[d] |
| T | 31 | Bis A | p-ODDP[a] | 3.3 | 1280 | ND[d] | ND[d] | ND[d] | ND[d] | ND[d] |
| Y | 32 | p-ODDP[a] | Bis A | 4.8 | 1822 | ND[d] | ND[d] | ND[d] | ND[d] | ND[d] |
| V | 33 | p-ODDP[a] | m-EDDP[b] | 5.2[e,g] | 2000[e,g] | ND[d] | ND[d] | ND[d] | ND[d] | ND[d] |
| W | 34 | p-ODDP[a] | m-BDDP[c] | 5.0[e,g] | 2000[e,g] | ND[d] | ND[d] | ND[d] | ND[d] | ND[d] |
| X | 35 | p-ODDP[a] | m-ODDP[a] | 4.6[e,g] | 2000[e,g] | ND[d] | ND[d] | ND[d] | ND[d] | ND[d] |
| Y | 36 | Bis F | m-BDDP[c] | 4.8 | 1563 | ND[d] | ND[d] | ND[d] | 45 | ND[d] |
| Z | 37 | Bis F | m-EDDP[b] | 7.1 | 2129 | ND[d] | ND[d] | ND[d] | 57 | ND[d] |
| AA | 38 | Bis F | p-BDDP[c] | 4.9 | 1581 | ND[d] | ND[d] | ND[d] | 44 | ND[d] |
| AB | 39 | Bis F | p-ODDP[a] | 4.2 | 1514 | ND[d] | ND[d] | ND[d] | ND[d] | ND[d] |
| AC | 40 | p-ODDP[a], Bis F (50% ea.) | p-ODDP[a] | 5.1[e,g] | 2,000[e,g] | ND[d] | ND[d] | ND[d] | ND[d] | ND[d] |
| AD* | C.E. D | Bis A | Bis F | 7.5 | 2,205 | Z1+ | ND[d] | ND[d] | 67 | 10,261 |
| AF* | C.E. E | Bis A | Bis F | 7.7 | 2,263 | ND[d] | 6,750 | 6.75 | 74 | 15,996 |
| AG* | C.E. F | Bis A | Bis A | 6.9 | 2,139 | Z3.5 | 18,250 | 18.25 | 82 | 14,619 |
| AH* | C.E. G | Bis A | Bis A | 7.7 | 2,349 | Z4 | 26,500 | 26.5 | 85 | 15,702 |
| AI* | C.E. H | Bis A | Bis A | 6.6 | 2,038 | ND[d] | 9,875 | 9.875 | 80 | 11,163 |
| AJ* | C.E. I | Bis A | Bis A | 6.0 | 1,861 | ND[d] | 9,062 | 9.062 | 80 | 10,094 |
| AK | 41 | Bis F | p-ODDP[a] | 5.3 | 1,853 | ND[d] | ND[d] | ND[d] | ND[d] | ND[d] |
| AL | 42 | m-ODDP[a] | m-ODDP[a] | 4.2 | 1,853 | ND[d] | ND[d] | ND[d] | ND[d] | 26,957 |
| AM | 43 | m-ODDP[a] | m-ODDP[a] | 3.8 | 1,713 | ND[d] | ND[d] | ND[d] | 9 | 18,645 |
| AN | 44 | m-ODDP[a] | m-EDDP[b] | 4.9 | 1,902 | ND[d] | 11,000 | 11.0 | 22 | 17,301 |
| AO | Ex. 45 | m-EDDP[b] | m-EDDP[b] | 5.3 | 1,784 | ND[d] | 18,000 | 18.0 | 48 | 14,526 |
| AP | Ex. 46 | Bis A | polyBis A[f] | 9.5 | 3,805 | ND[d] | 13,500 | 13.5 | 81 | 13,211 |
| AQ | Ex. 47 | Bis A | polyBis A[f] | 5.5 | 2,299 | ND[d] | ND[d] | ND[d] | 74.9 | 8,552 |
| AR | Ex. 48 | Bis A | polyBis A[f] | 4.6 | 1,945 | ND[d] | 4,063 | 4.063 | 72.5 | 7,037 |
| AS | Ex. 49 | Bis A | polyBis A[f] | 3.2 | 1,268 | ND[d] | 1,500 | 1.5 | 65 | 5,726 |
| AT | Ex. 50 | Bis A | polyBis A[f] | 2.3 | 1000 | ND[d] | 250 | .25 | 57 | 4,341 |
| AU | Ex. 51 | Bis A | polyBis A[f] | 4.8 | 2,019 | ND[d] | 4,750 | 4.75 | 74 | 6,825 |
| AV | Ex. 52 | polyBis A[f] | polyBis A[f] | 5.8 | 2,986 | ND[d] | 9,250 | 9.25 | 71 | 9,531 |
| AW | Ex. 53 | polyBis A[f] | polyBis A[f] | 4.8 | 2,515 | ND[d] | 9,200 | 9.2 | 78 | 10,622 |
| AX* | C.E. J | Bis F | Bis F | 7.7 | 2,139 | ND[d] | 7,938 | 7.938 | 65 | 36,964 |
| AY* | C.E. K | Bis F | Bis F | 7.8 | 2,150 | ND[d] | 6,575 | 6.575 | 64 | 29,681 |
| AZ* | C.E. L | Bis F | Bis F | 6.9 | 1,937 | ND[d] | 4,250 | 4.25 | 63 | 21,130 |
| BA* | C.E. M | Bis F | Bis A | 6.6 | 1,955 | ND[d] | 4,250 | 4.25 | 66 | 11,719 |
| BB* | C.E. N | Bis F | Bis F | 6.3 | 1,762 | ND[d] | 1,750 | 1.75 | 61 | 11,258 |
| BC | Ex. 54 | polyBis A[f] | Bis F | 13.4 | 3,872 | ND[d] | 21,500 | 21.5 | 77 | 21,118 |
| BD | 55 | Bis F | m-ODDP[a] | 5.3 | 1,861 | ND[d] | ND[d] | ND[d] | ND[d] | ND[d] |
| BE | 56 | m-ODDP[a] | p-ODDP[a] | 3.6 | 1,593 | ND[d] | ND[d] | ND[d] | ND[d] | ND[d] |
| BF | C.E. O | Bis F | Bis A | 6.5 | 1911 | ND[d] | ND[d] | ND[d] | ND[d] | ND[d] |
| BG | C.E. P | Bis A | Bis A | 6.6 | 2057 | ND[d] | ND[d] | ND[d] | ND[d] | ND[d] |

Footnotes to Table II.
*Not an example of the present invention.
[a]ODDP = (octylenedioxy)diphenol.
[b]EDDP = (ethylenedioxy)diphenol.
[c]BDDP = (butylenedioxy)diphenol, Bis F = Bisphenol F.
[d]Not determined.
[e]Actual value not determined since the product is not soluble in methylene chloride, the solvent employed in the method for determining the EEW. The value 2000 is the target EEW.
[f]Polybisphenol A is poly(bisphenol A) ether of ethylene glycol.
[g]Theoretical value based on the target EEW of 2000.

EXAMPLE 57

Preparation of Coatings

Some of the advanced resins are formulated into coating compositions employing the following procedures.

COATING PROCEDURE I FOR ADVANCED EPOXY RESIN PREPARED BY REACTING THE DIGLYCIDYL ETHER OF BISPHENOL A WITH p-(OCTYLENEDIOXY)DIPHENOL PREPARED IN EXAMPLE 19

Four solutions of copolymer epoxy resin and METHYLON TM 75108 are prepared to give 25% total solids in an 80/20 by weight blend of 2-butoxyethanol/cyclohexanone. The amount of METHYLON TM 75108 (a mixture of the allyl ethers of mono-, di-, and tri-methylol phenols commercially available from BTL Specialty Resins Corp.) curing agent is adjusted to comprise 2.5, 5.0, 10.0 and 20.0 weight percent based on total solids. To each solution is added an amount of BYK TM 361 (a proprietary acrylic copolymer flow modifier available from BYK Chemie USA) and 85% phosphoric acid sufficient to comprise 0.05 and 0.30 weight percent, respectively, based on total solids. These four, acidified solutions are then shaken 24 hours at room temperature and used as stock solutions. To a portion of each stock solution is added an additional amount of 85% phosphoric acid sufficient to comprise a total phosphoric acid content of 0.50 weight percent based on total solids. To a second portion of each solution is added an additional amount of 85% phosphoric acid sufficient to comprise a total phosphoric acid content of 0.75 weight percent based on total solids. Finally, to a third portion of each stock solution is added an additional amount of 85% phosphoric acid to comprise a total phosphoric acid content of 1.00 weight percent based on total solids. The three portions of each stock solution are then shaken at least 24 hours at room temperature before applying to a tin free steel substrate with a #16 wire wound drawdown bar and baking at 400° F. (204.4° C.) for 10 or 20 minutes. The properties of the cured coatings are given in Table III.

COATING PROCEDURE II FOR ADVANCED EPOXY RESIN PREPARED BY REACTING THE DIGLYCIDYL ETHER OF BISPHENOL A WITH p-(BUTYLENEDIOXY)DIPHENOL PREPARED IN EXAMPLE 11

Three stock solutions of epoxy resin and METHYLON TM 75108 are prepared to give 30 to 34% total solids in a blend of 80/20 2-butoxyethanol/cyclohexanone (Gardner G viscosity at 25° C.). The amount of METHYLON TM 75108 had been adjusted to comprise 2.5, 5.0, and 10.0 weight percent solids. To a portion of each stock solution is added an amount of BYK TM 361 (a proprietary acrylic copolymer flow modifier available from BYK Chemie USA) and 85% phosphoric acid sufficient to comprise 0.05 and 0.30 weight percent, respectively, based on total solids. To a second portion of each stock solution is added an amount of BYK TM 361 flow modifier and 85% phosphoric acid sufficient to comprise 0.05 and 0.50 weight percent, respectively, based on total solids. To a third portion of each stock solution is added an amount of BYK TM 361 flow modifier and 85% phosphoric acid sufficient to comprise 0.05 and 0.75 weight percent, respectively, based on total solids. To a fourth portion of each stock solution is added an amount of BYK TM 361 flow modifier and 85% phosphoric acid sufficient to comprise 0.05 and 1.00 weight percent, respectively, based on total solids. The portions are then shaken at least 24 hours at room temperature before applying to tin free steel with a wire wound drawdown bar and baking at 400° F. (204.4° C.) for 10 or 20 minutes in a Blue M forced air electric oven. The properties of the cured coatings are given in Table III.

COATING PROCEDURE III

The advanced resins prepared in Examples 16, 17, 18, and 19 and Comparative Experiments A, B, F, and G are formulated into coating compositions employing the following procedure.

The advanced epoxy resin and METHYLON TM 75108 (a mixture of the allyl ethers of mono-, di-, and tri-methylol phenols commercially available from BTL Specialty Resins Corp.) are dissolved in an 80/20 blend of 2-butoxyethanol and cyclohexanone respectively to give a 28 to 36.8% total solids solution. The amount of METHYLON TM 75108 curing agent is adjusted to comprise 10.0, 13.6, 14.0, or 20.0% by weight based on the total solids, then the solution is diluted with more of the solvent blend if needed to attain a Gardner G viscosity at 25° C. To the solution is added an amount of BYK TM 361 (a proprietary acrylic copolymer flow modifier available from BYK Chemie USA) sufficient to comprise 0.05 by weight based on total solids and an amount of 85% phosphoric acid sufficient to comprise 0.30, 0.75, or 1.00% by weight based on total solids. These acidified solutions are then shaken at least 24 hours at room temperature before applying to tin free steel with a wire wound drawdown bar and baking at 400° F. (204.4° C.) for 10 minutes in a Blue M forced air electric oven to give a cured coating thickness of 0.2 mils. The properties are given in Table III.

COATING PROCEDURE IV

The advanced resins prepared in Examples 21 and 27 and the advanced resin D.E.R. TM 667 (an advanced resin having an EEW of 1767 prepared by reacting a diglycidyl ether of bisphenol A with bisphenol A) are formulated into coating compositions employing the following procedure.

Four solutions of advanced epoxy resin and METHYLON TM 75108 (a mixture of the allyl ethers of mono-, di-, and tri-methylol phenols commercially available from BTL Specialty Resins Corp.) are prepared in an 80/20 by weight blend of 2-butoxyethanol and cyclohexanone respectively to give solutions 20 to 37.8% total solids. The amount of METHYLON TM 75108 curing agent is adjusted to comprise 2.5, 5.0, 10.0, or 20.0% by weight based on the total solids. To each solution is added an amount of BYK TM 361 (a proprietary acrylic copolymer flow modifier available from BYK Chemie USA) sufficient to comprise 0.05 by weight based on total solids, then each solution is divided into four portions and an amount of 85% phosphoric acid sufficient to comprise 0.43, 0.64, 0.85, and 1.3% by weight based on total solids respectively. These acidified solutions are then shaken at least 24 hours at room temperature before applying to tin free steel with a wire wound drawdown bar and baking at 400° F. (204.4° C.) for 10 minutes in a Blue M forced air electric oven to give a cured coating thickness of 0.2 mils. The properties are given in Table III.

COATING PROCEDURE V

The advanced epoxy resin and METHYLON TM 75108 (a mixture of the allyl ethers of mono-, di-, and tri-methylol phenols commercially available from BTL Specialty Resins Corp.) are dissolved in a 60/40 blend by weight of 2-butoxyethanol and cyclohexanone respectively to give a solution 19 to 25% total solids. The amount of METHYLON TM 75108 curing agent is adjusted to comprise 20.0% by weight based on the total solids. To the solution is added an amount of BYK TM 361 (a proprietary acrylic copolymer flow modifier available from BYK Chemie USA) sufficient to comprise 0.05% by weight based on total solids, and an amount of 85% phosphoric acid sufficient to comprise 1.0% by weight based on total solids. The acidified solution is then shaken at least 24 hours at room temperature before applying to tin free steel with a wire wound drawdown bar and baking at 400° F. (204.4° C.) for 10 minutes in a Blue M forced air electric oven to give a cured coating thickness of 0.2 mils. The properties are given in Table III.

COATING PROCEDURE VI

The advanced epoxy resin and METHYLON TM 75108 (a mixture of the allyl ethers of mono-, di-, and tri-methylol phenols commercially available from BTL Specialty Resins Corp.) are dissolved in an 80/20 blend by weight of 2-butoxyethanol and cyclohexanone respectively to give a solution 32% total solids. The amount of METHYLON ™ 75108 curing agent is adjusted to comprise 20.0% by weight based on the total solids, then the solution is diluted with more of the solvent blend if needed to attain a Gardner G viscosity at 25° C. To the solution is added an amount of BYK ™ 361 (a proprietary acrylic copolymer flow modifier available from BYK Chemie USA) sufficient to comprise 0.05% by weight based on total solids and an amount of 85% phosphoric acid sufficient to comprise 1.00% by weight based on total solids. The acidified solution is then shaken at least 24 hours at room temperature before applying to tin free steel with a wire wound drawdown bar and baking at 400° F. (204.4° C.) for 10 minutes in a Blue M forced air electric oven to give a cured coating thickness of 0.2 mils. The properties are given in Table III.

COATING PROCEDURE VII

The advanced epoxy resin and METHYLON ™ 75108 (a mixture of the allyl ethers of mono-, di-, and tri-methylol phenols commercially available from BTL Specialty Resins Corp.) are dissolved in 2-butoxyethanol give a solution of 33% total solids. The amount of METHYLON ™ 75108 curing agent is adjusted to comprise 20.0% by weight based on the total solids, then the solution is divided into five portions and to each portion is added an amount of BYK ™ 361 (a proprietary acrylic copolymer flow modifier available from BYK Chemie USA) sufficient to comprise 0.05% by weight based on total solids. To each of four of the portions is added an amount of 85% phosphoric acid sufficient to comprise 0.3%, 0.5%, 0.75%, and 1.00% respectively by weight based on total solids. The solutions are then shaken at least 24 hours at room temperature before applying to tin free steel with a wire wound drawdown bar and baking at 400° F. (204.4° C.) for 10, 15, and 20 minutes in a Blue M forced air electric oven to give a cured coating thickness of 0.2 mils. The properties are given in Table III.

COATING PROCEDURE VIII

The advanced epoxy resin is dissolved in an 80/20 blend by weight of 2-butoxyethanol and cyclohexanone respectively and the % by weight solids are adjusted over a range of 25.5 to 32% to give a solution with viscosity of Gardner G at 25° C. To a portion of the solution is added an amount of METHYLON ™ 75108 (a mixture of the allyl ethers of mono-, di-, and tri-methylol phenols commercially available from BTL Specialty Resins Corp.) curing agent to comprise 2.5, 5, 10, 15, or 20.0% by weight based on the total solids. Then to each solution is added an amount of BYK ™ 361 (a proprietary acrylic copolymer flow modifier available from BYK Chemie USA) sufficient to comprise 0.05% by weight based on total solids and an amount of 85% phosphoric acid sufficient to comprise 0.5 or 0.75% by weight based on total solids. The solutions are then shaken at least 24 hours at room temperature before applying to tin free steel with a wire wound drawdown bar and baking at 400° F. (204.4° C.) for 10 minutes in a Blue M forced air electric oven to give a cured coating thickness of 0.2 mils. The properties are given in Table III.

COATING PROCEDURE IX

The advanced epoxy resin is dissolved in an 80/20 blend by weight of 2-butoxyethanol and cyclohexanone respectively and the % by weight solids are adjusted over a range of 27.25 to 32% to give a solution with viscosity of Gardner G-H at 25° C. To a portion of the solution is added an amount of METHYLON ™ 75108 (a mixture of the allyl ethers of mono-, di-, and tri-methylol phenols commercially available from BTL Specialty Resins Corp.) curing agent to comprise 2.5, 5, 10, 15, or 15% by weight based on the total solids. Then to each solution is added an amount of BYK ™ 361 (a proprietary acrylic copolymer flow modifier available from BYK Chemie USA) sufficient to comprise 0.05% by weight based on total solids and an amount of 85% phosphoric acid sufficient to comprise 0.5 or 1.0% by weight based on total solids. The solutions are then shaken at least 24 hours at room temperature before applying to tin free steel with a wire wound drawdown bar and baking at 400° F. (204.4° C.) for 10 to 20 minutes in a Blue M forced air electric oven to give a cured coating thickness of 0.2 mils. The properties are given in Table III.

COATING PROCEDURE X

The advanced epoxy resin is dissolved in an 60/40 blend by weight of 2-butoxyethanol and cyclohexanone respectively to give a solution 15% by weight total solids. To a portion of the solution is added an amount of METHYLON ™ 75108 (a mixture of the allyl ethers of mono-, di-, and tri-methylol phenols commercially available from BTL Specialty Resins Corp.) curing agent to comprise 5, 10, or 15% by weight based on the total solids. Then to each solution is added an amount of BYK ™ 361 (a proprietary acrylic copolymer flow modifier available from BYK Chemie USA) sufficient to comprise 0.05% by weight based on total solids and an amount of 85% phosphoric acid sufficient to comprise 0.75% by weight based on total solids. The solutions are then shaken at least 24 hours at room temperature before applying to tin free steel with a wire wound drawdown bar and baking at 400° F. (204.4° C.) for 10 minutes in a Blue M forced air electric oven to give a cured coating thickness of 0.2 mils. The properties are given in Table III.

COATING PROCEDURE XI

Stock solutions of epoxy resin and METHYLON ™ 75108 (a mixture of the allyl ethers of mono-, di-, and tri-methylol phenols commercially available from BTL Specialty Resins Corp.) are prepared in a blend of 2-butoxyethanol and cyclohexanone in a range of ratios by weight from 100/0 to 60/40 respectively, to give a 20% to 40% solids solution. The amount of METHYLON ™ 75108 curing agent is adjusted to comprise 2.5, 5.0, 10.0, 13.6, 14.0, 15.0, or 20.0% by weight based on the total solids, then the solution is diluted with more of the solvent blend if needed to attain a Gardner G viscosity at 25° C. To each solution is added an amount of BYK ™ 361 (a proprietary acrylic copolymer flow modifier available from BYK Chemie USA) sufficient to comprise 0.05% by weight based on total solids and an amount of 85% phosphoric acid sufficient to comprise 0.30, 0.50, 0.75, 1.00, or 1.50% by weight based on total solids. These acidified solutions are then shaken at least 24 hours at room temperature before applying to tin free steel with a wire wound drawdown bar and baking at 400° F. (204.4° C.) for 10 or 15 or 20 minutes in a Blue M forced air electric oven.

TABLE III

| | | | | | | METHYL ETHYL KETONE RESISTANCE and FLEXIBILITY | | | | | | ADHESIVE and IMPACT STRENGTH | | | |
|---|---|---|---|---|---|---|---|---|---|---|---|---|---|---|---|
| | | | | | | | | | | | | | | Reverse | |
| | Resin Prep. | | | | Cure Time | Coating Thickness | | MEK Res. | 1/16 in. (1.59 mm)$^c$ | ⅛ in. (3.175 mm)$^d$ | | Coating Thickness | | T-PEEL Dry/Wet | Impact | |
| Experiment | (Ex. No.) | CM$^f$ | % H$_3$PO$_4$$^h$ | % CA$^a$ | min. | mil | mm | (DR) | Wedge Bend$^b$ (mm fail) | Wedge Bend$^b$ (mm fail) | Tg$^e$ (°C.) | mil | mm | (Kg/5 mm) | in.-lbs | Kg-cm |
| BH | 19 | I | 0.30 | 2.5 | 10 | .17 | .0043 | <5 | 9.1 | — | — | — | — | — | — | — |
| BI* | R1$^g$ | IV | 0.43 | 2.5 | 10 | .19 | .0048 | <5 | 55.6 | — | — | .17 | .0043 | 2.5/2.9 | <40 | <46 |
| BJ | 21 | IV | 0.43 | 2.5 | 10 | .19 | .0048 | <5 | 0 | — | — | .2 | .0051 | 0.6/.31 | 160+ | 184+ |
| BK | 18 | II | 0.50 | 2.5 | 10 | .22 | .0056 | <5 | 9.3 | — | 56.8 | — | — | — | — | — |
| BL | 19 | I | 0.50 | 2.5 | 10 | .17 | .0043 | <5 | 6.4 | — | — | — | — | — | — | — |
| BM* | R1$^g$ | IV | 0.64 | 2.5 | 10 | .18 | .0046 | <5 | 19.9 | — | — | .18 | .0046 | 4.4/0.4 | 85-90 | 98-104 |
| BN | 21 | IV | 0.64 | 2.5 | 10 | .18 | .0046 | <5 | 0 | — | 57.0 | .19 | .0048 | 3.5/2.5 | 160+ | 184+ |
| BO | 18 | II | 0.75 | 2.5 | 10 | .14 | .0036 | <5 | 10.0 | — | — | — | — | — | — | — |
| BP | 19 | I | 0.75 | 2.5 | 10 | .22 | .0056 | <5 | 0 | — | — | — | — | — | — | — |
| BQ | 54 | VIII | 0.75 | 2.5 | 10 | .20 | .0051 | 10-15 | 0 | — | — | — | — | — | — | — |
| BR* | R1$^g$ | IV | 0.85 | 2.5 | 10 | .19 | .0048 | 5-10 | 9.3 | — | — | .18 | .0046 | 3.5/0.1 | 120-125 | 138-144 |
| BS | 21 | IV | 0.85 | 2.5 | 10 | .18 | .0046 | 5-10 | 0 | — | — | .19 | .0048 | 4.6/1.2 | 160+ | 184+ |
| BT | 18 | II | 1.0 | 2.5 | 10 | .15 | .0038 | 5-10 | 5.7 | — | 59.3 | — | — | — | — | — |
| BU | 19 | I | 1.0 | 2.5 | 10 | .20 | .0051 | 10-15 | 0 | — | — | — | — | — | — | — |
| BV | 27 | IX | 1.0 | 2.5 | 10 | .19 | .0048 | 5-10 | 14.3 | — | — | — | — | — | — | — |
| BW* | R1$^g$ | IV | 1.3 | 2.5 | 10 | .23 | .0058 | 10-15 | 0 | — | — | .17 | .0043 | 1.8/0.1 | 130-135 | 150-156 |
| BX | 21 | IV | 1.3 | 2.5 | 10 | .18 | .0046 | 5-10 | 32.1 | — | — | .18 | .0046 | 3.6/0.9 | 155-160 | 179-184 |
| BY* | R1$^g$ | IV | 0.43 | 5 | 10 | .19 | .0048 | <5 | 0 | — | — | .18 | .0046 | 2.2/3.9 | <40 | <46 |
| BZ | 21 | IV | 0.43 | 5 | 10 | .18 | .0046 | <5 | 4.6 | — | — | .19 | .0048 | 0.9/3.8 | 160+ | 184+ |
| CA | 27 | IV | 0.42 | 5 | 10 | .20 | .0051$^j$ | <5 | 3.9 | — | — | .18 | .0046 | — | 125-130 | 144-150 |
| CB* | C.E.H | IX | .5 | 5 | 10 | .19 | .0048 | <5 | 100 | — | — | — | — | — | — | — |
| CC* | C.E.I | IX | .5 | 5 | 10 | .21 | .0053 | <5 | 8.0 | — | — | — | — | — | — | — |
| CD* | R1$^g$ | IX | .5 | 5 | 10 | .22 | .0056 | <5 | 9.8 | — | 56.5 | — | — | — | — | — |
| CE* | C.E.A | IX | .5 | 5 | 10 | .19 | .0048 | <5 | 7.9 | — | 47.7 | — | — | — | — | — |
| CF | 18 | II | 0.50 | 5.0 | 10 | .15 | .0038 | 5-10 | 0 | — | — | — | — | — | — | — |
| CG | 19 | I | 0.50 | 5.0 | 10 | .19 | .0048 | <5 | 5.4 | — | — | — | — | — | — | — |
| CH | 27 | IX | 0.50 | 5.0 | 10 | .20 | .0051 | 10-15 | 0 | — | 58.8 | — | — | — | — | — |
| CI | 54 | VIII | 0.50 | 5.0 | 10 | .20 | .0051 | 10-15 | 14.6 | — | — | — | — | — | — | — |
| CJ* | R1$^g$ | IV | 0.64 | 5.0 | 10 | .18 | .0046 | <5 | 19.9 | — | — | .17 | .043 | 5.1/2.1 | 115-120 | 132-138 |
| CK | 21 | IV | 0.64 | 5.0 | 10 | .18 | .0046 | 20-25 | 13.4 | — | — | .19 | .048 | 3.5/2.0 | 155-160 | 179-184 |
| CL* | R1$^g$ | VIII | 0.75 | 5.0 | 10 | .17 | .0043 | 5-10 | 0 | — | — | — | — | — | — | — |
| CM* | R1$^g$ | VIII | 0.75 | 5.0 | 10 | .21 | .0053 | 10-15 | 17.5 | — | — | — | — | — | — | — |
| CN* | R1$^g$ | VIII | 0.75 | 5.0 | 10 | .14 | .0036 | 10-15 | 0 | — | — | — | — | 5/2.5 | — | — |
| CO | 18 | II | 0.75 | 5.0 | 10 | .19 | .0048 | 10-15 | 40 | — | — | — | — | 3.5/2.0 | — | — |
| CP | 19 | I | 0.75 | 5.0 | 10 | .20 | .0051 | <5 | 0 | — | — | — | — | — | — | — |
| CQ | 46 | VIII | 0.75 | 5.0 | 10 | .26 | .0066 | <5 | 0 | — | — | — | — | — | — | — |
| CR | 48 | VIII | 0.75 | 5.0 | 10 | .21 | .0053 | 20-25 | 14.4 | — | 75 | — | — | — | — | — |
| CS | 45 | X | 0.75 | 5.0 | 10 | .20 | .0051 | 5-10 | 11.5 | — | 74 | — | — | — | — | — |
| CT | 44 | X | 0.75 | 5.0 | 10 | .22 | .0056 | 10-15 | 10.6 | — | 76 | — | — | — | — | — |
| CU* | C.E.J | VIII | 0.75 | 5.0 | 10 | .17 | .0043 | 20-25 | 10.6 | — | 84 | — | — | — | — | — |
| CV* | C.E.I | VIII | 0.75 | 5.0 | 10 | .23 | .0058 | 5-10 | 11.5 | — | 85.1 | — | — | — | — | — |
| CW* | C.E.M | VIII | 0.75 | 5.0 | 10 | .20 | .0051 | 20-25 | 13.4 | — | 83.4 | — | — | — | — | — |
| CX | 54 | VIII | 0.75 | 5.0 | 10 | .14 | .0036 | <5 | 0 | — | — | — | — | — | — | — |
| CY | 52 | VIII | 0.75 | 5.0 | 10 | .17 | .0043 | 5-10 | 5.6 | — | — | — | — | — | — | — |
| CZ | 53 | VIII | 0.75 | 5.0 | 10 | .18 | .0046 | 10-15 | 15.1 | — | — | — | — | — | — | — |
| DA* | R1$^g$ | IV | 0.85 | 5.0 | 10 | .19 | .0048 | 10-15 | 5.6 | — | — | .16 | .0041 | 4.1/1.5 | 145-150 | 167-173 |
| DB | 21 | IV | 0.85 | 5.0 | 10 | .18 | .0046 | 5-10 | 0 | — | — | .19 | .0048 | 4.3/1.6 | 155-160 | 179-184 |

TABLE III-continued
METHYL ETHYL KETONE RESISTANCE and FLEXIBILITY / ADHESIVE and IMPACT STRENGTH

| Experiment | Resin Prep. (Ex. No.) | CM | % H₃PO₄ | % CA | Cure Time min. | Coating Thickness mil | Coating Thickness mm | MEK Res. (DR) | 1/16 in. (1.59 mm) Wedge Bend (mm fail) | 1/8 in. (3.175 mm) Wedge Bend (mm fail) | Tg (°C) | Coating Thickness mil | Coating Thickness mm | T-PEEL Dry/Wet (Kg/5 mm) | in.-lbs | Reverse Impact Kg-cm |
|---|---|---|---|---|---|---|---|---|---|---|---|---|---|---|---|---|
| DC | 18 | II | 1.00 | 5.0 | 10 | .14 | .0036 | 15-20 | 7.2 | — | 60.3 | — | — | — | — | — |
| DD | 19 | I | 1.0 | 5 | 10 | .20 | .0051 | 10-15 | 7.1 | — | — | — | — | — | — | — |
| DE | 27 | IX | 1.0 | 5 | 10 | .20 | .0051 | 5-10 | 0 | — | 50.1 | — | — | — | — | — |
| DF* | R1ᵍ | IV | 1.3 | 5 | 10 | .18 | .0046 | 10-15 | 18.5 | — | — | .16 | .0041 | 3.5/1.0 | 130-135 | 150-156 |
| DG | 21 | IV | 1.3 | 5 | 10 | .20 | .0051 | 15-20 | 3.8 | — | — | .19 | .0048 | 4.0/1.8 | 155-160 | 179-184 |
| DH* | C.E.B | III | 0.3 | 10 | 10 | .20ʲ | .0051ʲ | <5 | 13.4 | 6.3 | — | — | — | — | — | — |
| DI | 19 | I | 0.3 | 10 | 10 | .19 | .0048 | 10-15 | 9.8 | 0 | 51.0 | — | — | — | — | — |
| DJ | 19 | III | 0.3 | 10 | 10 | .20ʲ | .0051ʲ | <5 | — | — | — | — | — | — | — | — |
| DK* | R1ᵍ | IV | 0.43 | 10 | 10 | .19 | .0048 | <5 | 17.9 | — | — | .27 | .0069 | 4.6/4.1 | <40 | <46 |
| DL | 21 | IV | 0.43 | 10 | 10 | .19 | .0048 | 5-10 | 0 | — | — | .19 | .0048 | 4.3/3.5 | 150-155 | 173-179 |
| DM* | C.E.H | IX | 0.5 | 10 | 10 | .20 | .0051 | 5-10 | 11.6 | — | — | — | — | — | — | — |
| DN* | C.E.I | IX | 0.5 | 10 | 10 | .20 | .0051 | 10-15 | 11.8 | — | — | — | — | — | — | — |
| DO* | R1ᵍ | IX | 0.5 | 10 | 10 | .23 | .0058 | 10-15 | 15.0 | — | — | — | — | — | — | — |
| DP* | C.E.A | IX | 0.50 | 10 | 10 | .20 | .0051 | 5-10 | 15.1 | — | — | — | — | — | — | — |
| DQ | 16 | II | 0.50 | 10 | 10 | .17 | .0043 | 10-15 | 0 | — | 56.5 | — | — | — | — | — |
| DR | 17 | I | 0.50 | 10 | 10 | .20 | .0051 | 15-20 | 6.4 | — | — | — | — | — | — | — |
| DS | 27 | IX | 0.50 | 10 | 10 | .19 | .0048 | <5 | 0 | — | — | — | — | — | — | — |
| DT* | R1ᵍ | IV | 0.64 | 10 | 10 | .19 | .0048 | 10-15 | 17.9 | — | — | .26 | .0066 | 5.1/3.1 | 125-130 | 144-150 |
| DU | 21 | IV | 0.64 | 10 | 10 | .19 | .0048 | 10-15 | 0 | — | — | .19 | .0048 | 5.2/2.8 | 155-160 | 179-184 |
| DV* | R1ᵍ | VIII | 0.75 | 10 | 10 | .22 | .0056 | 15-20 | 12.6 | — | — | — | — | — | — | — |
| DW* | R1ᵍ | VIII | 0.75 | 10 | 10 | .20 | .0051 | 15-20 | 13.9 | — | — | — | — | — | — | — |
| DX* | R1ᵍ | VIII | 0.75 | 10 | 10 | .19 | .0048 | 20-25 | 16.1 | — | — | — | — | — | — | — |
| DY* | R3ᵏ | VIII | 0.75 | 10 | 10 | .20 | .0051 | 25-50 | 13.9 | — | — | — | — | — | — | — |
| DZ* | R1ᵍ | VIII | 0.75 | 10 | 10 | .21 | .0053 | 20-25 | 13.9 | — | — | — | — | — | — | — |
| EA* | R1ᵍ | VIII | 0.75 | 10 | 10 | .21 | .0053 | 15-20 | 13.5 | — | — | — | — | — | — | — |
| EB* | R1ᵍ | VIII | 0.75 | 10 | 10 | .20 | .0051 | 20-25 | 10.3 | — | 71.8 | — | — | — | — | — |
| EF | 16 | II | 0.75 | 10 | 10 | .22 | .0056 | 25-50 | 11.6 | — | 60.3 | — | — | — | — | — |
| EG | 18 | II | 0.75 | 10 | 10 | .17 | .0043 | 15-20 | 0 | — | — | — | — | — | — | — |
| EH | 21 | VIII | 0.75 | 10 | 10 | .22 | .0056 | 10-15 | 0 | — | — | — | — | — | — | — |
| EI | 21 | VIII | 0.75 | 10 | 10 | .19 | .0048 | 15-20 | 0 | — | 64.4 | — | — | — | — | — |
| EJ | 17 | I | 0.75 | 10 | 10 | .22 | .0056 | 20-25 | 4.5 | — | — | — | — | — | — | — |
| EK | 17 | VIII | 0.75 | 10 | 10 | .20 | .0051 | 25-50 | 6.8 | — | — | — | — | — | — | — |
| EL | 19 | I | 0.75 | 10 | 10 | .20 | .0051 | 20-25 | 0 | — | — | — | — | — | — | — |
| EM | 19 | VIII | 0.75 | 10 | 10 | .21 | .0053 | 5-10 | 0 | — | — | — | — | — | — | — |
| EN | 19 | I | 0.75 | 10 | 10 | .20 | .0051 | 10-15 | 0 | — | — | — | — | — | — | — |
| EO | 27 | VIII | 0.75 | 10 | 10 | .19 | .0048 | 10-15 | 0 | — | — | — | — | — | — | — |
| EP | 45 | X | 0.75 | 10 | 10 | .21 | .0053 | 25-50 | 1.7 | — | — | — | — | 5/1.25 | — | — |
| EQ | 44 | X | 0.75 | 10 | 10 | .22 | .0056 | 10-15 | 8.5 | — | — | — | — | 2.75/.75 | — | — |
| ER | 43 | X | 0.75 | 10 | 10 | .21 | .0053 | 20-25 | 12.6 | — | — | — | — | 2.25/.75 | — | — |
| ES | 46 | VIII | 0.75 | 10 | 10 | .21 | .0053 | 10-15 | 17.9 | — | 92.0 | — | — | — | — | — |
| ET | 48 | VIII | 0.75 | 10 | 10 | .21 | .0053 | 5-10 | 16.0 | — | 84.4 | — | — | — | — | — |
| EU* | C.E.J | VIII | 0.75 | 10 | 10 | .22 | .0056 | 25-50 | 17.8 | — | — | — | — | — | — | — |
| EV* | C.E.L | VIII | 0.75 | 10 | 10 | .20 | .0051 | 25-50 | 11.3 | — | — | — | — | — | — | — |
| EW* | C.E.M | VIII | 0.75 | 10 | 10 | .25 | .0064 | 20-25 | 10.5 | — | — | — | — | — | — | — |
| EX | 54 | VIII | 0.75 | 10 | 10 | .20 | .0051 | 5-10 | 13.4 | — | 85.4 | — | — | — | — | — |
| EY | 52 | VIII | 0.75 | 10 | 10 | .17 | .0043 | 5-10 | 13.3 | — | 83.7 | — | — | — | — | — |
| EZ | 53 | VIII | 0.75 | 10 | 10 | .19 | .0048 | 5-10 | — | — | — | — | — | — | — | — |

TABLE III-continued
METHYL ETHYL KETONE RESISTANCE and FLEXIBILITY / ADHESIVE and IMPACT STRENGTH

| Experiment | Resin Prep. (Ex. No.) | CM[f] | % H$_3$PO$_4$[h] | % CA[a] | Cure Time min. | Coating Thickness mil | Coating Thickness mm | MEK Res. (DR) | 1/16 in. (1.59 mm)[c] Wedge Bend[b] (mm fail) | 1/8 in. (3.175 mm)[d] Wedge Bend[b] (mm fail) | Tg[e] (°C) | Coating Thickness mil | Coating Thickness mm | T-PEEL Dry/Wet (Kg/5 mm) | Reverse Impact in.-lbs | Reverse Impact Kg-cm |
|---|---|---|---|---|---|---|---|---|---|---|---|---|---|---|---|---|
| FA* | R18 | IV | 0.85 | 10 | 10 | .19 | .0048 | 15-20 | 19 | — | — | .26 | .0066 | 5.5/2.5 | 125-130 | 144-150 |
| FB | 21 | IV | 0.85 | 10 | 10 | .19 | .0048 | 10-15 | 0 | — | — | .19 | .0048 | 4.0/2.5 | 155-160 | 179-184 |
| FC* | C.E.B | III | 1.0 | 10 | 10 | .20[j] | .0051[j] | 25-50 | — | 9.5 | — | — | — | — | — | — |
| FD | 18 | II | 1.0 | 10 | 10 | .15 | .0038 | 20-25 | — | — | — | — | — | — | — | — |
| FE | 19 | I | 1.0 | 10 | 10 | .20 | .0051 | 25-50 | 10.9 | — | 58.5 | — | — | — | — | — |
| FG | 19 | III | 1.0 | 10 | 10 | .20[j] | .0051[j] | 25-50 | — | 7.3 | — | — | — | — | — | — |
| FH | 27 | IX | 1.0 | 10 | 10 | .19 | .0048 | 10-15 | 2.6 | — | 52.8 | — | — | — | — | — |
| FI* | R18 | IV | 1.3 | 10 | 10 | .19 | .0048 | 25-50 | 31.6 | — | — | .25 | .0064 | 4.4/0.8 | 120-125 | 138-144 |
| FJ | 21 | IV | 1.3 | 10 | 10 | .20 | .0051 | 20-25 | 13.9 | — | — | .20 | .0051 | 3.6/1.8 | 145-150 | 167-173 |
| FK* | C.E.A | III | 1.0 | 13.6 | 10 | .10[j] | .0051[j] | 75-100 | — | 15 | — | — | — | — | — | — |
| FL* | R18 | III | 1.0 | 13.6 | 10 | .20 | .0051 | 15-20 | 29.5 | 18.9 | 79.8 | — | — | — | — | — |
| FM | 16 | III | 1.0 | 13.6 | 10 | .20[j] | .0051[j] | 50-75 | — | 16.2 | — | — | — | — | — | — |
| FN | 18 | III | 1.0 | 13.6 | 10 | .20[j] | .0051[j] | 25-50 | — | 7.0 | — | — | — | — | — | — |
| FO | 17 | III | 1.0 | 13.6 | 10 | .20[j] | .0051[j] | 25-50 | — | 14.0 | — | — | — | — | — | — |
| FP | 27 | III | 1.0 | 13.6 | 10 | .20 | .0051 | 10-15 | 11.5 | 10.4 | — | — | — | — | — | — |
| FQ | 19 | III | 1.0 | 13.6 | 10 | .20[j] | .0051[j] | 20-25 | 10.9 | 4.0 | — | — | — | — | — | — |
| FR* | C.E.G | III | 1.0 | 14 | 10 | .20[j] | .0051[j] | 75-100 | — | 15 | — | — | — | — | — | — |
| FS* | R18 | III | 0.5 | 15 | 10 | .23 | .0058 | 10-15 | 14.8 | — | — | — | — | — | — | — |
| FT* | C.E.H | IX | 0.5 | 15 | 10 | .21 | .0053 | 5-10 | 14.9 | — | — | — | — | — | — | — |
| FU* | C.E.I | IX | 0.5 | 15 | 10 | .21 | .0053 | 15-20 | 17.5 | — | — | — | — | — | — | — |
| FV* | C.E.A | IX | 0.5 | 15 | 10 | .19 | .0048 | 5-10 | 22.4 | — | — | — | — | — | — | — |
| FW | 27 | IX | 0.5 | 15 | 10 | .21 | .0053 | 15-20 | 0 | — | — | — | — | — | — | — |
| FX* | R18 | VIII | 0.75 | 15 | 10 | .21 | .0053 | 25-50 | 20.4 | — | — | — | — | — | — | — |
| FY* | R18 | VIII | 0.75 | 15 | 10 | .21 | .0053 | 20-25 | 14.6 | — | — | — | — | — | — | — |
| FZ* | R18 | VIII | 0.75 | 15 | 10 | .22 | .0056 | 25-50 | 20.3 | — | — | — | — | — | — | — |
| GA | 46 | VIII | 0.75 | 15 | 10 | .26 | .0066 | 25-50 | 22.9 | — | 96.4 | — | — | — | — | — |
| GB | 48 | VIII | 0.75 | 15 | 10 | .19 | .0048 | 25-50 | 21.0 | — | 84.9 | — | — | — | — | — |
| GC | 45 | VIII | 0.75 | 15 | 10 | .19 | .0048 | 10-15 | 0 | — | 58 | — | — | 2/.75 | — | — |
| GD | 44 | X | 0.75 | 15 | 10 | .23 | .0058 | 25-50 | 2.3 | — | 35 | — | — | 1.25/.5 | — | — |
| GE | 43 | X | 0.75 | 15 | 10 | .24 | .0061 | 15-20 | 13.3 | — | <30 | — | — | — | — | — |
| GF* | C.E.J | VIII | 0.75 | 15 | 10 | .22 | .0056 | 20-25 | 15.3 | — | — | — | — | — | — | — |
| GG* | C.E.L | VIII | 0.75 | 15 | 10 | .23 | .0058 | 25-50 | 25.6 | — | — | — | — | — | — | — |
| GH* | C.E.M | VIII | 0.75 | 15 | 10 | .19 | .0048 | 25-50 | 13.4 | — | — | — | — | — | — | — |
| GI | 54 | VIII | 0.75 | 15 | 10 | .26 | .0066 | 50-75 | 22.1 | — | 88.3 | — | — | — | — | — |
| GJ | 52 | VIII | 0.75 | 15 | 10 | .20 | .0051 | 20-25 | 12.8 | — | 87.3 | — | — | — | — | — |
| GK | 53 | VIII | 0.75 | 15 | 10 | .22 | .0056 | 20-25 | 10.1 | — | — | — | — | — | — | — |
| GL* | R2[i] | VII | 0 | 20 | 10 | .18 | .0046 | <5 | — | 100 | — | — | — | — | — | — |
| GM* | C.E.B | III | 0.3 | 20 | 10 | .20[j] | .0051[j] | <5 | — | 10.2 | 88.3 | — | — | — | — | — |
| GN* | R2[i] | VII | 0.30 | 20 | 10 | .18 | .0046 | <5 | — | 11.4 | — | — | — | — | — | — |
| GO | 19 | I | 0.30 | 20 | 10 | .19 | .0048 | <5 | 3.6 | — | 52.7 | — | — | — | — | — |
| GP | 19 | III | 0.30 | 20 | 10 | .20[j] | .0051[j] | <5 | — | 0 | — | — | — | — | — | — |
| GQ* | R1 | IV | 0.43 | 20 | 10 | .21 | .0053 | 5-10 | 22.9 | — | — | .24 | .0061 | 4.4/1.8 | 125-130 | 144-150 |
| GR | 21 | IV | 0.43 | 20 | 10 | .19 | .0048 | 5-10 | 5.8 | — | — | .21 | .0053 | 4.8/3.0 | 160+ | 184 |
| GS* | R2[i] | VII | 0.50 | 20 | 10 | .18 | .0046 | 5-10 | — | 10.9 | — | — | — | — | — | — |
| GT | 19 | I | 0.50 | 20 | 10 | .19 | .0048 | 5-10 | 7.6 | — | — | — | — | — | — | — |
| GU* | R1 | IV | 0.64 | 20 | 10 | .19 | .0048 | 15-20 | 28.5 | — | — | .23 | .0058 | 5.2/0.9 | 120-125 | 138-144 |
| GV | 21 | IV | 0.64 | 20 | 10 | .20 | .0051 | 5-10 | 15.0 | — | — | .21 | .0053 | 3.8/2.5 | 145-150 | 167-173 |

TABLE III-continued

METHYL ETHYL KETONE RESISTANCE and FLEXIBILITY / ADHESIVE and IMPACT STRENGTH

| Experiment | Resin Prep. (Ex. No.) | CM | % H₃PO₄ | % CA | Cure Time min. | Coating Thickness mil | Coating Thickness mm | MEK Res. (DR) | 1/16 in. (1.59 mm) Wedge Bend (mm fail) | ⅛ in. (3.175 mm) Wedge Bend (mm fail) | Tg (°C.) | Coating Thickness mil | Coating Thickness mm | T-PEEL Dry/Wet (Kg/5 mm) | Reverse Impact in-lbs | Reverse Impact Kg-cm |
|---|---|---|---|---|---|---|---|---|---|---|---|---|---|---|---|---|
| GW* | R1ᵍ | VIII | 0.75 | 20 | 10 | .20 | .0051 | 50-75 | 25 | — | — | — | — | — | — | — |
| GX* | R1ᵍ | VIII | 0.75 | 20 | 10 | .19 | .0048 | 25-50 | 23.1 | — | — | — | — | — | — | — |
| GY* | R2ⁱ | VII | 0.75 | 20 | 10 | .18 | .0046 | 15-20 | — | 14.3 | — | — | — | — | — | — |
| GZ | 19 | I | 0.75 | 20 | 10 | .20ʲ | .0051ʲ | 25-50 | 18.1 | — | — | — | — | — | — | — |
| HA* | C.E.J | VIII | 0.75 | 20 | 10 | .21 | .0053 | 75-100 | 20.1 | — | 83 | — | — | — | — | — |
| HB* | C.E.L | VIII | 0.75 | 20 | 10 | .20 | .0051 | 50-75 | 32.9 | — | 80 | — | — | — | — | — |
| HC* | C.E.M | VIII | 0.75 | 20 | 10 | .25 | .0064 | 25-50 | 20.3 | — | 87 | — | — | — | — | — |
| HD | 54 | VIII | 0.85 | 20 | 10 | .20 | .0051 | 75-100 | 27.0 | — | 93 | — | — | — | — | — |
| HE* | R1ᵍ | IV | 0.85 | 20 | 10 | .19 | .0048 | 50-75 | 39.3 | — | — | .23 | .0058 | 3.5/4.0 | 100-105 | 115-121 |
| HF | 21 | IV | 0.85 | 20 | 10 | .20 | .0051 | 20-25 | 20.5 | — | — | .21 | .0053 | 2.2/0.6 | 140-145 | 161-167 |
| HG* | R2ⁱ | VII | 1.0 | 20 | 10 | .18 | .0046 | 75-100 | — | 12.9 | — | — | — | — | — | — |
| HH* | C.E.P | V | 1.0 | 20 | 10 | .20ʲ | .0051ʲ | 20-25 | 38.4 | — | — | — | — | — | — | — |
| HI* | C.E.C | XI | 1.0 | 20 | 10 | .20ʲ | .0051ʲ | 50-75 | — | 19 | — | — | — | — | — | — |
| HJ* | C.E.B | VI | 1.0 | 20 | 10 | .22 | .0056 | 75-100 | 28.5 | 21.0 | — | — | — | — | — | — |
| HK* | C.E.B | III | 1.0 | 20 | 10 | .20ʲ | .0051ʲ | 100-125 | — | 20.5 | — | .22 | .0056 | — | 140-150 | 161-173 |
| HL* | C.E.F | VI | 1.0 | 20 | 10 | .20ʲ | .0051ʲ | 100-125 | 35.0 | 23.3 | — | — | — | — | — | — |
| HM* | C.E.F | III | 1.0 | 20 | 10 | .20ʲ | .0051ʲ | 100-125 | — | 20.5 | — | — | — | — | — | — |
| HN* | C.E.D | XII | 1.0 | 20 | 10 | .20 | .0051 | 125-150 | — | 12 | — | — | — | — | — | — |
| HO* | C.E.E | VI | 1.0 | 20 | 10 | .20 | .0051 | 75-100 | 19.3 | 17.4 | — | — | — | — | — | — |
| HP | 16 | XI | 1.0 | 20 | 10 | .20ʲ | .0051ʲ | 75-100 | — | 25.0 | — | — | — | — | — | — |
| HQ | 17 | VI | 1.0 | 20 | 10 | .21 | .0053 | 100-125 | 34.4 | 25.0 | 79.4 | — | — | — | — | — |
| HR | 18 | VI | 1.0 | 20 | 10 | .20 | .0051 | 50-75 | 20.7 | 13.2 | — | — | — | — | — | — |
| HS | 16 | I | 1.0 | 20 | 10 | .20ʲ | .0051ʲ | 25-50 | 20.4 | — | 65.0 | — | — | — | — | — |
| HT | 19 | III | 1.0 | 20 | 10 | .20ʲ | .0051ʲ | 25-50 | — | 15.5 | — | — | — | — | — | — |
| HU* | C.E.O | V | 1.0 | 20 | 10 | .25 | .0064 | 5-10 | 21.4 | — | — | — | — | — | — | — |
| HV | 41 | V | 1.0 | 20 | 10 | .22 | .0056 | 10-15 | 22.3 | — | — | — | — | — | — | — |
| HW | 55 | V | 1.0 | 20 | 10 | .22 | .0056 | 5-10 | 26.6 | — | — | — | — | — | — | — |
| HX | 35 | V | 1.0 | 20 | 10 | .20 | .0051 | 5-10 | 14.3 | — | — | — | — | — | — | — |
| HY | 32 | V | 1.0 | 20 | 10 | .20 | .0051 | <5 | 9.4 | — | — | — | — | — | — | — |
| HZ | 31 | IV | 1.0 | 20 | 10 | .23 | .0058 | 5-10 | 9.8 | — | — | — | — | — | — | — |
| IA* | R1ᵍ | IV | 1.3 | 20 | 15 | .19 | .0048 | 50-75 | 38.3 | 8.5 | — | .23 | .0058 | 0.1/0.0 | 90-95 | 104-109 |
| IB | 21 | IV | 1.3 | 20 | 15 | .20 | .0051 | 25-50 | 30.4 | 8.4 | — | .21 | .0053 | 0.4/0.1 | 135-140 | 156-161 |
| IC* | R2ⁱ | VII | 0 | 20 | 15 | .18 | .0046 | <5 | — | 100 | — | — | — | — | — | — |
| ID* | R2ⁱ | VII | 0.3 | 20 | 15 | .19 | .0048 | <5 | — | 8.5 | — | — | — | — | — | — |
| IE* | R2ⁱ | VII | 0.5 | 20 | 15 | .19 | .0048 | 5-10 | — | 8.4 | — | — | — | — | — | — |
| IF* | R2ⁱ | VII | 0.75 | 20 | 15 | .19 | .0048 | 20-25 | — | 15.4 | — | — | — | — | — | — |
| IG* | R2ⁱ | VII | 1.0 | 20 | 15 | .18 | .0046 | 100-125 | — | 17.8 | — | — | — | — | — | — |
| IH | 19 | II | 0.3 | 2.5 | 20 | .18 | .0048 | <5 | 3.6 | — | 58.1 | — | — | — | — | — |
| II | 18 | I | 0.5 | 2.5 | 20 | .21 | .0053 | <5 | 6.7 | — | — | — | — | — | — | — |
| IJ | 19 | II | 0.50 | 2.5 | 20 | .20 | .0051 | 5-10 | 1.4 | — | — | — | — | — | — | — |
| IK | 18 | I | 0.75 | 2.5 | 20 | .14 | .0036 | <5 | 0 | — | — | — | — | — | — | — |
| IL | 19 | II | 0.75 | 2.5 | 20 | .20 | .0051 | 15-20 | 0 | — | 61.9 | — | — | — | — | — |
| IM | 18 | I | 1.00 | 2.5 | 20 | .15 | .038 | 5-10 | 0 | — | — | — | — | — | — | — |
| IN | 19 | II | 1.00 | 2.5 | 20 | .19 | .0048 | 20-25 | 1.8 | — | — | — | — | — | — | — |
| IO | 27 | IX | 1.00 | 5.0 | 20 | .20ʲ | .0051ʲ | 5-10 | 0 | — | — | — | — | — | — | — |
| IP | 18 | II | 0.50 | 5.0 | 20 | .15 | .0038 | 10-15 | 0 | — | — | — | — | — | — | — |
| IQ | 19 | I | 0.50 | 5.0 | 20 | .19 | .0048 | 15-20 | 2.8 | — | — | — | — | — | — | — |

TABLE III-continued

| Experiment | Resin Prep. (Ex. No.) | CM[f] | % H$_3$PO$_4$[h] | % CA[a] | Cure Time min. | Coating Thickness mil | Coating Thickness mm | MEK Res. (DR) | 1/16 in. (1.59 mm)[c] Wedge Bend[b] (mm fail) | 1/8 in. (3.175 mm)[d] Wedge Bend[b] (mm fail) | Tg[e] (°C) | Coating Thickness mil | Coating Thickness mm | T-PEEL Dry/Wet (Kg/5 mm) | Reverse Impact in.-lbs | Reverse Impact Kg-cm |
|---|---|---|---|---|---|---|---|---|---|---|---|---|---|---|---|---|
| IR | 18 | II | 0.75 | 5.0 | 20 | .16 | .0041 | 10-15 | 3.8 | — | — | — | — | — | — | — |
| IS | 19 | I | 0.75 | 5.0 | 20 | .19 | .0048 | 15-20 | 0 | — | — | — | — | — | — | — |
| IT | 18 | II | 1.00 | 5.0 | 20 | .21 | .0053 | 15-20 | 3.8 | — | — | — | — | — | — | — |
| IU | 19 | I | 1.00 | 5.0 | 20 | .18 | .0046 | 20-25 | 7.9 | — | — | — | — | — | — | — |
| IV | 27 | IX | 1.00 | 5 | 20 | .20 | .0051 | 5-10 | 0 | — | — | — | — | — | — | — |
| IW | 19 | I | 0.30 | 10 | 20 | .18 | .0046 | 5-10 | 8.9 | — | — | — | — | — | — | — |
| IX | 18 | II | 0.50 | 10 | 20 | .16 | .0041 | 20-25 | 2.3 | — | — | — | — | — | — | — |
| IY | 19 | I | 0.50 | 10 | 20 | .19 | .0048 | 15-20 | 6.4 | — | — | — | — | — | — | — |
| IZ | 27 | IX | 0.50 | 10 | 20 | .21 | .0053 | 5-10 | 0 | — | — | — | — | — | — | — |
| JA | 18 | II | 0.75 | 10 | 20 | .18 | .0046 | 20-25 | 2.0 | — | — | — | — | — | — | — |
| JB | 19 | I | 0.75 | 10 | 20 | .18 | .0046 | 15-20 | 5.0 | — | — | — | — | — | — | — |
| JC | 18 | II | 1.00 | 10 | 20 | .19 | .0048 | 20-25 | 13.3 | — | — | — | — | — | — | — |
| JD | 19 | I | 1.00 | 10 | 20 | .20 | .0051 | 25-50 | 18.1 | — | — | — | — | — | — | — |
| JE | 27 | IX | 0.50 | 15 | 20 | .20 | .0051 | 5-10 | 9.5 | — | — | — | — | — | — | — |
| JF* | R2[j] | VII | 0.00 | 20 | 20 | .19 | .0048 | <5 | — | 100 | — | — | — | — | — | — |
| JG* | R2 | VII | 0.30 | 20 | 20 | .18 | .0046 | <5 | — | 9.6 | — | — | — | — | — | — |
| JH | 19 | I | 0.30 | 20 | 20 | .18 | .0046 | 5-10 | 4.1 | — | — | — | — | — | — | — |
| JI* | R2[j] | VII | 0.50 | 20 | 20 | .18 | .0046 | 5-10 | — | 11.6 | — | — | — | — | — | — |
| JJ | 19 | I | 0.50 | 20 | 20 | .18 | .0046 | 5-10 | 10.9 | — | — | — | — | — | — | — |
| JK* | R2[j] | VII | 0.75 | 20 | 20 | .19 | .0048 | 25-50 | — | 14.0 | — | — | — | — | — | — |
| JL | 19 | I | 0.75 | 20 | 20 | .19 | .0048 | 20-25 | 15.4 | — | — | — | — | — | — | — |
| JM* | R2[j] | VII | 1.00 | 20 | 20 | .19 | .0048 | — | — | 20.9 | — | — | — | — | — | — |
| JN* | C.E.P | V | 1.00 | 20 | 20 | .19 | .0048 | 25-30 | 42.1 | — | — | — | — | — | — | — |
| JO | 19 | I | 1.00 | 20 | 20 | .19 | .0048 | 25-50 | 26.8 | — | — | — | — | — | — | — |
| JP | 35 | V | 1.00 | 20 | 20 | .20 | .0051 | 20-25 | 13.8 | — | — | — | — | — | — | — |
| JQ | 32 | V | 1.00 | 20 | 20 | .18 | .0046 | 15-20 | 17.8 | — | — | — | — | — | — | — |
| JR | 31 | V | 1.00 | 20 | 20 | .25 | .0064 | 10-15 | 13.8 | — | — | — | — | — | — | — |
| JS* | C.E.O | V | 1.00 | 20 | 20 | .24 | .0061 | 75-100 | 28.5 | — | — | — | — | — | — | — |
| JT | 41 | V | 1.00 | 20 | 20 | .23 | .0058 | 10-15 | 23.9 | — | — | — | — | — | — | — |
| JU | 55 | V | 1.00 | 20 | 20 | .20 | .0051 | 15-20 | 29.0 | — | — | — | — | — | — | — |

Footnotes to Table III.
*Not an example of the present invention.
[a]Amount of curing Agent.
[b]Average of 4 samples.
[c]Diameter of Wedge Bend at the less strained end is 1/16 inch (1.59 mm).
[d]Diameter of Wedge Bend at the less strained end is 1/8 inch (3.18 mm).
[e]Glass transition temperature of coating as determined by thermomechanical analysis (TMA).
[f]Coating Method.
[g]The diglycidyl ether of bisphenol A advanced with bisphenol A, the resultant advanced resin having an EEW of 1767.
[h]The amount of 85% phosphoric acid.
[i]The diglycidyl ether of bisphenol A advanced with bisphenol A, the resultant advanced resin having an EEW of 1702.
[j]+/− 0.02 mils (+/− 0.000508 mm).
[k]The diglycidyl ether of bisphenol A advanced with bisphenol A, the resultant advanced resin having an EEW of 3018.

EXAMPLE 58

PREPARATION OF AQUEOUS DISPERSION

The advanced epoxy resin from Example 22 with an epoxide equivalent weight of 2087 (97.4 grams, 0.0468 equivalents) and 25.00 grams (0.212 moles) of 2-butoxyethanol are added to a four neck 500 milliliter round bottom flask equipped with a means for temperature control, stirring by means of a steel stirrer shaft, condensing and reactant addition under a nitrogen purge of 96 milliliters per minute. The epoxy resin is slowly dissolved by heating between 123° C. and 138° C. for a period of 34 minutes. During this time period, the nitrogen adapter which has no dip leg is replaced with one having a three inch dip leg. Then the resin is cooled to 85° C. In a two ounce (59 ml) bottle is mixed, 21.35 grams (1.19 moles) deionized water, 4.29 grams (0.035 mole) nicotinamide and 4.01 grams (0.038 mole) of an aqueous solution of 85% lactic acid. This solution is then added to the previous mixture dropwise over a period of 36 minutes while maintaining the reaction temperature between 80° C. and 85° C. The resultant mixture is stirred between 90° C. and 92° C. for an additional 129 minutes. Then 198.9 grams deionized water is added to the gray reactor contents over a seventeen minute period while maintaining the reaction temperature between 88° C. and 90° C. The white aqueous dispersion with a non-volatile content of 30 percent by weight and charge density of 0.33 milliequivalent/gram resin is allowed to cool to ambient temperature with stirring. The pH of the stable aqueous dispersion is 4.4. The viscosity which is measured with a No. 4 Ford Cup is 25.5 seconds. The volatile organic content of the dispersion is 1.80 pounds per gallon (216 grams/liter).

EXAMPLE 59

PREPARATION OF COATING

Coatings are prepared by blending 46.53 grams of the aqueous dispersion prepared in Example 58, with 0.761 grams of CYMEL TM 325 (a highly methylated melamine-formaldehyde resin having a Gardner-Holdt viscosity at 25° C. of X-$Z_1$ commercially available from the American Cyanamid Co.) as a curing agent to give a formulation containing 5.4 parts per hundred parts of resin by weight (phr) CYMEL TM 325. The formulation is applied to degreased 24 gauge ×4 inches ×12 inches (0.66 mm ×101.6 mm ×304.8 mm) unpolished clean-treated cold rolled steel panels and degreased 7.5 mils ×4.5 inches ×9.0 inches (0.19 mm ×114.3 mm ×228.6 mm) tin free steel panels with a No. 16 wire wound rod according to ASTM D 4147-82. The panels are degreased by washing the panels with Aromatic 100 (a light aromatic solvent containing primarily $C_{8-10}$ aromatic hydrocarbons commercially available from Exxon Company, USA) followed by washing with acetone and drying in an oven at 400° F. for ten minutes. The coated panels are baked in an oven at 400° F. (204.4° C.) for 10 minutes. The thickness of the coating is between 0.21 and 0.26 mils (0.0053 mm and 0.0066 mm). The results are given in Table IV.

EXAMPLE 60

PREPARATION OF COATING

Coatings are prepared by blending 51.26 grams of the aqueous dispersion prepared in Example 58, with 1.58 grams of CYMEL TM 325 as a curing agent to give a formulation containing 10.2 phr CYMEL TM 325. The formulation is applied and cured as described in Example 59. The thickness of the coating is between 0.20 and 0.23 mils (0.0051 mm and 0.0058 mm).

EXAMPLE 61

PREPARATION OF COATING

Coatings are prepared by blending 51.48 grams of the aqueous solution prepared in Example 58, with 2.32 grams of CYMEL TM 325 as a curing agent to give a formulation containing 15.0 phr CYMEL TM 325. The formulation is applied and cured as described in Example 59. The thickness of the coating is between 0.23 and 0.27 mils (0.0058 mm and 0.0068 mm). The results are given in Table IV.

EXAMPLE 62

PREPARATION OF COATING

Coatings are prepared by blending 49.62 grams of the aqueous solution prepared in Example 58, with 2.98 grams of CYMEL TM 325 as a curing agent to give a formulation containing 20.1 phr CYMEL TM 325. The formulation is applied and cured as described in Example 59. The thickness of the coating is between 0.20 and 0.25 mils (0.0051 mm and 0.0064 mm). The results are given in Table IV.

EXAMPLE 63

PREPARATION OF COATING

Coatings are prepared by blending 47.02 grams of the aqueous solution prepared in Example 58, with 3.53 grams of CYMEL TM 325 as a curing agent to give a formulation containing 25.3 phr CYMEL TM 325. The formulation is applied and cured as described in Example 59. The thickness of the coating is between 0.22 and 0.26 mils (0.0056 mm and 0.0066 mm). The results are given in Table IV.

EXAMPLE 64

PREPARATION OF COATING

Coatings are prepared by blending 46.42 grams of the aqueous solution prepared in Example 58, with 1.16 grams of CYMEL TM 325 as a curing agent to give a formulation containing 10.0 phr CYMEL TM 325. The formulation is applied and cured as described in Example 59. However, the coated panels are baked in an oven at 400° F. (204.4° C.) for 20 minutes. The thickness of the coating is between 0.26 and 0.31 mils (0.0066 mm and 0.0079 mm). The results are given in Table IV.

COMPARATIVE EXPERIMENT Q

A bisphenol A based epoxy resin having an epoxide equivalent weight of 1755 (100.0 grams, 0.0570 equivalents) and 25.66 grams (0.217 moles) of ethylene glycol n-butyl ether are added to a reactor of the type described in Example 58. The epoxy resin is slowly dissolved by heating between 122° C. and 139° C. for thirty-seven minutes under a nitrogen purge of 96 milliliters per minute. During this time period, the nitrogen adapter having no dip leg is replaced with one having a three inch dip leg. Then the resin is cooled to 70° C. In a two ounce bottle is mixed 25.70 grams deionized water (1.43 moles), 5.24 grams nicotinamide (0.0429 mole) and 4.85 grams of an aqueous solution of 85% lactic acid (0.0458 mole). This solution is then added dropwise over a period of thirty-two minutes while maintaining the reactant temperature between 70° C.

and 82° C. The mixture is stirred between 88° C. and 90° C. for an additional 125 minutes. Then 228.6 grams deionized water is added tot he yellow reactor contents over a nineteen minute period while maintaining the reaction temperature at 88° C. The yellow aqueous dispersion with a non-volatile content of 28 percent and charge density of 0.39 milliequivalent/gram resin is allowed to cool to ambient temperature with stirring. The pH of the stable aqueous dispersion is 5.5. The viscosity which is measured with a Ford Cup No. 4 is 13.4 seconds. The volatile organic content of the dispersion is 1.79 pounds per gallon (214 grams/liter).

EXAMPLE 65

PREPARATION OF COATING

Coatings are prepared by blending 21.02 grams of the aqueous dispersion prepared in Example 58, 18.798 grams of the aqueous dispersion prepared in Comparative Experiment Q, with 1.10 grams of CYMEL TM 325 as a curing agent to give a formulation containing 10.5 phr CYMEL TM 325. The formulation is applied and cured as described in Example 59. The thickness of the coating is between 0.18 mils and 0.21 mils (0.0046 mm and 0.0053 mm). The results are given in Table IV.

TABLE IV

| Base Dispersion | Curing Agent phr | MEK Resistance DR | FLEXIBILITY | | WATER PASTEURIZATION | |
|---|---|---|---|---|---|---|
| | | | T-Bend | Rev. Impact In-Lb. J | Adhesion | Blush |
| Ex. 28 | 5.4 | 9 | T2 | 112 12.6 | 5A/5A | B1 |
| Ex. 29 | 10.2 | 25 | T2 | 88  9.9 | 5A/5A | B1 |
| Ex. 30 | 15.5 | 25 | T3 | 76 8.6 | 5A/5A | B1 |
| Ex. 31 | 20.2 | 15 | T3 | 44 5.0 | 5A/4A | B1 |
| Ex. 32 | 25.3 | 15 | T5 | 28 3.2 | 5A/5A | B6 |
| Ex. 33 | 10.0 | 80 | T2 | 100 11.3 | 5A/5A | B1 |
| Ex. 34 | 10.5 | 50 | T2 | 96 10.8 | 5A/5A | B1 |

ELECTRODEPOSITION COATINGS

Preparation of Crosslinker A

Into a five liter round bottom flask equipped with a condenser, mechanical stirrer, nitrogen inlet, addition funnel and a thermometer is charged 1610.6 grams (12.88 equiv) of Methylene-di-phenylene di-isocyanate (MDI) and 1301 g of MIBK. The isocyanate is 48% of the 2,4 isomer and had an equivalent weight of 125. The mixture is heated to about 60 deg C at which time 1.6 g (0.1 st%) of T-12 catalyst is added. While maintaining the temperature between 60 and 70 deg C, 210 g of a mixture of polypropylene glycols (1.288 equiv of di-propylene glycol and 1.288 equiv of tri-propylene glycol) is added over a period of 25 minutes through the addition funnel. Next 1216 grams (10.31 equiv) of Dowanol EB (Ethylene Glycol Butyl Ether) is added over a period of 80 minutes. The mixture is maintained at 70 deg C for an additional 90 minutes at which time an Infrared spectrum is taken to assume no free isocyanate.

The resulting blocked isocyanate is 70% non-volatile.

Preparation of Surfactant A

In a 500 ml beaker a slurry is made by adding 80 grams of Geigy Amine C (Imidazoline) to 222.3 grams of D.I. water. Then 14.7 g of Acetic Acid and 105 g of Dowanol EB is added. The solution is then heated until it turned clear. Then 80 g of melted Surfynol 104 is added and the mixture is heated to 75 deg C. When the solution again turned clear, it is cooled down and filtered through a 25 micron bag filter bag. The resulting surfactant is approximately 40% non-volatile.

EXAMPLE 66

Into a one liter round bottom flask equipped with a mechanical stirrer, condenser, nitrogen inlet, and a thermometer is charged 132 g (0.7 equiv) of the diglycidyl ether of bisphenol A,(having an epoxide equivalent weight of 188.7), 198.2 g (0.58 equiv) of a product which is substantially the diglycidyl ether of an adduct of 3.4 moles of propylene oxide and one mole of bisphenol A (Epoxide equivalent weight of 341.3, prepared by treating the adduct of bisphenol A and propylene oxide with epichlorohydrin in the presence of lewis acid catalyst, followed by treatment with sodium hydroxide), and 109.8 g (0.88 equiv) of 1,1-bis(3-hydroxyphenoxy)ethane prepared as in Example 1. The mixture is heated to 85° C. and 0.23 g of a 70% solution of ethyltriphenyl phosphonium phosphate in methanol is added as a catalyst. The mixture is heated to 175° C. and allowed to exotherm to 185° C. The temperature is maintained at 175° C. for an additional hour. The epoxide equivalent weight of the advanced resin is 1125. The resin is cooled to 100° C. and 169.8 g of methyl isobutyl ketone is added. At 90° C., 43.3 g (0.41 equiv) of 2-(methylamino)ethanol is added and allowed to react with the epoxy for one hour at a temperature between 95° and 100° C. The solution is then cooled to room temperature and the non-volatile content is measured at 73.7%.

An aqueous dispersion is prepared by combining 285 grams of the above resin solution, 165 g of Crosslinker A (70% non-volatile), 13.0 g of propylene glycol phenyl ether, 4.2 G of Surfactant A, and 12.8 g of lactic acid solution (73.5%) into a suitable reaction vessel. The mixture is stirred very rapidly as 537 grams of D.I. water is added in a dropwise fashion over a 90 minute period. The resultant aqueous dispersion is then stripped of methyl isobutyl ketone solvent to yield a dispersion of about 32 percent solids.

The dispersion is then pigmented with a commercial ED-4 pigment paste to a pigment/binder ratio of 0.25. The final bath has a non-volatile content of 20 percent.

COMPARATIVE EXPERIMENT R

Into a Two liter round bottom flask equipped with a mechanical stirrer, condenser, nitrogen inlet, and a thermometer is charged 313.3 g (1.6 equiv.) of the Diglycidyl ether of bisphenol A, (having an epoxide equivalent weight of 188.7), 234.2 g (2.07 equiv) of Bisphenol A, and 450.5 g (1.32 equiv) of a product which is substantially the diglycidyl ether of an adduct of 3.4 moles of propylene oxide and one mole of bisphenol A (Epoxide equivalent weight of 341.3, prepared by treating the adduct of Bisphenol A and propylene oxide with epichlorohydrin in the presence of Lewis acid catalyst, followed by treatment with sodium hydroxide). The mixture is heated to 85° C. and 1.22 g of a 70% solution of ethyltriphenyl phosphonium phosphate in methanol is added as a catalyst. The mixture is heated to 175° C. and allowed to exotherm to 185° C. The temperature is maintained at 175° C. for an additional hour. The epoxide equivalent weight of the advanced resin is 1050. The resin is cooled to 110° C. and 366.7 g of methyl isobutyl ketone (MIBK) is added. At 90° C. 100 g (0.95 equiv) of 2-(methylamino)ethanol is added and allowed to react with the epoxy for 45 minutes at a temperature between 95° and 100° C. The solution is then cooled to room temperature and the non-volatile content is measured at 74.0%.

An aqueous dispersion is prepared by combining 285 g of the above resin solution, 165% of Crosslinker A (70% non-volatile), 13.1 g of propylene glycol phenyl ether, 4.2 g of Surfactant A, and 13.1 g of lactic acid solution (73.5%) into a suitable reaction vessel. The mixture is stirred very rapidly as 540.7 g of D.I. water is added in a dropwise fashion over a period of 90 minutes. The resultant aqueous dispersion is then stripped of methyl isobutyl ketone solvent to yield a dispersion of about 32 percent solids.

The dispersion is then pigmented with a commercial ED-4 pigment paste to a pigment/binder ratio of 0.25. The final bath has a non-volatile content of 20 percent.

The following Table V contains physical properties of the coatings from Example 66 and Comparative Experiment R.

TABLE V

|  | Example 66 | Comp. Expt. R* |
|---|---|---|
| Thickness (250 v) | | |
| , mils | 1.2 | 1.1 |
| , mm | 0.031 | 0.028 |
| G. M. SCAB CORROSION | | |
| (Bonderite 40), mm | 1.8 | 2.0 |
| (Bare Steel), mm | 9.6 | 15.8 |
| $Tg^a$, °C. | 81.6 | 96.5 |
| Flexibility 1/16" (1.59 mm) Wedge Bend, mm of failure | 8.0 | 9.0 |
| Throwpower (275 v) | | |
| , in. | 11.9 | 11.3 |
| , cm | 30.2 | 28.7 |
| Chip Resistance | 35.8 | 41.2 |

*Not an example of the present invention.
$^a$Determined by DSC.

The data in Table V shows that by substituting an alkylenedioxydiphenol in place of a bisphenol, the resultant coatings exhibit improved chip resistance, throwpower, flexibility, corrosion resistance and the like.

EXAMPLE 67

Into a 1 liter round bottom flask equipped with a condenser, a thermometer, nitrogen inlet, and a mechanical stirrer is charged 334.5 grams (1.77 equiv) of the diglycidyl ether of bisphenol A (having an EEW of 188.7), and 165.5 g (1.33 equiv) of 1,2-bis(3-hydroxyphenoxy(ethane prepared as in Example 1. The mixture is heated to 100° C. and 0.31 g of a 70% solution of ethyltriphenyl phosphonium phosphate in methanol is added as a catalyst. The mixture is heated to 150° C. and allowed to exotherm to 185° C. The temperature is maintained at 175 for 20 minutes and the epoxide equivalent weight is 1155. The mixture is cooled to 110° C. and 181 g of methyl isobutyl ketone is added. At 75° C. 45.5 g of 2-(methylamino)ethanol is added and allowed to react with the epoxy for 80 minutes. The solution is then cooled to room temperature and the non-volatile content is measured at 77.3%.

An aqueous dispersion is prepared by combining 275 grams of the above resin solution, 167.1 g of Crosslinker A, 13.2 g of propylene glycol phenyl ether, 4.3 g of Surfactant A, and 12.1 g of lactic acid (73.5% non-volatile) in a suitable reaction vessel. The mixture is stirred very rapidly as 558 g of D.I. water is added dropwise over a period of 90 minutes. The resulting aqueous dispersion is then stripped of methyl isobutyl ketone solvent to yield a dispersion of about 32 percent solids.

The dispersion is then pigmented with a commercial ED-4 pigment paste to a pigment/binder ratio of 0.25/1. The final bath has a non-volatile content of 20 percent.

COMPARATIVE EXPERIMENT S

Into a one liter round bottom flask equipped with a condenser, nitrogen inlet, thermometer, and mechanical stirrer is charged 341.6 grams (1.81 equiv) of the diglycidyl ether of bisphenol A (Epoxide equivalent weight of 188.7) and 158.4 grams (1.39 equiv) of Bisphenol A. The mixture is heated to 95° C. and 0.96 g of a 70% solution of ethyltriphenyl phosphonium phosphate is added as a catalyst. The mixture is heated to 150° C. and allowed to exotherm to 194° C. The temperature is then maintained at 175° C. for an additional 40 minutes at which time the % epoxy is at 3.55%. The solution is cooled and 223.5 g of methyl isobutyl ketone is added. At 95° C., 41.6 g (0.4 equiv) of 2-(methylamino)ethanol is added and allowed to react between 95° and 100° C. for at least an hour. The final solution is then cooled to room temperature and the non-volatile content is measured at 70.1%.

An aqueous dispersion is prepared by combining 300 g of the above resin solution, 165.2 g of Crosslinker A, 13.0 g of propylene glycol phenyl ether, 4.2 g of Surfactant A, and 12.4 g of lactic acid solution (73.5%) into a reaction vessel. The mixture is stirred very rapidly as 524 g of D.I. water is added in a dropwise fashion over a period of 90 minutes. The resultant aqueous dispersion is then stripped of methyl isobutyl ketone solvent to yield a dispersion of about 32 percent solids.

The dispersion is then pigmented with a commercial ED-4 pigment paste to a pigment/binder ratio of 0.25/1. The final bath has a non-volatile content of 20 percent.

The following Table VI contains physical properties of the coatings from Example 66 and Comparative Experiment R.

TABLE VI

|  | Example 67 | Comp. Expt. S* |
|---|---|---|
| Thickness (250 v) | | |
| , mils | 0.32 | 0.28 |
| , mm | 0.01 | 0.01 |
| G. M. SCAB CORROSION | | |
| (Bonderite 40), mm | — | 3.2 |
| (Bare Steel), mm | — | 30 |
| $Tg^a$, °C. | 117 | 133 |
| Flexibility 1/16" (1.59 mm) Wedge Bend, mm of failure | 25.0 | 30.0 |
| Throwpower (275 v) | | |
| , in. | >16 | 12.6 |
| , cm | >40.64 | 30.2 |
| Chip Resistance | — | 74 |

*Not an example of the present invention.
$^a$Determined by DSC.

EXAMPLE 68

Into a one liter round bottom flask equipped with a condenser, nitrogen inlet, thermometer, and a mechanical stirrer is charged 134.6 grams (0.71 equiv) of the diglycidyl ether of bisphenol A (having an EEW of 188.7), and 154.6 grams (1.36 equip) of bisphenol A, and 201.9 grams (1.09 equiv) of the diglycidyl ether of 1,2-bis(3-hydroxyphenoxy)ethane prepared as in Example 8 having an EEW of 185.5. The mixture is heated to 105° C. and 0.57 g of a 70% solution of ethyltriphenyl phosphonium phosphate is added as a catalyst. The mixture is heated to 150 deg C and allowed to exotherm. The temperature is maintained at 165°–170° C. for an additional 40 minutes and the epoxide equivalent weight is analyzed to be 1115. The mixture is cooled to 110° C. and 179.1 g of methyl isobutyl ketone is added. At 85° C., 46.2 g of 2-(methylamino)ethanol is added and allowed to react with the epoxy for 60 minutes. The resin solution is then cooled to room temperature and the non-volatile content is measured at 76.0%.

An aqueous dispersion is prepared by combining 280 grams of the above resin solution, 167.2 grams of Crosslinker A, 13.2 g of propylene glycol phenyl ether, 4.3 g of Surfactant A, and 13.0 grams of lactic acid (73.5% non-volatile) in a suitable reaction vessel. The mixture is stirred very rapidly ad 553 grams of D.I. water is added dropwise over a period of 90 minutes. The resulting aqueous dispersion is then stripped of methyl isobutyl ketone solvent to yield a dispersion of about 32 percent solids.

The dispersion is then pigmented with a commercial ED-4 pigment paste to a pigment/binder ratio of 0.25. The final bath has a non-volatile content of 20 percent.

The results are given in Table VII.

EXAMPLE 69

Into a 1 liter round bottom flask equipped with a condenser, thermometer, nitrogen inlet, and a mechanical stirrer is charged 100.4 grams (0.53 equiv) of the diglycidyl ether of bisphenol A having an EEW of 188.7, and 150.1 grams (0.81 equiv) of the diglycidyl ether of 1,2-bis(3-hydroxyphenoxy)ethane prepared as in Example 8 having an EEW of 185.5, and 124.7 grams (1 equiv) of 1,2-bis(3-hydroxyphenoxy)ethane prepared as in Example 1. The mixture is heated to 110° C. and 0.3 grams of a 70% solution of ethyltriphenyl phosphonium phosphate in methanol is added as a catalyst. The mixture is heated to 160° C. and allowed to exotherm. The temperature is then maintained between 165° and 170° C. for 30 minutes. The epoxide equivalent weight is measured at 1181. The mixture is then cooled to 120° C. and 136.2 grams of methyl isobutyl ketone is added. At 90° C., 33.3 grams of 2-(methylamino)ethanol is added and allowed to react with the epoxy for 60 minutes at a temperature between 90° and 95° C. The solution is then cooled to room temperature and the non-volatile content is measured at 75.4%.

An aqueous dispersion is prepared by combining 280 grams of the above resin solution, 165.9 g of Crosslinker A, 13.1 g of propylene glycol phenyl ether, 4.2 g of Surfactant A, and 12.2 g of lactic acid (73.5% non-volatile) in a suitable reaction vessel. The mixture is stirred very rapidly as 547 g of D.I. water is added dropwise over a period of 90 minutes. The resulting aqueous dispersion is then stripped of methyl isobutyl ketone solvent to yield a dispersion of about 32 percent solids.

The dispersion is then pigmented with a commercial ED-4 pigment paste to a pigment/binder ratio of 0.25/1. The final bath has a non-volatile content of 20 percent.

The results are given in Table VII.

TABLE VII

| | Example 68 | Example 69 |
|---|---|---|
| Thickness (250 v) | | |
| , mils | 0.31 | 0.33 |
| , mm | 0.01 | 0.01 |
| G. M. SCAB CORROSION | | |
| (Bonderite 40), mm | — | 3.2 |
| (Bare Steel), mm | — | 30 |
| Tg$^a$, °C. | 147 | 101 |
| Flexibility 1/16" (1.59 mm) Wedge Bend, mm of failure | 19 | 14 |
| Throwpower (275 v) | | |
| , in. | >16 | >16 |
| , cm | >40.6 | >40.6 |

$^a$Determined by DSC.

TEST PROCEDURES

EPOXIDE EQUIVALENT WEIGHT (EEW)

The epoxide equivalent weight is determined by titration with perchloric acid and tetramethyl ammonium bromide by the procedure of ASTM D-1652-87.

GLASS TRANSITION TEMPERATURE (Tg)

The glass transition temperature of the resins are determined on a DuPont 912 Differential Scanning Calorimeter (DSC). The glass transition temperature of the cured coatings is determined on a DuPont 943 Thermomechancal Analyzer (TMA). The glass transition temperature of the cured coatings prepared in Examples 66–69 and comparative experiments S and R are determined by differential scanning calorimetry (DSC).

MOLECULAR WEIGHT

Molecular weight is determined by Gel Permeation Chromatography (GPC) on a Waters model 150-C Gel Permeation Chromatograph equipped with a Bimodal Column Set using tetrahydrofuran eluant at 1 cc/min. calibrated against polystyrene standards.

WEDGE BEND

Wedge bend is determined according to a modified ASTM D3281-84 procedure, where the diameter of the bend at the less stressed end is either ⅛ inch (3.175 mm) or 1/16 inch (1.5875 mm). The bend is taped and pulled with Scotch brand 610 tape and treated with acidic copper sulfate solution to highlight the exposed metal. The results are reported as millimeters of coating failure.

METHYL ETHYL KETONE (MEK) RESISTANCE

The resistance of the cured coating on a cold rolled steel panel to removal with methyl ethyl ketone is determined by rubbing across the baked panels a two pound ball pein hammer with the ball end covered with eight layers of cheesecloth which has been saturated with methyl ethyl ketone (MEK). No force is applied to the hammer other than that necessary to guide the hammer back and forth over the same area. A twelve inch ruler clamped into place is used to guide the hammer in the same path. The coated panels after rubbed are dipped into a mixture of 20% CuSO4 5H2O and 10% concentrated hydrochloric acid in water for 30 seconds and then dipped into deionized water to determine breakthrough. A forward and reverse stroke returning to the starting point is considered as being one MEK double rub.

T-BEND

T-bend is used as a measure of the flexibility of the coating on the panel at a slow rate of deformation. The edges of the cold rolled steel panel are cut to leave a two inch wide specimen of uniform thickness. A bend is made in the panel at approximately 0.75 inches from the end of the coated panel by using a fingerbrake. The bend is squeezed tight with the palm of the hand. Then the bent specimen is placed in a vice, which is previously taped with plastic tape to prevent scratching the substrate, and the panel is bent back on itself to form a 180 degree bend. The stressed area is then tested for adhesion by taping with Scotch 610 tape. The tape is applied in such a manner where no air bubbles are trapped under the tape. The tape is then pulled with a rapid and forceful fashion at a 90 degree angle in an attempt to pull the coating away from the substrate. Next the bend is dipped into a solution of copper sulfate (10 grams) in 1.0 N hydrochloric acid for 30 seconds and then dipped into deionized water. The purpose of this step is to oxidize any resulting bare metal in order to more accurately observe adhesion failures. The specimen is examined under a magnifying glass to determine failure. The first bend is noted as T0 (T zero) because there is no panel sandwiched between the bend. The process of bending the panel by using the fingerbrake and vice is continued until there is no sign of cracking or adhesion loss. Each successive bend is noted as T1, T2, T3, T4, etc. because of the number of layers of panel sandwiched between plys. The lower the number of T-bends, the better the flexibility.

IMPACT RESISTANCE

Impact resistance is a measure of the formability of a coating on a panel at a rapid rate of deformation.

Coated cold rolled steel panels are subjected to the impact of a falling weight from a Gardner Impact Tester at different calibrated heights ranging from 0 to 160 inch-pounds. The impacted area is then tested for adhesion by taping with Scotch 610 tape. The tape is applied in such a manner that no air bubbles are trapped under the tape. The tape is then pulled wit ha rapid and forceful fashion at a 90 degree angle in an attempt to pull the coating away from the substrate. Next, a solution of copper sulfate (10 grams) in 1.0N hydrochloric acid (90 grams) is applied to the impacted area to check for failure. The specimen is examined under a table-top illuminated magnification system with lenses having a total of 11 diopter power to determine failure.

WATER PASTEURIZATION RESISTANCE

Water pasteurization resistance is performed on a single specimen for each coating to determine the permeability of the coating to water with pressure and heat. The coating substrate is tin free steel. The width of each specimen is about 12 centimeters while the length is about 6 centimeters. A mold and the Gardner Impacter Tester are used to form a semi-circular bend in each specimen. The semi-circular bend is used to simulate a stressed area. The dart impacter rod is dropped from 56 inch-pounds for all the specimens when forming the bend. The specimens are then placed in a Model 8100-TD NORCO Autoclave with deionized water for 90 minutes at 121° C. (250 F.) and 1 bar (15 psi) pressure. The clock is only started after both the desired temperature and pressure are reached. After the specimens are pasteurized for the prescribed conditions, the heat is turned off, the pressure bled off and the panels removed for testing. The coated specimens are submerged in deionized water after removal from the autoclave. The specimens are blotted dry after removal from the water with a paper towel. They are rated for blush and adhesion.

The tested coatings are rated for blush by placing the specimens next to the panels from which the specimens are cut. The coatings are rated for blush according to the following scale:

| Rating | Description |
|--------|-------------|
| B1 | No blush |
| B2 | Dull, loss of luster |
| B3 | Total loss of luster |
| B4 | Blush, cloudy, starting to loose transparency |
| B5 | Cloudy, expanded coating, few bubbles, a little roughness |
| B6 | No longer clear, rough surface, bubbles |
| B7 | Very rough or cracked surface, many bubbles |

Adhesion is determined by using the tape test described in method A in ASTM 3359-87. The tape is Scotch 610 tape. X-cuts are made in the stressed and non-stressed areas of each specimen. The adhesion of the non-stressed specimen is listed first while the adhesion in the stressed area is listed second. The coatings are listed for adhesion according to the following scale.

WET AND DRY ADHESION

The coatings are tested for wet and dry adhesion under wet and dry conditions, using the T-peel test ASTM D1876 (1978). A wet adhesion test is performed on test panels by first immersing the test panels in 90° C. water for four days and then carrying out the T-peel test. A dry adhesion test is carried out on

| Rating | Description |
|--------|-------------|
| 5A | No peeling or removal |
| 4A | Trace peeling or removal along incisions. |
| 3A | Jagged removal along most of incisions up to 1/16 inch (1.6 mm) on either side |
| 2A | Jagged removal along most of the incisions up to ⅛ inch (3.2 mm) on either side |
| 1A | Removal from most of the area of the X under the tape |
| 0A | Removal beyond the area of the X | test panels without immersing the test panels in 90° C. water.

THROWPOWER

Two 18"×4" (45.72 cm×10.16 cm) phosphated panels are assembled face-to-face and parallel with a ⅜" (9.5 mm) space between them using a slotted rubber strip down each side. Only the bottom of the assembly is open for paint and current. The coatings are electrodeposited for two minutes at 275 volts at 80° F. (26.7° C.). A linear measurement of how high the coating plated on the inside of the assembly is referred to as throw, the results being indicated in the tables as throwpower.

CHIP RESISTANCE

The Chip Resistance is determined by the procedure of ASTM D3170-78 and the results are quantified using a Que-2 Image analyzer. The number recorded represents the number of chips in an 80 cm² area multiplied by the average area of each chip. The smaller the number, the better the chip resistance.

GM SCAB CORROSION TEST

This test is a cyclic test where the panels are scribed and subjected to 20 corrosion cycles. One cycle consists of a 24 hour period which the panels are immersed in ambient temperature 5% salt solution for 15 minutes followed by a room temperature drying period for one hour and 15 minutes and then placed in a humidity cabinet (60° C. and 85% relative humidity) for 22 hours and 30 minutes. During cycles 1, 6, 11 and 16, the panels are additionally exposed to hot and cold by placing them in an oven at 60°0 C. for 1 hour followed by a freezer at −10° F. (−23.9° C.) for 30 minutes. During these cycles, the total time the panels are in the humidity cabinet is 22 hours and 30 minutes. After 20 cycles, the panels are scraped to remove any loose coatings. Then the width of the scribe is measured in millimeters at ten different positions. The results are reported as the average width of the total creep. A lower number represents better corrosion resistance.

What is claimed is:

1. An advanced resin or mixture of such advanced resins in any combination represented by the following formulas IA, IB, IC or ID

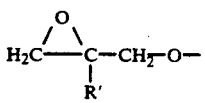

Formula IA

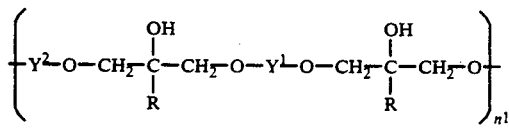

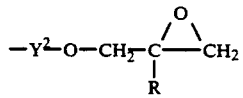

HO—

Formula IB

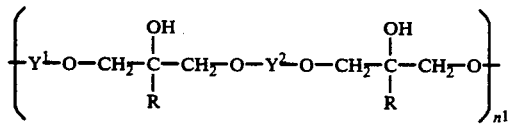

—Y$^L$—OH

Formula IC

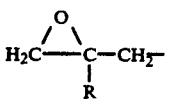

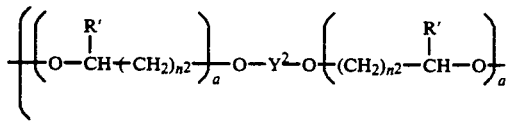

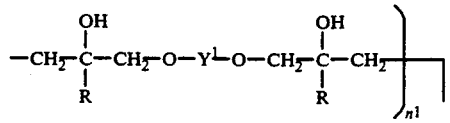

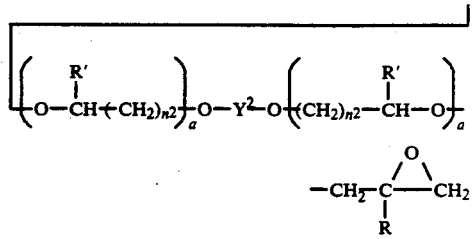

HO—

Formula ID

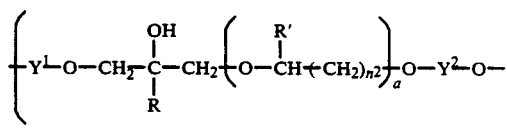

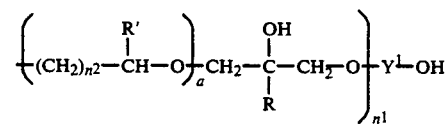

wherein each A is independently a single bond, —O—, —S—, —S—S—, —SO—, —SO$_2$—, —CO—, —O—CO—O—, —O—R$^1$—O—, —(O—CH$_2$—CHR$^2$—)$_n$—O— or —R$^3$; each Q is independently a divalent group represented by the formulas

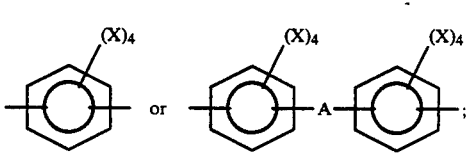

each Q' is independently a divalent aliphatic or cycloaliphatic group having from 2 to about 20 carbon atoms or Q' is a group represented by the formulas

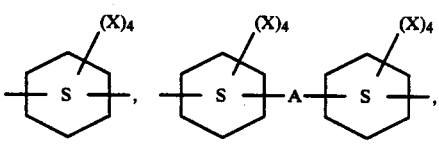

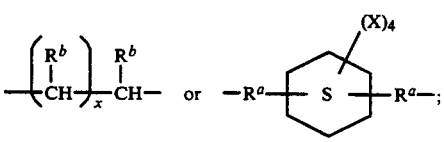

each Q$^1$ is independently a divalent group represented by the formula

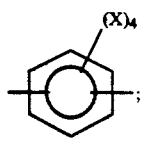

each $Q^2$ is a group represented by the formula

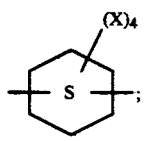

each R is independently hydrogen or a $C_1$ to $C_4$ alkyl group; each R' is independently hydrogen or an alkyl group having from 1 to about 6 carbon atoms; each $R^a$ is independently a divalent hydrocarbyl group having from 1 to about 6 carbon atoms; each $R^b$ is independently hydrogen or a monovalent hydrocarbyl group having from 1 to about 6 carbon atoms; $R^1$ is a divalent hydrocarbyl group having from 1 to about 36 carbon atoms; $R^2$ is hydrogen, methyl, ethyl or phenyl; $R^3$ is a divalent hydrocarbyl group having from 1 to about 36 carbon atoms; each X is independently hydrogen, a halogen, —SO—$R^4$, —$SO_2$—$R^4$, —CO—$R^4$, —CO—O—$R^4$, —O—CO—$R^4$, —S—$R^4$, —$OR^4$, or —$R^4$; $R^4$ is a monovalent hydrocarbyl group having from 1 to about 12 carbon atoms; each $Y^1$ is independently—(Q—T)m—Q—; each $Y^2$ is independently —(Q—T)m—Q— or —(Q'—T)$_m$—Q'—, or —(Q—T)-$_m$—Q—(O—$CH_2$—C(OH)(R)—$CH_2$—O—(Q—T)-$_m$—Q)$_n3$—; each $Y^3$ is independently a divalent group represented by the formulas

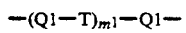

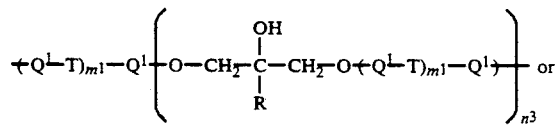

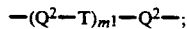

each T is independently an —$OR^1O$— or —(O—$CH_2$—$CHR^2)_n$—O— group; each a independently has a value from 1 to about 25; each m independently has a value from zero to about 25; $m^1$ has a value from 1 to about 25; n has a value from 1 to about 10; $n^1$ has a value from 1 to about 100; $n^2$ has a value of 1 or 3; $n^3$ has a value from zero to about 10; and x has a value from 2 to about 19; with the proviso that at least one of said advanced resins or unadvanced compounds contains at least one —O—$R^1$—O— or —(O—$CH_2$—$CHR^2$—)$_n$—O— group is present as a bridge between two groups selected independently from the group consisting of (1) a saturated or unsaturated cycloaliphatic group, (2) an aromatic group, (3) a group represented by the formula

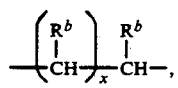

or (4) a group represented by the formula

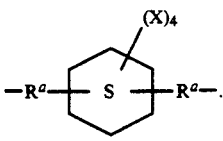

2. An advanced resin or an unadvanced compound or mixture of such advanced resins and /or unadvanced compounds in any combination of claim 1 wherein
(a) each (A) is independently a single bond, —O—$R^1$—O—, —(O—$CH_2$—$CHR^2)_n$—O— or —$R^3$—, with the proviso that there be at least one A group and that at least one A group is either an —O—$R^1$—O— or —(O—$CH_2$—$CHR^2)_n$—O— group;
(b) each R is hydrogen or a methyl group;
(c) each $R^a$ is independently a divalent hydrocarbyl group having from 1 to about 4 carbon atoms;
(d) each $R^b$ is independently hydrogen or a monovalent hydrocarbyl group having from 1 to about 4 carbon atoms;
(e) each R' is independently hydrogen, or an alkyl group having from 1 to about 4 carbon atoms;
(f) each $R^1$ is a divalent hydrocarbyl group having from 2 to about 24 carbon atoms;
(g) $R^2$ is hydrogen, methyl or ethyl;
(h) each $R^3$ is a divalent hydrocarbyl group group having from 1 to about 24 carbon atoms;
(i) each X is independently hydrogen, a halogen, —SO—$R^4$, —$SO_2$—$R^4$, —CO—$R^4$, —CO—O—$R^4$, —O—CO—R4 —S—$R^4$, —$OR^4$, or —$R^4$;
(j) $R^4$ is a monovalent hydrocarbyl group having from 1 to about 10 carbon atoms;
(k) a has a value from 1 to about 15;
(l) m has a value from zero to about 10;
(m) $m^1$ has a value from 1 to about 10;
(n) n has a value from 2 to about 8;
(o) $n^1$ has a value from about 1 to about 80;
(p) $n^3$ has a value from 0.1 to about 5; and
(q) x has a value from 3 to about 10.

3. An advanced resin or an unadvanced compound or mixture of such advanced resins and/or unadvanced compounds in any combination of claim 1 wherein
(a) each (A) is independently a single bond, —O—$R^1$—O—, —(O—$CH_2$—$CHR^2)_n$—O— or —$R^3$—, with the proviso that there be at least one A group and that at least one A group is either an —O—$R^1$—O— or —(O—$CH_2$—$CHR^2)_n$—O— group;
(b) each R is hydrogen;
(c) each $R^a$ is independently a divalent hydrocarbyl group having from 1 to about 2 carbon atoms;
(d) each $R^b$ is independently hydrogen or a monovalent hydrocarbyl group having from 1 to about 2 carbon atoms;
(e) each $R^1$ is a divalent hydrocarbyl group having from 2 to about 12 carbon atoms;
(f) $R^2$ is hydrogen;
(g) each $R^3$ is a divalent hydrocarbyl group having from 1 to about 12 carbon atoms;
(h) each X is independently hydrogen, a halogen, —SO—$R^4$, —$SO_2$—$R^4$, —CO—$R^4$, —CO—O—$R^4$, —O—CO—$R^4$, —S—$R^4$, —$OR^4$, or —$R^4$;
(i) $R^4$ is a monovalent hydrocarbyl group having from 1 to about 8 carbon atoms;

(j) a has a value from 1 to about 10;
(k) m has a value from zero to about 5;
(l) $m^1$ has a value from 1 to about 5;
(m) n has a value from about 2 to about 5;
(n) $n^1$ has a value from about 2 to about 60; and
(o) x has a value from 3 to about 5.

4. An advanced resin prepared by reacting a composition comprising
   (1) at least one diglycidyl ether of a compound containing an average of more than one but not more than about two phenolic hydroxyl groups per molecule; with
   (2) at least one compound containing an average of more than one but not more than about two phenolic hydroxyl groups per molecule; wherein components (1) and (2) are employed in amounts which provide a ratio of phenolic hydroxyl groups per epoxide group of from about 0.5:1 to about 2:1; and characterized in that at least one of the components (1) or (2) contains at least one —O—$R^1$—O— group or a —(O—$CH_2$—$CHR^2$)$_n$—O— groups as a bridge between two groups selected independently from the group consisting of (a) a saturated or unsaturated cycloaliphatic group, (b) an aromatic group, (c) a group represented by the formula

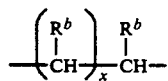

and (d) a group represented by the formula

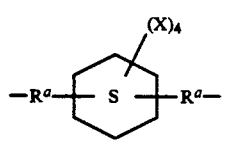

wherein each $R^a$ is independently a divalent hydrocarbyl group having from 1 to about 6 carbon atoms; each $R^b$ is independently hydrogen or a monovalent hydrocarbyl group having from 1 to about 6 carbon atoms; $R^1$ is a divalent hydrocarbyl group having from 1 to about 36 carbon atoms; $R^2$ is hydrogen, methyl, ethyl or phenyl; each X is independently hydrogen, a halogen, —SO—$R^4$, —$SO_2$—$R^4$, —CO—$R^4$, —CO—O—$R^4$, —O—CO—$R^4$, —S—$R^4$, —$OR^4$, or —$R^4$; $R^4$ is a monovalent hydrocarbyl group having from 1 to about 12 carbon atoms; n has a value from 1 to about 10; and x has a value from 2 to about 19.

5. An advanced resin of claim 4 wherein
   (a) component (1) is a compound represented by the following formulas IE, II or III

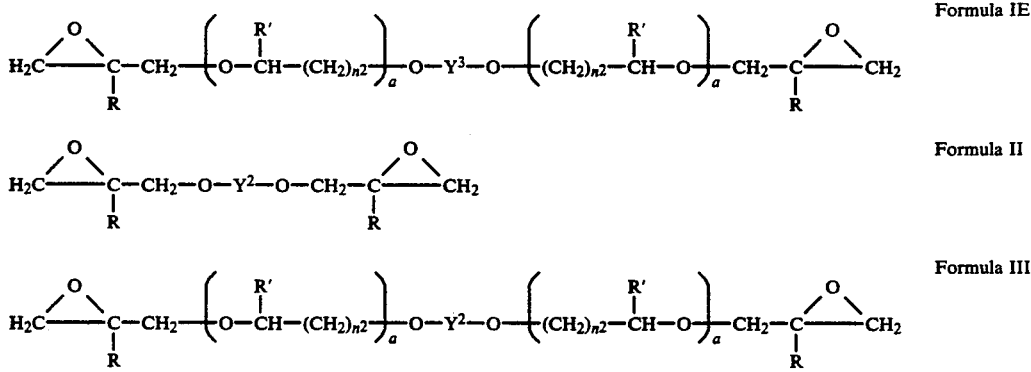

Formula IE

Formula II

Formula III wherein each A is independently a single bond, —O—, —S—, —S—S—, —SO—, —$SO_2$—, —CO—, —O—CO—O—, —O—$R^1$—O—, —(O—$CH_2$—$CHR^2$)$_n$—O—, or —$R^3$—; each Q is independently a divalent group represented by the formulas

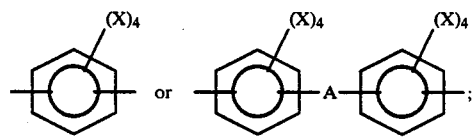

each Q' is independently a divalent aliphatic or cycloaliphatic group having from 2 to about 20 carbon atoms or Q' is a group represented by the formulas each $Q^1$ is independently a divalent group represented by the formula each $Q^2$ is a group represented by the formula each R is independently hydrogen or a $C_1$ to $C_4$ alkyl group; each R' is independently hydrogen or an alkyl group having from 1 to about 6 carbon atoms; each $R^a$ is independently a divalent hydrocarbyl group having from 1 to about 6 carbon atoms; each $R^b$ is independently hydrogen or a monovalent hydrocarbyl group having from 1 to about 6 carbon atoms; $R^1$ is a divalent hydrocarbyl group having from 1 to about 36 carbon atoms; $R^2$ is hydrogen, methyl, ethyl or phenyl; $R^3$ is a divalent hydrocarbyl group having from 1 to about 36 carbon atoms; T is $-OR^1O-$ or $-(O-CH_2-CHR^2-)_n-O-$; each $Y^1$ is independently $-(Q-T)_m-Q-$; each $Y^2$ is independently $(Z-T)_m-Q-$ or $-(Q'-T)_m-Q'-$, or $-(Q-T)_m-Q-(O-CH_2-C(OH)(R)-CH_2-O-(Q-T)_m-Q_{n3}-$; each $Y^3$ is independently a divalent group represented by the formulas $-(Q^1-T)_{m1}-Q^1-$,

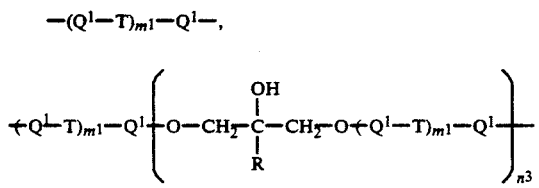

or $-(Q^2-T)_{m1}-Q^2-$, each X is independently hydrogen, a halogen, $-SOR^4$, $-SO_2-R^4$, $-CO-R^4$, $-CO-O-R^4$, $-O-CO-R^4$, $-S-R^4$, $-OR^4$, or $-R^4$ wherein $R^4$ is a monovalent hydrocarbyl group having from 1 to about 12 carbon atoms; each a independently has a value from 1 to about 25; each m independently has a value from zero to about 25; $m^1$ has a value from 1 to about 25; n has a value from 1 to about 10; $n^1$ has a value from 1 to about 100; $n^2$ has a value of 1 or 3; $n^3$ has a value from zero to about 10; and x has a value from 2 to about 19

(b) component (2) is a compound represented by the following formula IB, VIA or VIB

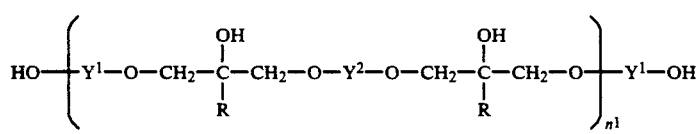

HO—$Y^1$—OH  Formula VIA   HO—$Y^2$—OH  Formula VIB wherein R, $Y^1$, $Y^2$, and $n^1$ are as defined above;

(c) components (1) and (2) are employed in quantities which provide a ratio of phenolic hydroxyl groups to epoxide group of from about 0.7:1 to about 1:1 and (d) at least 50 percent of the groups between two groups selected independently from the group consisting of (1) a saturated or unsaturated cycloaliphatic group, (2) an aromatic group, (3) a group represented by the formula

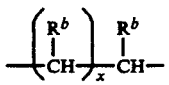

and (4) a group represented by the formula

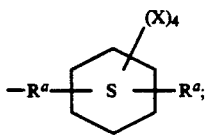

are $-O-R^1-O-$ groups or $-(O-CH_2-CHR^2-)_n-O-$ groups.

6. An advanced resin of claim 4 wherein
(a) component (1) is a diglycidyl ether of: bisphenol A, bisphenol F, 1,8-bis(4-hydroxyphenoxy)octane, 1,2-bis(3-hydroxyphenoxy)ethane, 1,8-bis(3-hydroxyphenoxy)octane, poly(bisphenol A)ether of ethylene glycol, poly(bisphenol F)ether of ethylene glycol, the reaction product of bisphenol A with from 2 to 6 moles of propylene oxide, or any combination thereof;
(b) component (2) is: bisphenol A, bisphenol F, 1,2-bis(3-hydroxyphenoxy)ethane, 1,4-bis(3-hydroxyphenoxy)butane, 1,8-bis(4-hydroxyphenoxy)octane, 1,8-bis(3-hydroxyphenoxy)octane, 1,4-bis(4-hydroxyphenoxy)butane, poly(bisphenol A)ether of ethylene glycol, poly(bisphenol F)ether of ethylene glycol, or any combination thereof; and
(c) components (1) and (2) are employed in quantities which provide a ratio of phenolic hydroxyl groups to epoxide group of from about 0.75:1 to about 0.95:1.

* * * * *